US012654364B2

(12) United States Patent
Ho et al.

(10) Patent No.: US 12,654,364 B2
(45) Date of Patent: Jun. 16, 2026

(54) METHOD FOR RECYCLING BATTERY ELECTRODES

(71) Applicant: GRST SINGAPORE PTE. LTD., Singapore (SG)

(72) Inventors: Kam Piu Ho, Hong Kong (CN); Yingkai Jiang, Shenzhen (CN); Yangjian Dong, Mianyang (CN)

(73) Assignee: GRST SINGAPORE PTE. LTD., Singapore (SG)

( * ) Notice: Subject to any disclaimer, the term of this patent is extended or adjusted under 35 U.S.C. 154(b) by 760 days.

(21) Appl. No.: 18/007,753

(22) PCT Filed: Jun. 16, 2021

(86) PCT No.: PCT/CN2021/100365
§ 371 (c)(1),
(2) Date: Dec. 2, 2022

(87) PCT Pub. No.: WO2021/254393
PCT Pub. Date: Dec. 23, 2021

(65) Prior Publication Data
US 2023/0299372 A1    Sep. 21, 2023

(30) Foreign Application Priority Data

Jun. 17, 2020    (WO) ................ PCT/CN2020/096672
Aug. 19, 2020    (WO) ................ PCT/CN2020/110065
(Continued)

(51) Int. Cl.
*B29B 17/02*    (2006.01)
*B29L 31/34*    (2006.01)
(Continued)

(52) U.S. Cl.
CPC ............ *B29B 17/02* (2013.01); *C08F 220/06* (2013.01); *C08F 220/44* (2013.01); *C08J 3/14* (2013.01);
(Continued)

(58) Field of Classification Search
CPC ......... B29L 2031/34; B29L 2031/3468; B29B 2017/0293–0296; B29B 17/02; Y02W 30/84
See application file for complete search history.

(56) References Cited

U.S. PATENT DOCUMENTS 2,679,986 A    6/1954    Fridolph
5,317,043 A    5/1994    Gass
(Continued)

FOREIGN PATENT DOCUMENTS

CN    101617435 A    12/2009
CN    104409792 A    3/2015
(Continued)

OTHER PUBLICATIONS

Machine Translation of JP2020-043064A. Mar. 19, 2020 (Year: 2020).*
(Continued)

*Primary Examiner* — Stephen E Rieth

(57) ABSTRACT

Provided is a method for recycling a battery electrode by immersing the electrode into a delamination solution and subsequently precipitating a polymeric binder with the addition of a precipitation agent; wherein the electrode comprises a current collector and an electrode layer material coated on one side or both sides of the current collector; wherein the electrode layer material comprises a polymeric binder; and wherein the polymeric binder comprises a copolymer comprising a structural unit derived from an acid group-containing monomer and a structural unit derived
(Continued)

from a hydrogen bond-forming group-containing monomer (ii). The method disclosed herein circumvents complex separation process, corrosion of current collector and contamination of polymeric binder, enables excellent materials recovery and allows the recycling of battery electrode to be achieved in a highly efficient manner.

18 Claims, 10 Drawing Sheets

(30) Foreign Application Priority Data

| | | | |
|---|---|---|---|
| Sep. 25, 2020 | (WO) | ................ | PCT/CN2020/117789 |
| Dec. 25, 2020 | (WO) | ................ | PCT/CN2020/139555 |
| Feb. 10, 2021 | (WO) | ................ | PCT/CN2021/076466 |

(51) Int. Cl.

| | |
|---|---|
| *C08F 220/06* | (2006.01) |
| *C08F 220/44* | (2006.01) |
| *C08J 3/14* | (2006.01) |
| *C08J 3/16* | (2006.01) |
| *C08J 11/06* | (2006.01) |
| *C22B 7/00* | (2006.01) |
| *H01M 4/04* | (2006.01) |
| *H01M 4/62* | (2006.01) |
| *H01M 4/66* | (2006.01) |
| *H01M 10/54* | (2006.01) |

(52) U.S. Cl.
  CPC ................. *C08J 3/16* (2013.01); *C08J 11/06* (2013.01); *C22B 7/005* (2013.01); *C22B 7/006* (2013.01); *H01M 4/622* (2013.01); *H01M 10/54* (2013.01); *B29B 2017/0293* (2013.01); *B29L 2031/3468* (2013.01); *C08J 2333/02* (2013.01); *C08J 2333/06* (2013.01); *C08J 2333/22* (2013.01); *H01M 4/0404* (2013.01); *H01M 4/667* (2013.01); *Y02E 60/10* (2013.01); *Y02W 30/62* (2015.05); *Y02W 30/84* (2015.05)

(56) References Cited

U.S. PATENT DOCUMENTS

| | | | |
|---|---|---|---|
| 2018/0013181 A1* | 1/2018 | Ho | ........................ H01M 6/52 |
| 2019/0260100 A1 | 8/2019 | Sloop | |
| 2022/0320619 A1* | 10/2022 | Hanisch | ............. C22B 47/0081 |

FOREIGN PATENT DOCUMENTS

| | | | | | |
|---|---|---|---|---|---|
| CN | 106220779 A | | 12/2016 | | |
| CN | 106750903 A | | 5/2017 | | |
| CN | 108780894 A | | 11/2018 | | |
| CN | 109119713 A | * | 1/2019 | ........... | H01M 10/54 |
| CN | 109193063 A | | 1/2019 | | |
| CN | 109478698 A | | 3/2019 | | |
| CN | 109868364 A | | 6/2019 | | |
| CN | 110885650 A | | 3/2020 | | |
| JP | S5840143 A | | 3/1983 | | |
| JP | 5011659 B2 | | 8/2012 | | |
| JP | 2020043064 A | * | 3/2020 | .......... | H01M 10/052 |
| WO | 2015034433 A1 | | 3/2015 | | |

OTHER PUBLICATIONS

Machine Translation of CN109119713A. Jan. 1, 2019. (Year: 2019).*
European Search Report of European Patent Application No. 21826301.0 issued on Jun. 20, 2024.
International Search Report of PCT Patent Application No. PCT/CN2021/100365 issued on Sep. 15, 2021.

\* cited by examiner

METHOD FOR RECYCLING BATTERY ELECTRODES

CROSS-REFERENCE TO RELATED APPLICATIONS

This is a U.S. national stage application of the International Patent Application No. PCT/CN2021/100365, filed Jun. 16, 2021, which claims the benefit under 35 U.S.C. § 365(c) of International Patent Application No. PCT/CN2020/096672, filed Jun. 17, 2020, International Patent Application No. PCT/CN2020/110065, filed Aug. 19, 2020, International Patent Application No. PCT/CN2020/117789, filed Sep. 25, 2020, International Patent Application No. PCT/CN2020/139555, filed Dec. 25, 2020 and International Patent Application No. PCT/CN2021/076466, filed Feb. 10, 2021, the content of all of which are incorporated herein by reference in their entireties.

FIELD OF THE INVENTION

The present invention relates to the field of methods of materials recycling. In particular, this invention relates to a method of recycling battery electrodes.

BACKGROUND OF THE INVENTION

The increasing urbanization, rapid development of technology innovations and consequent frequent replacement of products or disposal of waste consumables have resulted in shorter lifespans for products and/or over-production of waste. With the emergence of the growing problems associated with waste over-generation such as detrimental effects on human health, adverse environmental impacts and resource depletion, there has been an urge in taking prompt actions to resolve these complications worldwide using various means of waste processing.

Recycling, being a key component in waste reduction hierarchy, aims to recover invaluable materials from waste for reuse. Recycling of materials brings about conservation of natural resources, reduction in energy consumption (and hence, production costs) associated with extraction of raw materials and alleviates environmental impacts by reducing greenhouse gases and $SO_x$ emissions. Owing to the substantial benefits that materials recycling has to offer, developing highly efficient methods to recycle materials is of utmost importance in achieving a circular economy.

With regard to battery recycling, the current waste disposal infrastructure is not equipped to properly handle rejected and/or discarded batteries. Chemicals within the batteries, if allowed to discharge into the environment, might pose a significant threat. Furthermore, some of the materials utilized in the manufacture of batteries are costly to produce or are in limited supply. These materials could be recovered and reused at considerable economic and environmental advantages. Delamination of an electrode and the subsequent separation of the polymeric binder contained within an electrode layer are techniques that are heavily involved in battery materials recycling. Generally, an electrode refers to a current collector and an electrode layer coated on one side or both sides of the current collector, wherein the electrode layer comprises a polymeric binder. The polymeric binder is utilized for purpose of adhesion between (1) the electrode layer and the current collector and (2) the various constituents within the electrode layer.

However, as the batteries have reached their end-of-life or with the generation of battery rejects during the manufacturing process which are ready for immediate recycling, undergoing the step of delamination of the battery electrodes and the subsequent separation of the polymeric binder contained within the electrode layers during recycling are presented with several difficulties.

Complications involved in the delamination of the electrode include delaminating the electrode within the bulk layer of the electrode constituents, rather than at the electrode layer-current collector interface. For example, delamination of the electrode takes place at the bulk of the electrode layer where the electrode layer is not fully delaminated from the current collector with parts of electrode layer remain intact on the current collector. This will give rise to an undesirable recovery loss of materials within the electrode layer and a reclaimed current collector with high levels of impurities that requires introduction of subsequent separation process. In another respect, delamination of the electrode layer from the current collector might be highly inefficient, taking up to several hours. Exposing the electrode to drastic delamination conditions for a sustained period of time is likely to cause side effects such as corrosion, dissolution and damage of electrode constituents, generation of side reaction products, etc.

CN Patent Application Publication No. 104409792 A discloses a method for recovering cobalt from waste lithium batteries. The method comprises a step of separating battery materials of different densities based on a sink-float method where a heavier fraction sinks to the bottom, and a lighter fraction floats. This separation system although conceptually is very simple, it suffers from a number of drawbacks. When the solid material is wetted with water or an aqueous liquid, some of the light and heavy particles contained therein flocculate to form aggregates. As a result, part of the suspended solid particles containing $LiCoO_2$ and carbon powder will settle and be removed when separating the heavier fraction, thereby complicating the separation process. In addition, the method is highly time consuming and not economical since the lighter fraction, heavier fraction, and suspended solid particles must be removed sequentially. Furthermore, the method is limited to the recovery of $LiCoO_2$, and is not applicable for the recycling of other cathode materials.

In view of the above-mentioned challenges, there is always a need to develop a unified and simple method to achieve highly efficient and effective recycling of battery electrodes.

The method disclosed in the present invention circumvents complex separation process, corrosion of current collector and contamination of polymeric binder, enables excellent materials recovery and allows the recycling of battery electrode to be achieved within a short time frame.

SUMMARY OF THE INVENTION

The method of recycling an electrode could primarily be broken down into two steps: delamination of the electrode and the subsequent precipitation of the polymeric binder contained within the electrode layer material. Delamination of electrode is achieved via bond disruption and/or breakage between the polymeric binder in the electrode layer material and the current collector at the electrode layer material-current collector interface; whereas the precipitation of the polymeric binder from the electrode layer material is initiated by the bond disruption and/or breakage between the polymeric binder and the solvent within the polymeric binder-containing mixture.

The aforementioned needs are met by various aspects and embodiments disclosed herein. Provided herein is a method for recycling a battery electrode, comprising the steps of:

a) immersing an electrode, comprising a current collector and an electrode layer material coated on one side or both sides of the current collector, into a delamination solution to form a heterogeneous mixture;

b) screening the heterogeneous mixture to separate the current collector and the electrode layer material from the delamination solution;

c) adding the electrode layer material and a precipitation agent into an aqueous solvent to form a first suspension;

wherein the electrode layer material comprises a polymeric binder and an electrode active material; and wherein the polymeric binder comprises a copolymer comprising a structural unit derived from an acid group-containing monomer and a structural unit derived from a hydrogen bond-forming group-containing monomer (ii).

In some embodiments, the delamination solution comprises a delamination agent and an aqueous solvent. In some embodiments, the delamination agent is a weak acid.

In some embodiments, the precipitation agent is an acid. In some embodiments, the acid is a strong acid, a weak acid or a combination thereof.

In some embodiments, the molar ratio of the structural unit derived from an acid group-containing monomer to the structural unit derived from a hydrogen bond-forming group-containing monomer (ii) in the copolymer is from about 0.1 to about 5.

The simple utilization of a delamination solution and a precipitation agent in the present invention to delaminate a battery electrode at the electrode layer material-current collector interface and subsequently precipitate a polymeric binder can drastically shorten the time taken in recycling a battery electrode, maximize invaluable materials recovery, eliminate contamination of current collector and polymeric binder and thus prevent the need for subsequent downstream processing.

BRIEF DESCRIPTION OF THE DRAWINGS

FIG. 9 illustrates a schematic of an embodiment of the proposed interactions between a polymeric binder and an aqueous solvent in a first suspension.

FIG. 10 illustrates a schematic of an embodiment of the proposed alterations in interactions between a polymeric binder and an aqueous solvent as sufficient concentration of precipitation agent is added into the first suspension.

FIG. 12 illustrates a schematic of an embodiment of the proposed alterations in interactions between a polymeric binder and an aqueous solvent as insufficient concentration of precipitation agent is added into the first suspension.

FIG. 13 illustrates a schematic of an embodiment of the proposed alterations in interactions between a polymeric binder which comprises a copolymer comprising structural unit(s) derived from one or more carboxylic acid group-containing monomer(s) and an aqueous solvent as sufficient concentration of precipitation agent is added into the first suspension.

DETAILED DESCRIPTION OF THE INVENTION

Figure 1:
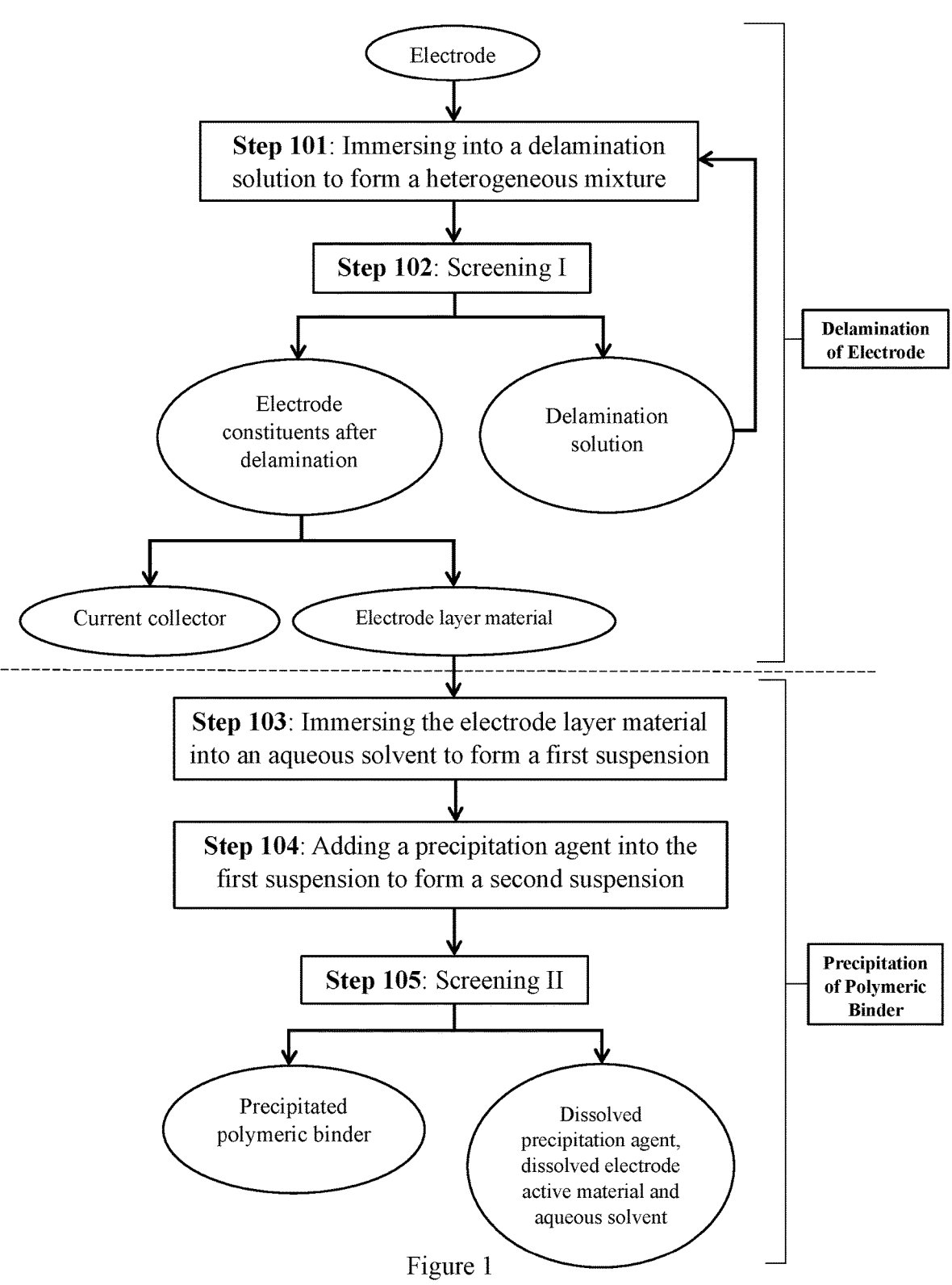
FIG. 1 is a flow chart of an embodiment illustrating the steps for recycling a battery electrode as disclosed herein.

The method disclosed herein allows (1) the delamination of electrodes to take place without presenting corrosion and dissolution concerns to the current collector and/or electrode active materials within the electrode layer material and (2) the precipitation of a polymeric binder to occur without inducing undesirable chemical and phase transitions to the electrode active materials.

The term "electrode" refers to a "cathode" or an "anode."

The term "positive electrode" is used interchangeably with cathode. Likewise, the term "negative electrode" is used interchangeably with anode.

The term "polymeric binder", "binder" or "binder material" refers to a chemical compound, mixture of compounds, or polymer that is used to hold an electrode material and/or a conductive agent in place and adhere them onto a metal part or a current collector to form an electrode. In some embodiments, the metal part is conductive or non-conductive. In some embodiments, the electrode does not comprise any conductive agent. In some embodiments, the polymeric binder forms a colloid, solution or dispersion in an aqueous solvent such as water.

The term "conductive agent" refers to a material that has good electrical conductivity. Therefore, the conductive agent is often mixed with an electrode active material at the time of forming an electrode to improve electrical conductivity of the electrode. In some embodiments, the conductive agent is chemically active. In some embodiments, the conductive agent is chemically inactive.

The term "bulk" refers to the main body of a mass of solid or liquid material as compared to the surface where all types of interactions occur.

The term "polymer" refers to a compound prepared by polymerizing monomers, whether of the same or a different type. The generic term "polymer" embraces the terms "homopolymer" as well as "copolymer".

The term "homopolymer" refers to a polymer prepared by the polymerization of the same type of monomer.

The term "copolymer" refers to a polymer prepared by the polymerization of two or more different types of monomers.

The term "coil" refers to a linear or an almost linear configuration of a polymer chain. In some embodiments, a coiled polymer chain comprises like charges along the chain which repel each other.

The term "unsaturated" as used herein, refers to a moiety having one or more units of unsaturation.

The term "alkyl" or "alkyl group" refers to a univalent group having the general formula $C_nH_{2n+1}$ derived from removing a hydrogen atom from a saturated, unbranched or branched aliphatic hydrocarbon, where n is an integer, or an integer between 1 and 20, or between 1 and 8. Examples of alkyl groups include, but are not limited to, $(C_1\text{-}C_8)$alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl and octyl. Longer alkyl groups include nonyl and decyl groups. An alkyl group can be unsubstituted or substituted with one or more suitable substituents. Furthermore, the alkyl group can be branched or unbranched. In some embodiments, the alkyl group contains at least 2, 3, 4, 5, 6, 7, or 8 carbon atoms.

The term "cycloalkyl" or "cycloalkyl group" refers to a saturated or unsaturated cyclic non-aromatic hydrocarbon radical having a single ring or multiple condensed rings. Examples of cycloalkyl groups include, but are not limited to, $(C_3\text{-}C_7)$cycloalkyl groups, such as cyclopropyl, cyclobutyl, cyclopentyl, cyclohexyl, and cycloheptyl, and saturated cyclic and bicyclic terpenes and $(C_3\text{-}C_7)$cycloalkenyl groups, such as cyclopropenyl, cyclobutenyl, cyclopentenyl, cyclohexenyl, and cycloheptenyl, and unsaturated cyclic and bicyclic terpenes. A cycloalkyl group can be unsubstituted or substituted by one or two suitable substituents. Furthermore, the cycloalkyl group can be monocyclic or polycyclic. In some embodiments, the cycloalkyl group contains at least 5, 6, 7, 8, 9, or 10 carbon atoms.

The term "alkoxy" refers to an alkyl group, as previously defined, attached to the principal carbon chain through an oxygen atom. Some non-limiting examples of the alkoxy group include methoxy, ethoxy, propoxy, butoxy, and the like. And the alkoxy defined above may be substituted or unsubstituted, wherein the substituent may be, but is not limited to, deuterium, hydroxy, amino, halo, cyano, alkoxy, alkyl, alkenyl, alkynyl, mercapto, nitro, and the like.

The term "alkenyl" refers to an unsaturated straight chain, branched chain, or cyclic hydrocarbon radical that contains one or more carbon-carbon double bonds. Examples of alkenyl groups include, but are not limited to, ethenyl, 1-propenyl, and 2-propenyl, which may optionally be substituted on one or more of the carbon atoms of the radical.

The term "aryl" or "aryl group" refers to an organic radical derived from a monocyclic or polycyclic aromatic hydrocarbon by removing a hydrogen atom. Non-limiting examples of the aryl group include phenyl, naphthyl, benzyl, tolanyl, sexiphenyl, phenanthrenyl, anthracenyl, coronenyl, and tolanylphenyl. An aryl group can be unsubstituted or substituted with one or more suitable substituents. Furthermore, the aryl group can be monocyclic or polycyclic. In some embodiments, the aryl group contains at least 6, 7, 8, 9, or 10 carbon atoms.

The term "aliphatic" refers to a $C_1$ to $C_{30}$ alkyl group, a $C_2$ to $C_{30}$ alkenyl group, a $C_2$ to $C_{30}$ alkynyl group, a $C_1$ to $C_{30}$ alkylene group, a $C_2$ to $C_{30}$ alkenylene group, or a $C_2$ to $C_{30}$ alkynylene group. In some embodiments, the alkyl group contains at least 2, 3, 4, 5, 6, 7, or 8 carbon atoms.

The term "aromatic" refers to groups comprising aromatic hydrocarbon rings, optionally including heteroatoms or substituents. Examples of such groups include, but are not limited to, phenyl, tolyl, biphenyl, o-terphenyl, m-terphenyl, p-terphenyl, naphthyl, anthryl, phenanthryl, pyrenyl, triphenylenyl, and derivatives thereof.

The term "substituted" as used to describe a compound or chemical moiety refers to that at least one hydrogen atom of that compound or chemical moiety is replaced with a second chemical moiety. Examples of substituents include, but are not limited to, halogen; alkyl; heteroalkyl; alkenyl; alkynyl; aryl, heteroaryl, hydroxyl; alkoxyl; amino; nitro; thiol; thioether; imine; cyano; amido; phosphonato; phosphine; carboxyl; thiocarbonyl; sulfonyl; sulfonamide; acyl; formyl; acyloxy; alkoxycarbonyl; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; $-CO_2CH_3$; $-CONH_2$; $-OCH_2CONH_2$; $-NH_2$; $-SO_2NH_2$; $-OCHF_2$; $-CF_3$; $-OCF_3$; $-NH(alkyl)$; $-N(alkyl)_2$; $-NH(aryl)$; $-N(alkyl)(aryl)$; $-N(aryl)_2$; $-CHO$; $-CO(alkyl)$; $-CO(aryl)$; $-CO_2(alkyl)$; and $-CO_2(aryl)$; and such moieties can also be optionally substituted by a fused-ring structure or bridge, for example $-OCH_2O-$. These substituents can optionally be further substituted with a substituent selected from such groups. All chemical groups disclosed herein can be substituted, unless it is specified otherwise.

The term "halogen" or "halo" refers to F, Cl, Br or I.

The term "olefin" refers to an unsaturated hydrocarbon-based compound with at least one carbon-carbon double bond.

The term "monomeric unit" refers to the constitutional unit contributed by a single monomer to the structure of a polymeric binder.

The term "structural unit" refers to the total monomeric units contributed by the same monomer type in a polymeric binder.

The term "acid salt group" refers to a functional group derived from an acid functional group, wherein the proton of the acid functional group is replaced by another cation. In some embodiments, the proton of the acid is replaced with a metal cation. In some embodiments, the proton of the acid is replaced with an ammonium ion. In some embodiments, acid salt group is formed when an acid reacts with water.

The term "polyatomic" refers to an electrically neutral group of three of more atoms held together by covalent bonds.

The term "polyprotic acid" refers to an acid having two or more ionizable hydrogen ions (i.e. protons) per molecule.

The term "hydrophilic" refers to a tendency to dissolve in or interact with polar solvents, especially water, or polar functional groups. Hydrophilic groups are usually them-selves polar, and in many cases, such hydrophilic groups are able to form hydrogen bonds with water molecules. Some non-limiting examples of the hydrophilic groups include acid, hydroxyl, and amide.

The term "hydrophobic group" refers to a functional group that tends not to dissolve or interact with polar solvents, especially water, or polar functional groups. Hydrophobic groups are usually non-polar.

The term "planetary mixer" refers to an equipment that can be used to mix or stir different materials for producing a homogeneous mixture, which consists of blades conduct-ing a planetary motion within a vessel. In some embodi-ments, the planetary mixer comprises at least one planetary blade and at least one high-speed dispersion blade. The planetary and the high-speed dispersion blades rotate on their own axes and also rotate continuously around the vessel. The rotation speed can be expressed in unit of rotations per minute (rpm) which refers to the number of rotations that a rotating body completes in one minute.

The term "ultrasonicator" refers to an equipment that can apply ultrasound energy to agitate particles in a sample. Any ultrasonicator that can disperse the mixture, admixture, suspension, solution or slurry disclosed herein can be used herein. Some non-limiting examples of the ultrasonicator include an ultrasonic bath, a probe-type ultrasonicator, and an ultrasonic flow cell.

The term "ultrasonic bath" refers to an apparatus through which the ultrasonic energy is transmitted via the container's wall of the ultrasonic bath into the liquid sample.

The term "probe-type ultrasonicator" refers to an ultra-sonic probe immersed into a medium for direct sonication. The term "direct sonication" means that the ultrasound is directly coupled into the processing liquid.

The term "ultrasonic flow cell" or "ultrasonic reactor chamber" refers to an apparatus through which sonication processes can be carried out in a flow-through mode. In some embodiments, the ultrasonic flow cell is in a single-pass, multiple-pass or recirculating configuration.

The term "applying" refers to an act of laying or spreading a substance on a surface.

The term "current collector" refers to any conductive substrate, which is in contact with an electrode layer and is capable of conducting an electrical current flowing to elec-trodes during discharging or charging a secondary battery. Some non-limiting examples of the current collector include a single conductive metal layer or substrate and a single conductive metal layer or substrate with an overlying con-ductive coating layer, such as a carbon black-based coating layer. The conductive metal layer or substrate may be in the form of a foil or a porous body having a three-dimensional network structure, and may be a polymeric or metallic material or a metalized polymer. In some embodiments, the three-dimensional porous current collector is covered with a conformal carbon layer.

The term "electrode layer" refers to a layer, which is in contact with a current collector, that comprises an electro-chemically active material. In some embodiments, the electrode layer is made by applying a coating on to the current collector. In some embodiments, the electrode layer is located on one side or both sides of the current collector. In other embodiments, the three-dimensional porous current collector is coated conformally with an electrode layer.

The term "electrode layer material" refers to a layer, a fragmented layer, a pulverized layer, a layer that is partially or completely shattered, fragmentized, pulverized, milled, crushed or grounded into forms of small or fine particles or powder, which is in contact with a current collector, com-prising an electrochemically active material. In some embodiments, the electrode layer material is an electrode layer. In some embodiments, the electrode layer material is made by fragmenting or pulverizing an electrode layer or reducing an electrode layer into forms of fine particles or powder. The generic term "electrode layer material" embraces the terms "electrode layer", "fragmented electrode layer", "pulverized electrode layer", "electrode layer par-ticle(s)" and "electrode layer powder".

The term "room temperature" refers to indoor tempera-tures from about 18° C. to about 30° C., e.g., 18, 19, 20, 21, 22, 23, 24, 25, 26, 27, 28, 29, or 30° C. In some embodi-ments, room temperature refers to a temperature of about 20° C.+/−1° C. or +/−2° C. or +/−3° C. In other embodi-ments, room temperature refers to a temperature of about 22° C. or about 25° C.

The term "solid content" refers to the amount of non-volatile material remaining after evaporation.

The term "peeling strength" refers to the amount of force required to separate a current collector and an electrode active material coating that are bonded to each other. It is a measure of the binding strength between such two materials and is usually expressed in N/cm.

The term "adhesive strength" refers to the amount of force required to separate a current collector and a polymeric binder coating that are bonded to each other. It is a measure of the binding strength between such two materials and is usually expressed in N/cm.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 ampere-hour (Ah) is the equivalent of 3,600 coulombs of electrical charge. Similarly, the term "milliampere-hour (mAh)" also refers to a unit of the storage capacity of a battery and is $\frac{1}{1,000}$ of an ampere-hour.

The term "battery cycle life" refers to the number of complete charge/discharge cycles a battery can perform before its nominal capacity falls below 80% of its initial rated capacity.

The term "capacity" is a characteristic of an electrochemi-cal cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight, usually expressed in Ah/kg or mAh/g.

The term "water-soluble" refers to the capability of a substance in dissolving in water with trace amounts or none of the materials remained undissolved in water. The term "water-soluble" embraces the terms "entirely water-soluble", "mostly water-soluble" and "slightly water-insoluble".

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 0 percent to 100 percent. Moreover, any numerical range defined by two R numbers as defined in the above is also specifically disclosed.

In the present description, all references to the singular include references to the plural and vice versa.

With the drastic increase of lithium-ion batteries in circulation, concerns have been raised regarding flooding of the market with end-of-life (EoL) batteries. Aside from end-of-life batteries, there are large amount of electrode rejects or scraps generated during the battery manufacturing process. As a result, there is a pressing need in developing economical recycling processes for spent and rejected lithium-ion batteries.

Pyrometallurgical process is one of the recycling strategies that is frequently employed for recycling end-of-life batteries. Pyrometallurgical process involves heating of the electrodes at high temperatures, beyond the decomposition temperature of the polymeric binder but ideally below the melting temperatures of other electrode constituents e.g. current collector and electrode active material. This process brings about the carbonization of the polymeric binder where recycling and/or reclaim of the polymeric binder is not feasible. On top of that, the combustion process might generate toxic compounds and/or pollutants produced by the decomposition of the polymeric binder. For example, in the case where an electrode that comprises polyvinylidene fluoride (PVDF) binder material undergoes pyrometallurgy, toxic compounds that could impose long-term health risks such as hydrogen fluoride would be produced. Pyrometallurgical process is also highly energy intensive and thus results in immense associated energy costs.

Current methods in recovery of constituents of an electrode (e.g. current collector, polymeric binder and electrode active materials) have their own shortcomings and are ineffective in the retrieval of the constituents of an electrode derived from water-based slurries. In view of this, there is a need to develop a method to recover constituents of an electrode derived from water-based slurries in a highly efficient and effective manner.

Accordingly, the method disclosed in the present invention is particularly applicable to achieve recycling of an electrode in lithium-ion batteries (LIBs). The composition of the polymeric binder forms a determining factor in governing the feasibility of the method disclosed in the present invention. The polymeric binder disclosed herein is capable of (1) detaching from the current collector with the addition of a delamination solution which leads to the delamination of the electrode and (2) undergoing precipitation with the addition of a precipitation agent which ultimately enables the retrieval of other constituents such as the electrode active materials within the electrode layer material. The polymeric binder comprises a copolymer comprising a structural unit derived from an acid group-containing monomer and a structural unit derived from a hydrogen bond-forming group-containing monomer (ii).

The method disclosed in the present invention is highly applicable in recycling a battery electrode. In some embodiments, the battery may be a primary battery or a secondary battery. Some non-limiting examples of the battery include alkaline battery, aluminium-air battery, lithium battery, lithium air battery, magnesium battery, solid-state battery, silver-oxide battery, zinc-air battery, aluminium-ion battery, lead-acid battery, lithium-ion battery, magnesium-ion battery, potassium-ion battery, sodium-ion battery, sodium-air battery, silicon-air battery, zinc-ion battery and sodium-sulphur battery.

FIG. 1 is a flow chart of an embodiment illustrating the steps of method 100 for recycling a battery electrode as disclosed herein. With the immersion of the electrode into a delamination solution, the electrode is initially subjected to delamination and produces an electrode layer material and a current collector. After the process of delamination of electrode in the present invention, the extracted delamination solution can be subjected to purification (e.g. via ion exchange) for further reuse and may be reused for delamination of another electrode. This allows the delamination solution to be continually engage in a closed-loop arrangement where materials are repeatedly recycled and reused. The recovered electrode layer material is then immersed into an aqueous solvent in forming a first suspension. With the addition of a precipitation agent into the first suspension in forming a second suspension, the polymeric binder contained within the electrode layer material is thus precipitated. The remaining second suspension comprising the aqueous solvent, the dissolved precipitation agent and the dissolved electrode active materials may be subjected to additional separation and/or extraction process to further extract the electrode active materials and the precipitation agent contained within. In particular, the dissolved electrode active materials could react with base or hydroxide solutions in forming metal hydroxides that could be utilized as precursors in making electrode active materials for lithium-ion batteries.

In some embodiments, a heterogeneous mixture is prepared by immersing an electrode into a delamination solution in step 101.

Figure 2:
FIG. 2 shows a simplified view of an embodiment of a battery electrode.

An electrode as described herein refers to a current collector with an electrode layer material coated on one side or both sides of the current collector, wherein the electrode layer material comprises a polymeric binder. FIG. 2 shows a simplified view of an embodiment of an electrode, represented by 200. The electrode 200 comprises a current collector 201 with an electrode layer material 202 coated on one side of the current collector 201. Adhesion between the electrode layer material and the current collector within the electrode is attained via the interactions between the polymeric binder in the electrode layer material and the surface of the current collector to which the electrode layer material is applied on.

The incorporation of an aqueous polymeric binder, that utilizes aqueous solvents, most commonly water, is preferred in the present invention. Aqueous polymeric binders are capable of achieving good dispersion and stability in water, and hence can strongly adhere the electrode layer material to the current collector within the electrode.

In some embodiments, the polymeric binder comprises a copolymer. In some embodiments, the copolymer comprises a structural unit (a) derived from an acid group-containing monomer and a structural unit (b) derived from a nitrile group-containing monomer. In some embodiments, the copolymer further comprises a structural unit (c) derived from an amide group-containing monomer, a structural unit (d) derived from a hydroxyl group-containing monomer, a structural unit (e) derived from an ester group-containing monomer, a structural unit (f) derived from an epoxy group-containing monomer, a structural unit (g) derived from a fluorine-containing monomer or combinations thereof.

Each of the above-mentioned monomers that can potentially constitute the make-up of the copolymer independently consists of either a strongly electronegative atom, particularly nitrogen (N), oxygen (O) or fluorine (F) atom (known as a hydrogen bond donor, Dn) that is covalently bonded to a hydrogen (H) atom or another electronegative atom bearing a lone pair of electrons in the outermost electron shell of the atom (known as a hydrogen bond acceptor, Ac). This allows potential hydrogen bond formation with another molecule (e.g. located at the current collector surface) of the same feature. Therefore, each of the above-mentioned monomers independently comprises at least one hydrogen bond-forming group. A hydrogen bond forming system is generally denoted as Formula (1) below:

$$\text{Dn-H} \ldots \text{Ac} \qquad\qquad \text{Formula (1)}$$

wherein Dn is a hydrogen bond donor; Ac is a hydrogen bond acceptor; the solid line denotes a polar covalent bond and the dotted line indicates a hydrogen bond.

In some embodiments, the copolymer comprises at least two structural units derived from a hydrogen bond-forming group-containing monomer. In some embodiments, the hydrogen bond-forming group-containing monomer is selected from the group consisting of an acid group-containing monomer, a nitrile group-containing monomer, an amide group-containing monomer, a hydroxyl group-containing monomer, an ester group-containing monomer, an epoxy group-containing monomer, a fluorine-containing monomer and combinations thereof.

In some embodiments, the copolymer comprises a structural unit derived from a hydrogen bond-forming group-containing monomer (i) and a structural unit derived from a hydrogen bond-forming group-containing monomer (ii).

A hydrogen bond-forming group-containing monomer (i) denotes a monomer that is hydrophilic in nature and capable of forming hydrogen bonding with another species, molecules or compounds. In some embodiments, the hydrogen bond-forming group-containing monomer (i) is selected from the group consisting of an acid group-containing monomer, an amide group-containing monomer, a hydroxyl group-containing monomer and combinations thereof. In some embodiments, the hydrogen bond-forming group-containing monomer (i) is selected from the group consisting of an amide group-containing monomer, a hydroxyl group-containing monomer and combinations thereof. In some embodiments, the copolymer does not comprise a structural unit derived from an amide group-containing monomer, a hydroxyl group-containing monomer and combinations thereof.

A hydrogen bond-forming group-containing monomer (ii) denotes a monomer that is hydrophobic in nature and capable of forming hydrogen bonding with another species, molecules or compounds. In some embodiments, the hydrogen bond-forming group-containing monomer (ii) is selected from the group consisting of a nitrile group-containing monomer, an ester group-containing monomer, an epoxy group-containing monomer, a fluorine group-containing monomer and combinations thereof.

In some embodiments, the copolymer comprises a structural unit derived from an acid group-containing monomer and a structural unit derived from a hydrogen bond-forming group-containing monomer (ii). Optionally, the copolymer further comprises a structural unit derived from a hydrogen bond-forming group-containing monomer (i).

In some embodiments, the proportion of each of the structural unit derived from a hydrogen bond-forming group-containing monomer (i) and the structural unit derived from a hydrogen bond-forming group-containing monomer (ii) is independently from about 5% to about 85%, from about 5% to about 80%, from about 5% to about 75%, from about 10% to about 85%, from about 10% to about 80%, from about 10% to about 75%, from about 15% to about 85%, from about 15% to about 80%, from about 15% to about 75%, from about 15% to about 70%, from about 15% to about 65%, from about 15% to about 60%, from about 15% to about 55%, from about 15% to about 50%, from about 25% to about 85%, from about 25% to about 80%, from about 25% to about 75%, from about 25% to about 70%, from about 25% to about 65%, from about 25% to about 60%, from about 25% to about 55%, from about 35% to about 85%, from about 35% to about 80%, from about 35% to about 75%, from about 35% to about 70%, from about 35% to about 65%, from about 40% to about 85%, from about 45% to about 85%, from about 45% to about 80%, from about 45% to about 75%, from about 50% to about 85%, from about 50% to about 80% or from about 55% to about 85% by mole, based on the total number of moles of monomeric units in the copolymer in the polymeric binder.

In some embodiments, the proportion of each of the structural unit derived from a hydrogen bond-forming group-containing monomer (i) and the structural unit derived from a hydrogen bond-forming group-containing monomer (ii) is independently less than 85%, less than 80%, less than 75%, less than 70%, less than 65%, less than 60%, less than 55%, less than 50%, less than 45%, less than 40%, less than 35%, less than 30%, less than 25%, less than 20% or less than 15% by mole, based on the total number of moles of monomeric units in the copolymer in the polymeric binder. In some embodiments, the proportion of each of the structural unit derived from a hydrogen bond-forming group-containing monomer (i) and the structural unit derived from a hydrogen bond-forming group-containing monomer (ii) is independently more than 5%, more than 10%, more than 15%, more than 20%, more than 25%, more than 30%, more than 35%, more than 40%, more than 45%, more than 50%, more than 55%, more than 60%, more than 65%, more than 70% or more than 75% by mole, based on the total number of moles of monomeric units in the copolymer in the polymeric binder.

In some embodiments, the molar ratio of the structural unit derived from a hydrogen bond-forming group-containing monomer (i) to the structural unit derived from a hydrogen bond-forming group-containing monomer (ii) in the copolymer is from about 0.1 to about 6.5, from about 0.1 to about 6, from about 0.1 to about 5.5, from about 0.1 to about 5, from about 0.1 to about 4.5, from about 0.1 to about 4, from about 0.1 to about 3.5, from about 0.1 to about 3, from about 0.25 to about 6.5, from about 0.25 to about 6, from about 0.25 to about 5.5, from about 0.25 to about 5, from about 0.25 to about 4.5, from about 0.25 to about 4, from about 0.25 to about 3.5, from about 0.25 to about 3, from about 0.5 to about 6.5, from about 0.5 to about 6, from about 0.5 to about 4.5, from about 0.5 to about 4, from about 0.5 to about 3.5, from about 0.5 to about 3, from about 0.75 to about 6.5, from about 0.75 to about 6, from about 0.75 to about 5.5, from about 0.75 to about 5, from about 0.75 to about 4.5, from about 0.75 to about 4, from about 0.75 to about 3.5, from about 1 to about 6, from about 1 to about 5 or from about 1 to about 4.

In some embodiments, the molar ratio of the structural unit derived from a hydrogen bond-forming group-containing monomer (i) to the structural unit derived from a hydrogen bond-forming group-containing monomer (ii) in the copolymer is less than 6.5, less than 5.5, less than 4.5, less than 3.5, less than 2.5, less than 1.5 or less than 1. In some embodiments, the molar ratio of the structural unit derived from a hydrogen bond-forming group-containing monomer (i) to the structural unit derived from a hydrogen bond-forming group-containing monomer (ii) in the copolymer is more than 0.1, more than 0.5, more than 1, more than 1.5, more than 2.5, more than 3.5, more than 4.5 or more than 5.5.

In some embodiments, the molar ratio of the structural unit derived from an acid group-containing monomer to the structural unit derived from a hydrogen bond-forming group-containing monomer (ii) in the copolymer is from about 0.1 to about 5, from about 0.1 to about 4.5, from about 0.1 to about 4, from about 0.1 to about 3.5, from about 0.1 to about 3, from about 0.1 to about 2.5, from about 0.15 to about 5, from about 0.15 to about 4.5, from about 0.15 to about 4, from about 0.15 to about 3.5, from about 0.15 to about 3, from about 0.15 to about 2.5, from about 0.2 to about 5, from about 0.2 to about 4.5, from about 0.2 to about 4, from about 0.2 to about 3.5, from about 0.2 to about 3, from about 0.2 to about 2.5, from about 0.25 to about 5, from about 0.25 to about 4.5, from about 0.25 to about 4, from about 0.25 to about 3.5, from about 0.25 to about 3, from about 0.25 to about 2.5.

In some embodiments, the molar ratio of the structural unit derived from an acid group-containing monomer to the structural unit derived from a hydrogen bond-forming group-containing monomer (ii) in the copolymer is less than 5, less than 4.5, less than 4, less than 3.5, less than 3, less than 2.5, less than 2, less than 1.5, less than 1 or less than 0.5. In some embodiments, the molar ratio of the structural unit derived from an acid group-containing monomer to the structural unit derived from a hydrogen bond-forming group-containing monomer (ii) in the copolymer is more than 0.1, more than 0.5, more than 1, more than 1.5, more than 2, more than 2.5, more than 3, more than 3.5 or more than 4.

Structural unit (a) is derived from an acid group-containing monomer. Any monomer that has at least one acid group may be used as acid group-containing monomer without any specific limitations.

In some embodiments, the acid group-containing monomer is a carboxylic acid group-containing monomer. In some embodiments, the carboxylic acid group-containing monomer is acrylic acid, methacrylic acid, crotonic acid, 2-butyl crotonic acid, cinnamic acid, maleic acid, maleic anhydride, fumaric acid, itaconic acid, itaconic anhydride, 4,4-dimethyl itaconic acid or a combination thereof. In certain embodiments, the carboxylic acid group-containing monomer is 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3- propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxy-acrylic acid, β-trans-aryloxyacrylic acid, α-chloro-β-E-methoxyacrylic acid or a combination thereof. In some embodiments, the carboxylic acid group-containing monomer is methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate or a combination thereof. In some embodiments, the carboxylic acid group-containing monomer is maleic anhydride, methyl maleic anhydride, dimethyl maleic anhydride, acrylic anhydride, methacrylic anhydride, methacrolein, methacryloyl chloride, methacryloyl fluoride, methacryloyl bromide, or a combination thereof.

In some embodiments, the carboxylic acid group-containing monomer is in the form of a carboxylic acid, a carboxylic salt or a combination thereof. In some embodiments, the carboxylic salt can be a salt of a carboxylic acid group-containing monomer listed above. In some embodiments, the carboxylic salt can be in the form of an alkali metal carboxylic salt, an ammonium carboxylic salt or a combination thereof. Examples of an alkali metal forming the alkali metal carboxylic salt include lithium, sodium and potassium.

In some embodiments, the acid group-containing monomer is a sulfonic acid group-containing monomer. In some embodiments, the sulfonic acid group-containing monomer is vinylsulfonic acid, methylvinylsulfonic acid, allylvinylsulfonic acid, allylsulfonic acid, methallylsulfonic acid, styrenesulfonic acid, 2-sulfoethyl methacrylic acid, 2-methylprop-2-ene-1-sulfonic acid, 2-acrylamido-2-methyl-1-propane sulfonic acid, 3-allyloxy-2-hydroxy-1-propane sulfonic acid or a combination thereof.

In some embodiments, the sulfonic acid group-containing monomer is in the form of a sulfonic acid, a sulfonic salt or a combination thereof. In some embodiments, the sulfonic salt can be a salt of a sulfonic acid group-containing monomer listed above. In some embodiments, the sulfonic salt can be in the form of an alkali metal sulfonic salt, an ammonium sulfonic salt or a combination thereof. Examples of an alkali metal forming the alkali metal sulfonic salt include lithium, sodium and potassium.

In some embodiments, the acid group-containing monomer is a phosphonic acid group-containing monomer. In some embodiments, the phosphonic acid group-containing monomer is vinyl phosphonic acid, allyl phosphonic acid, vinyl benzyl phosphonic acid, acrylamide alkyl phosphonic acid, methacrylamide alkyl phosphonic acid, acrylamide alkyl diphosphonic acid, acryloylphosphonic acid, 2-methacryloyloxyethyl phosphonic acid, bis(2-methacryloyloxyethyl) phosphonic acid, ethylene 2-methacryloyloxyethyl phosphonic acid, ethyl-methacryloyloxyethyl phosphonic acid or a combination thereof.

In some embodiments, the phosphonic acid group-containing monomer is in the form of a phosphonic acid, a phosphonic salt or a combination thereof. In some embodiments, the phosphonic salt can be a salt of a phosphonic acid group-containing monomer listed above. In some embodiments, the phosphonic salt can be in the form of an alkali metal phosphonic salt, an ammonium phosphonic salt or a combination thereof. Examples of an alkali metal forming the alkali metal phosphonic salt include lithium, sodium and potassium.

In some embodiments, the structural unit (a) is derived from a carboxylic acid group-containing monomer, a sulfonic acid group-containing monomer, a phosphonic acid group-containing monomer or a combination thereof. In some embodiments, the structural unit (a) is not derived from a sulfonic acid group-containing monomer, a phosphonic acid group-containing monomer or a combination thereof.

In some embodiments, the acid group-containing monomer is in the form of an acid, an acid salt or a combination thereof. In some embodiments, the acid salt can be a salt of an acid group-containing monomer listed above. The anion of the acid salt group is capable of forming ion-dipole interactions with a partially positively charged species (for example, a partially positively charged metal species, $M^{\delta+}$ at the current collector surface). In some embodiments, the acid salt group-containing monomer is selected from the group consisting of a carboxylic salt group-containing monomer, a sulfonic salt group-containing monomer, a phosphonic salt group-containing monomer and combinations thereof. In some embodiments, the acid salt can be in the form of an alkali metal acid salt, an ammonium acid salt or a combination thereof. Examples of an alkali metal forming the alkali metal acid salt include lithium, sodium and potassium.

In some embodiments, structural unit (a) derived from an acid group-containing monomer comprises atom(s) that is/are capable of forming hydrogen bond(s). In some embodiments, structural unit (a) derived from an acid group-containing monomer further comprises charged species that is/are capable of inducing ion-dipole interactions and/or forming ionic bond(s) with another molecule or compound. For example, an acid group undergoes partial dissociation when comes into contact with water and produces an acid salt group that contains charged species, giving rise to its capability in forming ion-dipole interactions and/or ionic bond(s).

Structural unit (b) is derived from a nitrile group-containing monomer. Any monomer that has at least one nitrile group may be used as nitrile group-containing monomer without any specific limitations. In some embodiments, the nitrile group-containing monomer include α,β-ethylenically unsaturated nitrile monomers. In some embodiments, the nitrile group-containing monomer is acrylonitrile, α-halogenoacrylonitrile, α-alkylacrylonitrile or a combination thereof. In some embodiments, the nitrile group-containing monomer is α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl)acrylonitrile, α-(chlorophenyl)acrylonitrile, α-(cyanophenyl)acrylonitrile, vinylidene cyanide, or a combination thereof.

In some embodiments, the proportion of each of the structural unit (a) derived from an acid group-containing monomer and the structural unit (b) derived from a nitrile group-containing monomer is independently from about 5% to about 85%, from about 5% to about 75%, from about 10% to about 85%, from about 10% to about 75%, from about 15% to about 85%, from about 15% to about 75%, from about 15% to about 70%, from about 15% to about 65%, from about 15% to about 60%, from about 15% to about 55%, from about 15% to about 50%, from about 20% to about 85%, from about 25% to about 85%, from about 30% to about 85%, from about 35% to about 85%, from about 40% to about 85%, from about 45% to about 85%, from about 50% to about 85%, from about 55% to about 85%, from about 20% to about 80%, from about 20% to about 75%, from about 20% to about 70%, from about 20% to about 65%, or from about 20% to about 60% by mole, based on the total number of moles of monomeric units in the copolymer in the polymeric binder.

In some embodiments, the proportion of each of the structural unit (a) derived from an acid group-containing monomer and the structural unit (b) derived from a nitrile group-containing monomer is independently less than 85%, less than 80%, less than 75%, less than 70%, less than 65%, less than 60%, less than 55%, less than 50%, less than 45%, less than 40%, less than 35%, less than 30%, less than 25%, less than 20% or less than 15% by mole, based on the total number of moles of monomeric units in the copolymer in the polymeric binder. In some embodiments, the proportion of each of the structural unit (a) derived from an acid group-containing monomer and the structural unit (b) derived from a nitrile group-containing monomer is independently more than 5%, more than 10%, more than 15%, more than 20%, more than 25%, more than 30%, more than 35%, more than 40%, more than 45%, more than 50%, more than 55%, more than 60%, more than 65%, more than 70% or more than 75% by mole, based on the total number of moles of monomeric units in the copolymer in the polymeric binder.

Structural unit (c) is derived from an amide group-containing monomer. Any monomer that has at least one amide group may be used as amide group-containing monomer without any specific limitations. In some embodiments, the amide group-containing monomer is acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl)methacrylamide, N-(ethoxymethyl) methacrylamide, N-(propoxymethyl)methacrylamide, N-(butoxymethyl)methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide or a combination thereof.

In some embodiments, the proportion of structural unit (c) derived from an amide group-containing monomer is from about 0% to about 85%, from about 0% to about 75%, from about 0% to about 65%, from about 0% to about 55%, from about 0% to about 45%, from about 0% to about 35%, from about 2% to about 35%, from about 5% to about 35%, from about 10% to about 85%, from about 10% to about 75%, from about 10% to about 65%, from about 10% to about 55%, from about 10% to about 45%, from about 10% to about 35%, from about 12% to about 35%, from about 14% to about 35%, from about 16% to about 35%, from about 18% to about 35%, from about 20% to about 35%, from about 20% to about 34%, from about 20% to about 32%, from about 20% to about 30%, from about 0% to about 34%, from about 0% to about 32%, from about 0% to about 30%, from about 1% to about 28%, from about 1% to about 26%, from about 1% to about 24%, from about 1% to about 22%, from about 1% to about 20%, from about 5% to about 30% or from about 10% to about 30% by mole, based on the total number of moles of monomeric units in the copolymer in the polymeric binder.

In some embodiments, the proportion of structural unit (c) derived from an amide group-containing monomer is less than 85%, less than 75%, less than 65%, less than 55%, less than 45%, less than 35%, less than 33%, less than 31%, less than 30%, less than 28%, less than 26%, less than 24%, less than 22%, less than 20%, less than 18%, less than 16%, less than 14%, less than 12%, less than 10%, less than 8%, less than 6% or less than 4% by mole, based on the total number of moles of monomeric units in the copolymer in the polymeric binder. In some embodiments, the proportion of structural unit (c) derived from an amide group-containing monomer is more than 0%, more than 2%, more than 4%, more than 6%, more than 8%, more than 10%, more than 12%, more than 14%, more than 16%, more than 18%, more than 20%, more than 22%, more than 24%, more than 26%, more than 28%, more than 30%, more than 32%, more than 35%, more than 45%, more than 55%, more than 65% or more than 75% by mole, based on the total number of moles of monomeric units in the copolymer in the polymeric binder.

Structural unit (d) is derived from a hydroxyl group-containing monomer. Any monomer that has at least one hydroxyl group may be used as hydroxyl group-containing monomer without any specific limitations. In some embodiments, the hydroxyl group-containing monomer is a $C_1$ to $C_{20}$ alkyl group or a $C_5$ to $C_{20}$ cycloalkyl group-containing methacrylate having a hydroxyl group. In some embodiments, the hydroxyl group-containing monomer is 2-hydroxyethylacrylate, 2-hydroxyethyl methacrylate, 2-hydroxypropyl acrylate, 2-hydroxypropyl methacrylate, 2-hydroxybutyl methacrylate, 3-hydroxypropylacrylate, 3-hydroxypropylmethacrylate, 4-hydroxybutyl methacrylate, 5-hydroxypentylacrylate, 6-hydroxyhexyl methacrylate, 1,4-cyclohexanedimethanol mono(meth)acrylate, 3-chloro-2-hydroxypropyl methacrylate, diethylene glycol mono(meth)acrylate, allyl alcohol or a combination thereof.

Structural unit (e) is derived from an ester group-containing monomer. Any monomer that has at least one ester group may be used as ester group-containing monomer without any specific limitations. In some embodiments, the ester group-containing monomer is $C_1$ to $C_{20}$ alkyl acrylate, $C_1$ to $C_{20}$ alkyl (meth)acrylate, cycloalkyl acrylate or a combination thereof. In some embodiments, the ester group-containing monomer is methyl acrylate, ethyl acrylate, n-propyl acrylate, isopropyl acrylate, n-butyl acrylate, sec-butyl acrylate, tert-butyl acrylate, pentyl acrylate, hexyl acrylate, heptyl acrylate, octyl acrylate, 3,3,5-trimethylhexyl acrylate, 2-ethylhexyl acrylate, nonyl acrylate, decyl acrylate, lauryl acrylate, n-tetradecyl acrylate, n-octadecyl acrylate, cyclohexyl acrylate, phenyl acrylate, methoxymethyl acrylate, methoxyethyl acrylate, ethoxymethyl acrylate, ethoxyethyl acrylate, perfluorooctyl acrylate, stearyl acrylate or a combination thereof. In some embodiments, the ester group-containing monomer is cyclohexyl acrylate, cyclohexyl methacrylate, isobornyl acrylate, isobornyl methacrylate, 3,3,5-trimethylcyclohexylacrylate, or a combination thereof. In some embodiments, the ester group-containing monomer is methyl methacrylate, ethyl methacrylate, n-propyl methacrylate, isopropyl methacrylate, n-butyl methacrylate, sec-butyl methacrylate, tert-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, 2,2,2-trifluoroethyl methacrylate, phenyl methacrylate, benzyl methacrylate, or a combination thereof.

Structural unit (f) is derived from an epoxy group-containing monomer. Any monomer that has at least one epoxy group may be used as epoxy group-containing monomer without any specific limitations. In some embodiments, the epoxy group-containing monomer is vinyl glycidyl ether, allyl glycidyl ether, allyl 2,3-epoxypropyl ether, butenyl glycidyl ether, butadiene monoepoxide, chloroprene monoepoxide, 3,4-epoxy-1-butene, 4,5-epoxy-2-pentene, 3,4-epoxy-1-vinylcyclohexane, 1,2-epoxy-4-vinylcyclohexane, 3,4-epoxy cyclohexylethylene, epoxy-4-vinylcyclohexene, 1,2-epoxy-5,9-cyclododecadiene or a combination thereof. In some embodiments, the epoxy group-containing monomer is 3,4-epoxy-1-butene, 1,2-epoxy-5-hexene, 1,2-epoxy-9-decene, glycidyl acrylate, glycidyl methacrylate, glycidyl crotonate, glycidyl 2,4-dimethyl pentenoate, glycidyl 4-hexenoate, glycidyl 4-heptenoate, glycidyl 5-methyl-4-heptenoate, glycidyl sorbate, glycidyl linoleate, glycidyl oleate, glycidyl 3-butenoate, glycidyl 3-pentenoate, glycidyl-4-methyl-3-pentenoate or a combination thereof.

Structural unit (g) is derived from a fluorine-containing monomer. Any monomer that has at least one fluorine atom may be used as fluorine-containing monomer without any specific limitations. In some embodiments, the fluorine-containing monomer is a $C_1$ to $C_{20}$ alkyl group-containing acrylate, methacrylate or a combination thereof having at least one fluorine atom. In some embodiments, the fluorine-containing monomer is perfluoro alkyl acrylate such as perfluoro dodecyl acrylate, perfluoro n-octyl acrylate, perfluoro n-butyl acrylate, perfluoro hexylethyl acrylate and perfluoro octylethyl acrylate; perfluoro alkyl methacrylate such as perfluoro dodecyl methacrylate, perfluoro n-octyl methacrylate, perfluoro n-butyl methacrylate, perfluoro hexylethyl methacrylate and perfluoro octylethyl methacrylate; perfluoro oxyalkyl acrylate such as perfluoro dodecyloxyethyl acrylate and perfluoro decyloxyethyl acrylate; perfluoro oxyalkyl methacrylate such as perfluoro dodecyloxyethyl methacrylate and perfluoro decyloxyethyl methacrylate and combinations thereof. In some embodiments, the fluorine-containing monomer is a carboxylate containing at least one $C_1$ to $C_{20}$ alkyl group and at least one fluorine atom; wherein the carboxylate is selected from the group consisting of crotonate, malate, fumarate, itaconate and combinations thereof. In some embodiments, the fluorine-containing monomer is vinyl fluoride, trifluoroethylene, trifluorochloroethylene, fluoroalkyl vinyl ether, perfluoroalkyl vinyl ether, hexafluoropropylene, 2,3,3,3-tetrafluoropropene, vinylidene fluoride, tetrafluoroethylene, 2-fluoro acrylate and combinations thereof.

In some embodiments, the proportion of each of structural unit (d) derived from a hydroxyl group-containing monomer, structural unit (e) derived from an ester group-containing monomer, structural unit (f) derived from an epoxy group-containing monomer and structural unit (g) derived from a fluorine-containing monomer is independently from about 0% to about 85%, from about 0% to about 80%, from about 0% to about 70%, from about 0% to about 60%, from about 0% to about 50%, from about 5% to about 50%, from about 10% to about 85%, from about 10% to about 70%, from about 10% to about 60%, from about 10% to about 50%, from about 15% to about 50%, from about 20% to about 50%, from about 20% to about 45%, from about 20% to about 40%, from about 0% to about 45%, from about 0% to about 40%, from about 0% to about 35%, from about 0% to about 30%, from about 2% to about 45%, from about 2% to about 40%, from about 2% to about 35%, from about 2% to about 30%, from about 2% to about 25%, from about 5% to about 45%, from about 5% to about 40%, from about 5% to about 35%, from about 5% to about 30%, from about 10% to about 45%, from about 10% to about 40%, from about 10% to about 35% or from about 10% to about 30% by mole, based on the total number of moles of monomeric units in the copolymer in the polymeric binder.

In some embodiments, the proportion of each of structural unit (d) derived from a hydroxyl group-containing monomer, structural unit (e) derived from an ester group-containing monomer, structural unit (f) derived from an epoxy group-containing monomer and structural unit (g) derived from a fluorine-containing monomer is independently less than 85%, less than 80%, less than 75%, less than 70%, less than 65%, less than 60%, less than 55%, less than 50%, less than 45%, less than 40%, less than 35%, less than 30%, less than 25%, less than 20%, less than 15%, less than 10% or less than 5% by mole, based on the total number of moles of monomeric units in the copolymer in the polymeric binder. In some embodiments, the proportion of each of structural unit (d) derived from a hydroxyl group-containing monomer, structural unit (e) derived from an ester group-containing monomer, structural unit (f) derived from an epoxy group-containing monomer and structural unit (g) derived from a fluorine-containing monomer is independently more than 0%, more than 5%, more than 10%, more than 15%, more than 20%, more than 25%, more than 30%, more than 35%, more than 40%, more than 45%, more than 50%, more than 55%, more than 60%, more than 65%, more than 70% or more than 75% by mole, based on the total number of moles of monomeric units in the copolymer in the polymeric binder.

In other embodiments, the copolymer may additionally comprise a structural unit derived from an olefin. Any hydrocarbon that has at least one carbon-carbon double bond may be used as an olefin without any specific limitations. In some embodiments, the olefin includes a $C_2$ to $C_{20}$ aliphatic compound, a $C_8$ to $C_{20}$ aromatic compound or a cyclic compound containing vinylic unsaturation, a $C_4$ to $C_{40}$ diene or a combination thereof. In some embodiments, the olefin is styrene, ethylene, propylene, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, cyclobutene, 3-methyl-1-pentene, 4-methyl-1-pentene, 4,6-dimethyl-1-heptene, 4-vinylcyclohexene, vinyl cyclohexane, norbornene, norbornadiene, ethylidene norbornene, cyclopentene, cyclohexene, dicyclopentadiene, cyclooctene or a combination thereof. In some embodiments, the copolymer does not comprise a structural unit derived from an olefin. In some embodiments, the copolymer does not comprise styrene, ethylene, propylene, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, cyclobutene, 3-methyl-1-pentene, 4-methyl-1-pentene, 4,6-dimethyl-1-heptene, 4-vinylcyclohexene, vinyl cyclohexane, norbornene, norbornadiene, ethylidene norbornene, cyclopentene, cyclohexene, dicyclopentadiene or cyclooctene.

A conjugated diene group-containing monomer constitutes as an olefin. In some embodiments, a conjugated diene group-containing monomer is $C_4$ to $C_{40}$ dienes, aliphatic conjugated diene monomers such as 1,3-butadiene, 1,3-pentadiene, 1,4-hexadiene, 1,5-hexadiene, 1,7-octadiene, 1,9-decadiene, isoprene, myrcene, 2-methyl-1,3-butadiene, 2,3-dimethyl-1,3-butadiene, 2-chloro-1,3-butadiene, substituted linear conjugated pentadienes, substituted side chain conjugated hexadienes or a combination thereof. In some embodiments, the copolymer does not comprise $C_4$ to $C_{40}$ dienes, aliphatic conjugated diene monomers such as 1,3-butadiene, 1,3-pentadiene, 1,4-hexadiene, 1,5-hexadiene, 1,7-octadiene, 1,9-decadiene, isoprene, myrcene, 2-methyl-1,3-butadiene, 2,3-dimethyl-1,3-butadiene, 2-chloro-1,3-butadiene, substituted linear conjugated pentadienes or substituted side chain conjugated hexadienes.

In other embodiments, the copolymer may additionally comprise a structural unit derived from an aromatic vinyl group-containing monomer. In some embodiments, the aromatic vinyl group-containing monomer is styrene, α-methylstyrene, vinyltoluene, divinylbenzene or a combination thereof. In some embodiments, the copolymer does not comprise a structural unit derived from an aromatic vinyl group-containing monomer. In some embodiments, the copolymer does not comprise styrene, α-methylstyrene, vinyltoluene or divinylbenzene.

In some embodiments, the electrode layer material has a two-layered structure comprising an outer layer and an inner layer, wherein each of the inner layer and the outer layer independently comprises a polymeric binder.

In some embodiments, the polymeric binder is selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly(vinyl ester), polyvinyl chloride, polyether, polyphenylene oxide, cellulose polymer and combinations thereof. In some embodiments, the polymeric binder in the inner layer and the outer layer may be the same, different or partially different.

The current collector acts to collect electrons generated by electrochemical reactions of the cathode active material or to supply electrons required for the electrochemical reactions. In some embodiments, the current collector can be in the form of a foil, sheet or film. In some embodiments, the current collector is a metal. In some embodiments, the current collector is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof. In some embodiments, the current collector further comprises an electrically-conductive resin.

In certain embodiments, the current collector has a two-layered structure comprising an outer layer and an inner layer, wherein the outer layer comprises a conductive material and the inner layer comprises an insulating material or another conductive material; for example, a polymeric insulating material coated with an aluminum layer or an aluminum mounted with a conductive resin layer. In some embodiments, the conductive material is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin and combinations thereof.

In some embodiments, the current collector has a three-layered structure comprising an outer layer, a middle layer and an inner layer, wherein the outer and inner layers comprise a conductive material and the middle layer comprises an insulating material or another conductive material; for example, a plastic material coated with a metal layer on both sides. In certain embodiments, each of the outer layer, middle layer and inner layer is independently stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin or combinations thereof.

In some embodiments, the insulating material is a polymeric material selected from the group consisting of polycarbonate, polyacrylate, polyacrylonitrile, polyester, polyamide, polystyrene, polyurethane, polyepoxy, poly (acrylonitrile butadiene styrene), polyimide, polyolefin, polyethylene, polypropylene, polyphenylene sulfide, poly (vinyl ester), polyvinyl chloride, polyether, polyphenylene oxide, cellulose polymer and combinations thereof. In certain embodiments, the current collector has more than three layers. In some embodiments, the current collector is coated with a protective coating. In certain embodiments, the protective coating comprises a carbon-containing material. In some embodiments, the current collector is not coated with a protective coating.

The thickness of the current collector affects the volume it occupies within the battery, the amount of the electrode active material needed, and hence the capacity in the battery. In some embodiments, the current collector has a thickness from about 5 $\mu$m to about 30 $\mu$m. In certain embodiments, the current collector has a thickness from about 5 $\mu$m to about 20 $\mu$m, from about 5 $\mu$m to about 15 $\mu$m, from about 10 $\mu$m to about 30 $\mu$m, from about 10 $\mu$m to about 25 $\mu$m, or from about 10 $\mu$m to about 20 $\mu$m.

In some embodiments, the current collector has a thickness of less than 30 $\mu$m, less than 25 $\mu$m, less than 20 $\mu$m, less than 15 $\mu$m, less than 10 $\mu$m or less than 5 $\mu$m. In some embodiments, the current collector has a thickness of more than 5 $\mu$m, more than 10 $\mu$m, more than 15 $\mu$m, more than 20 $\mu$m or more than 25 $\mu$m.

Quite often, current collector is exposed to ambient air for a period of time prior to applying an electrode layer material on the surface(s) of the current collector. Ambient air contains primarily oxygen, water and several organic and inorganic species.

Upon exposure of current collector to naturally occurring oxygen in the atmosphere, it is inevitable for metal oxide to be developed on the current collector surface(s). For example, metallic aluminium is naturally very reactive with atmospheric oxygen, initiating the formation of aluminium oxide on the exposed aluminium surface(s). This aluminium oxide protects the aluminium contained within from undergoing further oxidation and consequently develops a good corrosion resistance. As the metal oxide on the surface of the current collector comes into contact with moisture in ambient air, hydroxylation of the metal oxide occurs, enriching the surface of the metal oxide with hydroxyl (—OH) groups. However, an overabundance of hydroxyl groups tends to make a current collector surface hygroscopic. For that reason, exposure of current collector to ambient air for a prolong period of time is not recommended.

The hydroxyl group at the current collector surface consists of a H atom covalently bonded to a more electronegative O atom and an electronegative O atom bearing a lone pair of electrons in the outmost electron shell, either of which is capable of forming hydrogen bond with another molecule (e.g. a monomer that assists in the construction of the polymeric binder in the electrode layer material) of the same feature (i.e. containing a H atom which is covalently bonded to a hydrogen bond donor and/or a hydrogen bond acceptor).

Meanwhile, metal parts of the current collector are still present on the current collector surface in forms of a partially positively charged metal species ($M^{\delta+}$), as part of an ionic lattice, for example in the metal oxide developed on the current collector surface.

Figure 3:
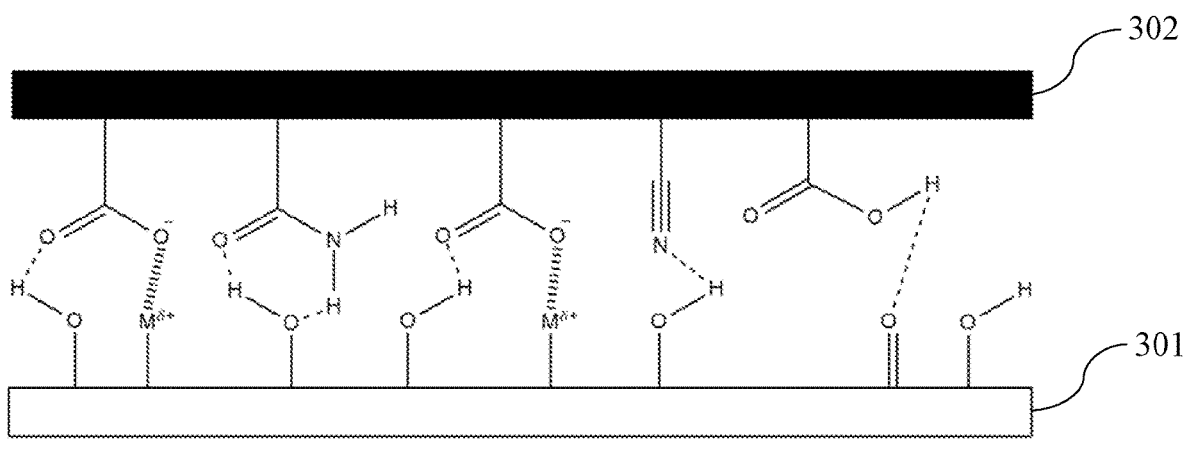
FIG. 3 illustrates a schematic of an embodiment of the proposed electrode layer material-current collector interfacial structure of an electrode.

FIG. 3 illustrates a schematic of an embodiment of the proposed electrode layer material-current collector interfacial structure of an electrode, represented by 300. Hydroxyl (—OH) groups, partially positively charged metal species ($M^{\delta+}$) and oxygen (O) atoms of the metal oxide are present on the surface of the current collector 301. Polymeric binder contained within the electrode layer material 302 and/or at the surface of the electrode layer material 302 comprises a copolymer comprising structural units derived from a carboxylic acid group-containing monomer, a nitrile group-containing monomer and an amide group-containing monomer. The structural unit derived from a carboxylic acid group-containing monomer in this case comprises a carboxylic salt group, wherein a carboxylic salt group is a salt of a carboxylic acid group.

Oxygen (O), hydrogen (H) and nitrogen (N) atoms present in the copolymer of polymeric binder are likely to interact with the O and/or H atoms of the hydroxyl groups and the O atom(s) in metal oxide at the current collector surface via hydrogen bond formations. In addition, an ion-dipole interaction is exerted between the anion of the carboxylic salt group, $COO^-$ in this case, contained within polymeric binder and the $M^{\delta+}$ species at the current collector surface. Hydrogen bonding and/or ion-dipole attractions are the two types of interactions primarily formed at the electrode layer material-current collector interface and thus independently contribute considerably to the adhesion of the electrode layer material onto the surface of the current collector.

Interactions between the electrode layer material and the current collector surface could proceed through other means, for instance via ionic interactions, London dispersion forces, dipole-dipole interactions, dipole-induced dipole interactions and ion-induced dipole interactions. However, in consideration of the molecular structures of the polymeric binder contained within the electrode layer material and at the electrode layer material-current collector interfacial surface, the principal electrostatic interactions that give rise to adhesion of the polymeric binder (and hence the electrode layer material) to the current collector surface occur via hydrogen bonding and/or ion-dipole interactions. The other interactions mentioned above that could arise between the electrode layer material and the surface of the current collector may also be disrupted based on the proposed mechanism via the introduction of the delamination agent and solvation of charged or partially charged species. These interactions are not displayed for ease of interpretation.

The polymeric binders disclosed herein are formulated to provide an exceptionally strong electrode layer material-current collector adhesion. Based on our studies, the copolymer comprising a structural unit derived from an acid group-containing monomer and a structural unit derived from a hydrogen bond-forming group-containing monomer (ii) is found to exhibit a strong adhesive capability. For that reason, with the adhesive strength being the attribute of utmost importance for a binder material, the presence of both of a structural unit derived from an acid group-containing monomer and a structural unit derived from a hydrogen bond-forming group-containing monomer (ii) in the copolymer of the polymeric binder is recommended.

The combination of structural units derived from an acid group-containing monomer and a hydrogen bond-forming group-containing monomer (ii) in the copolymer not only severely improves the binding capability of the polymeric binder, but also helps develop abrasion resistance and solvent resistance. However, the strong adhesion presents an added challenge in the detachment of the electrode layer material from its associated current collector in the subsequent recycling step as the battery reaches the end of its lifespan or as the battery rejects are generated during production.

Delamination of the electrode layer material from the current collector in the battery electrode is accomplished via bond disruption and/or breakage between the copolymer of polymeric binder in the electrode layer material and the current collector surface. Copolymers of different compositions that display varying specific properties would require different approaches to separate the electrode layer material from the current collector. Accordingly, the delamination steps of the method of the present invention are specifically developed to delaminate an electrode by disrupting and/or breaking the bonds between the polymeric binders disclosed herein and a current collector surface. More specifically, the delamination steps are developed to delaminate a copolymer comprising a structural unit derived from an acid group-containing monomer and a structural unit derived from a hydrogen bond-forming group-containing monomer (ii) from a current collector surface.

As part of the method for recycling a battery electrode as disclosed herein, the electrode is first delaminated by immersing the electrode into a delamination solution; wherein the electrode comprises a current collector and an electrode layer material coated on one side or both sides of the current collector; wherein the electrode layer material comprises a polymeric binder; and wherein the polymeric binder comprises a copolymer comprising a structural unit derived from an acid group-containing monomer and a structural unit derived from a hydrogen bond-forming group-containing monomer (ii).

In some embodiments, delamination of the electrode occurs along the electrode layer material-current collector interface. The delamination of the electrode is attained via disruption and/or breaking of the various types of interactions between the current collector surface and the polymeric binder in the electrode layer material that is specifically located along the electrode layer material-current collector interface.

In some embodiments, the delamination solution comprises a delamination agent and an aqueous solvent. In some embodiments, the delamination solution is prepared by dispersing a delamination agent into an aqueous solvent.

In some embodiments, the delamination agent is a weak acid. Weak acid is one that does not fully ionize or dissociate to produce hydrogen ions when dissolved in water. In some embodiments, the weak acid is an organic acid. In some embodiments, the organic acid is selected from the group consisting of formic acid, acetic acid, glycolic acid, glyoxylic acid, oxalic acid, propionic acid, acrylic acid, propiolic acid, lactic acid, 3-hydroxypropionic acid, glyceric acid, pyruvic acid, 3-oxopropionic acid, 2,3-dioxopropionic acid, malonic acid, tartronic acid, dihydroxymalonic acid, mesoxalic acid, glycidic acid, butyric acid, isobutyric acid, crotonic acid, isocrotonic acid, methacrylic acid, vinylacetic acid, tetrolic acid, 2-hydroxybutyric acid, 3-hydroxybutyric acid, 4-hydroxybutyric acid, 2-oxobutanoic acid, acetoacetic acid, 4-oxobutanoic acid, butanedioic acid, methylmalonic acid, fumaric acid, maleic acid, 2-hydroxybutanedioic acid, tartaric acid, oxaloacetic acid, dioxosuccinic acid, valeric acid, isovaleric acid, 2-methylbutyric acid, pivalic acid, 3-hydroxyvaleric acid, 4-hydroxypentanoic acid, 3-hydroxyisovaleric acid, glutaric acid, 2-oxoglutaric acid, 3-oxoglutaric acid, 2-furoic acid, tetrahydrofuroic acid, hexanoic acid, hexanedioic acid, citric acid, aconitic acid, isocitric acid, sorbic acid, pimelic acid, benzoic acid, salicylic acid, 4-carboxybenzoic acid, trimesic acid, mellitic acid, malic acid, dithionous acid, orthosilicic acid and combinations thereof.

In some embodiments, the weak acid is phosphoric acid, nitrous acid or combinations thereof.

In some embodiments, the aqueous solvent is a solution containing water as the major component and a volatile solvent, such as alcohols, lower aliphatic ketones, lower alkyl acetates or the like, as the minor component in addition to water. In some embodiments, the proportion of water in the aqueous solvent is from about 51% to about 100%, from about 60% to about 100%, from about 65% to about 100%, from about 70% to about 100%, from about 75% to about 100% or from about 80% to about 100% by weight.

In some embodiments, the proportion of water in the aqueous solvent is more than 50%, more than 60%, more than 70%, more than 80%, more than 90% or more than 95% by weight. In some embodiments, the proportion of water in the aqueous solvent is less than 55%, less than 65%, less than 75%, less than 85% or less than 95% by weight. In some embodiments, the aqueous solvent consists solely of water, that is, the proportion of water in the aqueous solvent is 100% by weight.

Some non-limiting examples of water include tap water, bottled water, purified water, pure water, distilled water, de-ionized water, $D_2O$, or a combination thereof. In some embodiments, the aqueous solvent is de-ionized water. Water may be applied as part of the delamination solution to form solvation shells around various charged or partially charged species present in the polymeric binder of the electrode layer material and the current collector surface at the electrode layer material-current collector surface interface. This helps to disrupt the interactions between the polymeric binder in the electrode layer material and the current collector surface and consequently gives rise to the complete delamination of the electrode.

Any water-miscible solvents or volatile solvents can be used as the minor component (i.e. solvents other than water) of the aqueous solvent. Some non-limiting examples of the water-miscible solvents or volatile solvents include alcohols, lower aliphatic ketones, lower alkyl acetates and combinations thereof. The addition of alcohol can improve the solubility of the delamination agent. Some non-limiting examples of the alcohol include $C_1$-$C_4$ alcohols, such as methanol, ethanol, isopropanol, n-propanol, tert-butanol, n-butanol and combinations thereof. In some embodiments, the aqueous solvent does not comprise an alcohol, a lower aliphatic ketone, a lower alkyl acetate or combinations thereof.

Within the delamination solution, a weak acid partially dissociates in an aqueous solvent with the release of a proton (i.e. hydrogen ion $H^+$), forming a hydroxonium ion. This allows the presence of both the undissociated weak acid and its dissociation products in the delamination solution. The said weak acid dissociation reaction is generally denoted as:

$$HA_1 + H_2O \rightleftharpoons H_3O^+ + A_1^- \qquad \text{(Equation 1)}$$

wherein $HA_1$ is a weak acid; $H_3O^+$ is a hydroxonium ion and $A_1^-$ is a conjugate base of the weak acid $HA_1$.

As the electrode is immersed into a delamination solution, the protons released from the partial dissociation of the weak acid interact with the hydroxyl (—OH) groups that are initially formed on the current collector surface. This brings about the formation of oxidaniumyl groups ($H_2O^+$) on the current collector surface. In other words, the following reaction occurs:

$$aH_3O^+ + M(OH)_a \rightleftharpoons M(H_2O^+)_a + aH_2O \qquad \text{(Equation 2)}$$

wherein M refers to the metal that is used as the current collector; a refers to the oxidation state of the metal M and $H_2O^+$ refers to an oxidaniumyl group.

Some non-limiting examples of structural units within the copolymer in the polymeric binder that carry functional groups which can form hydrogen bonding with the hydroxyl groups at the current collector surface include structural units derived from an acid group-containing monomer, a nitrile group-containing monomer, an amide group-containing monomer, a hydroxyl group-containing monomer, an ester group-containing monomer, an epoxy group-containing monomer, a fluorine-containing monomer or combinations thereof.

The formation of oxidaniumyl groups ($H_2O^+$) on the current collector surface removes the hydrogen bond-forming sites that are originally present at the current collector surface which disrupts and breaks up the hydrogen bonds that are initially formed between the polymeric binder in the electrode layer material and the hydroxyl groups at the current collector surface. In addition, the weak acid $HA_1$ and the conjugate base of the weak acid $A_1^-$ could compete with the polymeric binder over the remaining hydrogen bond-forming sites at the current collector surface, further reducing the extent of hydrogen bonding formed between the electrode layer material and the current collector surface.

Meanwhile, the conjugate base of the weak acid $A_1^-$ has a tendency to compete with polymeric binder over ion-dipole interacting sites (e.g. partially positively charged metal species $M^{\delta+}$) at the current collector surface, which reduces the degree of ion-dipole interactions between the polymeric binder in the electrode layer material and $M^{\delta+}$ at the current collector surface and thus leads to disruption of the ion-dipole interactions that are initially formed at the electrode layer material-current collector interface. Furthermore, upon exposure of the electrode to a delamination solution, the aqueous solvent (e.g. water) present in the delamination solution brings about disruption to the ion-dipole interactions between the polymeric binder in the electrode layer material and $M^{\delta+}$ at the current collector surface. Charged and partially charged species (e.g. charged species within the polymeric binder and partially positively charged metal species $M^{\delta+}$ at the current collector surface) interact strongly with the aqueous solvent. The aqueous solvent molecules solvate the charged or partially charged species by orientating the appropriate partially charged portion of the aqueous solvent molecules towards the charged or partially charged species through electrostatic attraction. This creates solvation shells (hydration shells in the case of water) around each charged or partially charged species which severely diminishes the strength of ion-dipole interactions between the polymeric binder of the electrode layer material and the current collector. Any acid salt groups and/or acid groups contained within the polymeric binder in the electrode layer material may also undergo proton transfer reactions.

Consequently, immersion of the electrode into a delamination solution comprising a delamination agent (e.g. a weak acid) and an aqueous solvent (e.g. water) would undoubtedly result in reductions in both hydrogen bonding and ion-dipole interactions between the polymeric binder in the electrode layer material and the current collector surface, with weak acid primarily responsible for interrupting hydrogen bond interactions and water directed towards diminishing the ion-dipole interactions. With hydrogen bonding and ion-dipole interactions being the two main types of intermolecular forces formed at the electrode layer material-current collector interface, the combined application of weak acid and water considerably weakens the adhesion of the electrode layer material onto the surface of the current collector, thereby achieving complete delamination of the electrode layer material from the current collector with high degrees of efficacy.

Figure 4:
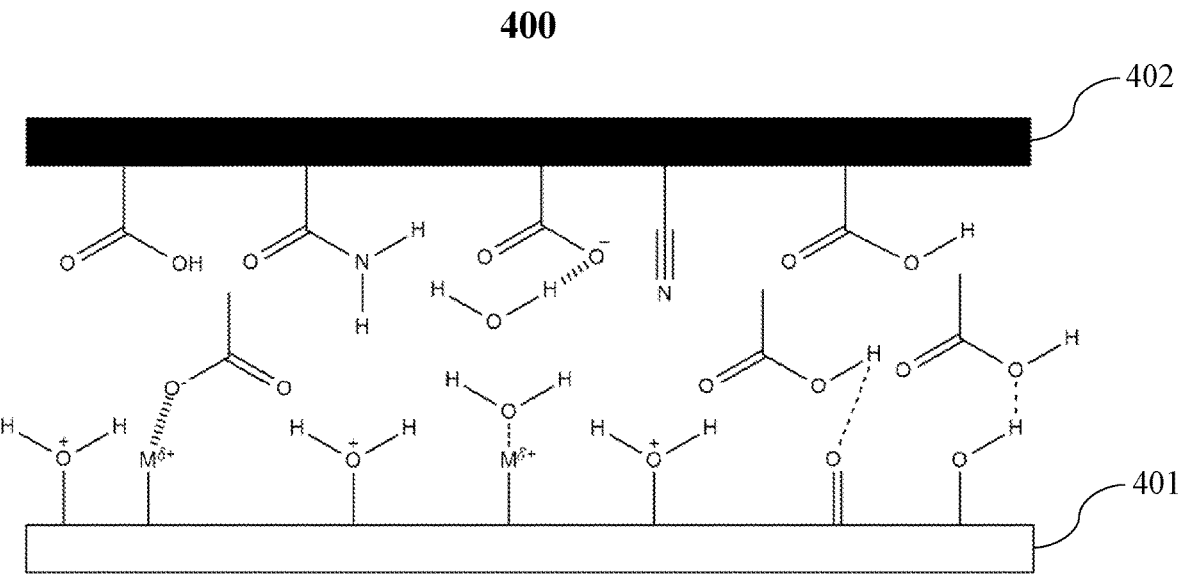
FIG. 4 illustrates a schematic of an embodiment of the proposed electrode layer material-current collector interfacial structure of an electrode when the electrode is immersed in a delamination solution.

FIG. 4, represented by 400, illustrates a schematic of an embodiment of the proposed electrode layer material-current collector interfacial structure of an electrode 400 when the electrode is immersed in a delamination solution. The electrode 400 comprises a current collector 401 with an electrode layer material 402 coated on one side of the current collector 401. Polymeric binder contained within the electrode layer material 402 and/or at the surface of the electrode layer material 402 comprises a copolymer comprising structural units derived from a carboxylic acid group-containing monomer, a nitrile group-containing monomer and an amide group-containing monomer. The delamination solution in this case comprises acetic acid (a weak acid) of 0.50 wt % concentration and water.

The acetic acid undergoes partial dissociation with the release of protons (i.e. $H^+$) which interact with the initially formed hydroxyl groups at the current collector surface, forming oxidaniumyl groups ($H_2O^+$). This prohibits the hydroxyl groups from acting as hydrogen bond-forming sites which breaks up the hydrogen bonds that are originally formed between the polymeric binder in the electrode layer material and the hydroxyl groups at the current collector surface. The acetic acid also competes with the polymeric binder over the remaining hydrogen bond-forming sites such as the residual hydroxyl groups and oxygen atom(s) in the metal oxide at the current collector surface, further lowering the extent of hydrogen bonds formed between the electrode layer material and the current collector interface.

Acetate formed from the partial dissociation of acetic acid competes with the polymeric binder over partially positively charged metal species $M^{\delta+}$ (ion-dipole interacting sites) at the current collector surface, disrupting the ion-dipole interactions between the polymeric binder and the $M^{\delta+}$ at the current collector surface. In addition, the water further diminishes the strength of the ion-dipole interactions between charged species (i.e. anion of the carboxylic salt group $COO^-$ in this case) within the polymeric binder in the electrode layer material and the partially positively charged metal species $M^{\delta+}$ at the current collector surface by inducing solvation.

The anion of the carboxylic salt group, $COO^-$, within the polymeric binder that is originally present in the electrode layer material 402 is also shown to accept a proton in forming a carboxylic acid group, COOH.

The application of acetic acid and water in combination substantially diminishes the adhesion between the electrode layer material and current collector surface, and thus highly effective and complete delamination of the electrode layer material from the current collector surface is accomplished.

The delamination solution aims to diminish the strength of interactions between the polymeric binder containing within the electrode layer material and the current collector surface and thus reduce the adhesion of the polymeric binder to the current collector. This brings about the delamination of the electrode layer material from the current collector. The use of delamination agent and aqueous solvent independently as the delamination solution may be inadequate in attaining a complete delamination of the electrode layer material from the current collector.

The use of aqueous solvent alone as the delamination solution may be insufficient in completely delaminating the electrode layer material from the current collector as the uncharged copolymer constituents do not possess the ability to interact with the current collector surface via ion-dipole interactions. Solvation ability of the aqueous solvent on these uncharged copolymer constituents would be noticeably lower and the interactions, mostly hydrogen bonding, between these copolymer constituents within the electrode layer material and the current collector surface would often not be disrupted and diminished to an extent where complete delamination of the electrode is made possible.

Therefore, a delamination agent and an aqueous solvent are to be used in conjunction as the delamination solution to achieve superior delamination performance of the electrode.

The purpose of the delamination agent is to interrupt and break the ion-dipole interactions and hydrogen bonding interactions between the polymeric binder contained in the electrode layer material and the current collector surface. A sufficient amount of delamination agent in the delamination solution is required to give rise to the disruption of interactions between the electrode layer material and the current collector and thus delamination of the electrode. However, relatively low concentrations of the delamination agent are adequate to induce disruption of the interactions between the polymeric binder within the electrode layer material and the current collector surface. The use of delamination agent of low concentrations for immersion of the electrode reduces the likelihood of corrosion of the current collector and dissolution of other metal constituents of the electrode and/or mitigates side reaction(s) that might arise from the use of high-concentration delamination agent. In some embodiments, the concentration of the delamination agent in the delamination solution is from about 0.01% to about 3.5%, from about 0.01% to about 3%, from about 0.01% to about 2.5%, from about 0.01% to about 2%, from about 0.01% to about 1.5%, from about 0.01% to about 1%, from about 0.1% to about 3.5%, from about 0.1% to about 3%, from about 0.1% to about 2.5%, from about 0.1% to about 2%, from about 0.1% to about 1.5%, from about 0.1% to about 1%, from about 0.25% to about 3.5%, from about 0.25% to about 3%, from about 0.25% to about 2.5%, from about 0.25% to about 2%, from about 0.5% to about 3.5%, from about 0.5% to about 3%, from about 0.5% to about 2.5%, from about 0.5% to about 2%, from about 1% to about 3.5% or from about 1% to about 3% by weight, based on the total weight of the delamination solution.

In some embodiments, the concentration of the delamination agent in the delamination solution is less than 3.5%, less than 3%, less than 2.5%, less than 2%, less than 1.5%, less than 1% or less than 0.5% by weight, based on the total weight of the delamination solution. In some embodiments, the concentration of the delamination agent in the delamination solution is more than 0.01%, more than 0.1%, more than 0.25%, more than 0.5%, more than 1%, more than 1.5%, more than 2%, more than 2.5% or more than 3% by weight, based on the total weight of the delamination solution.

With a higher proportion of hydrogen bond-forming group-containing monomer(s) in the copolymer that can form hydrogen bonding with the current collector surface, a relatively higher concentration of delamination agent in the delamination solution can be used for immersion of the electrode since delamination agent is highly effective and is mainly utilized in disrupting hydrogen bond interactions between the electrode layer material and the current collector surface.

Conversely, with a higher proportion of charged functional group(s) (e.g. acid salt group) in the copolymer that is/are capable of developing ion-dipole interactions with the partially positively charged metal species on the current collector surface, a comparatively lower concentration of delamination agent (i.e. higher proportion of the aqueous solvent) in the delamination solution can be used for immersion of the electrode since aqueous solvent is responsible and extremely efficacious in weakening the ion-dipole interactions between the electrode layer material and the current collector surface.

In some embodiments, the electrode may be a cathode or an anode. In some embodiments, the electrode layer material may be a cathode electrode layer material or an anode electrode layer material.

In some embodiments, the electrode layer material further comprises an electrode active material.

In some embodiments, the battery electrode active material is a cathode active material, wherein the cathode active material is selected from the group consisting of $LiCoO_2$, $LiNiO_2$, $LiNi_xMn_yO_2$, $LiCo_xNi_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $Li_2MnO_3$, $LiFeO_2$, $LiFePO_4$, and combinations thereof, wherein each x is independently from 0.1 to 0.9; each y is independently from 0 to 0.9; each z is independently from 0 to 0.4. In certain embodiments, each x in the above general formula is independently selected from 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875 and 0.9; each y in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875 and 0.9; and each z in the above general formula is independently selected from 0, 0.025, 0.05, 0.075, 0.1, 0.125, 0.15, 0.175, 0.2, 0.225, 0.25, 0.275, 0.3, 0.325, 0.35, 0.375 and 0.4. In some embodiments, each x, y and z in the above general formula independently has a 0.01 interval.

In some embodiments, the cathode active material has the general formula $LiMPO_4$, wherein M is selected from the group consisting of Fe, Co, Ni, Mn, Al, Mg, Zn, Ti, La, Ce, Sn, Zr, Ru, Si, Ge and combinations thereof. In some embodiments, the cathode active material is selected from the group consisting of $LiFePO_4$, $LiCoPO_4$, $LiNiPO_4$, $LiMnPO_4$, $LiMnFePO_4$, $LiMn_xFe_{(1-x)}PO_4$ and combinations thereof; wherein $0 < x < 1$. In some embodiments, the cathode active material is $LiNi_xMn_yO_4$; wherein $0.1 \leq x \leq 0.9$ and $0 \leq y \leq 2$. In certain embodiments, the cathode active material is $xLi_2MnO_3 \cdot (1-x)LiMO_2$, wherein M is selected from the group consisting of Ni, Co, Mn and combinations thereof; and wherein $0 < x < 1$. In some embodiments, the cathode active material is $Li_3V_2(PO_4)_3$, $LiVPO_4F$ and combinations thereof. In certain embodiments, the cathode active material has the general formula $Li_2MSiO_4$, wherein M is selected from the group consisting of Fe, Co, Mn, Ni, and combinations thereof.

In certain embodiments, the cathode active material is doped with a dopant selected from the group consisting of Co, Cr, V, Mo, Nb, Pd, F, Na, Fe, Ni, Mn, Al, Mg, Zn, Ti, La, Ce, Sn, Zr, Ru, Si, Ge, and combinations thereof. In some embodiments, the dopant is not Co, Cr, V, Mo, Nb, Pd, F, Na, Fe, Ni, Mn, Mg, Zn, Ti, La, Ce, Ru, Si, or Ge. In certain embodiments, the dopant is not Al, Sn, or Zr.

In some embodiments, the cathode active material is $LiNi_{0.33}Mn_{0.33}Co_{0.33}O_2$ (NMC333), $LiNi_{0.4}Mn_{0.4}Co_{0.2}O_2$, $LiNi_{0.5}Mn_{0.3}Co_{0.2}O_2$ (NMC532), $LiNi_{0.6}Mn_{0.2}Co_{0.2}O_2$ (NMC622), $LiNi_{0.7}Mn_{0.15}Co_{0.15}O_2$, $LiNi_{0.7}Mn_{0.1}Co_{0.2}O_2$, $LiNi_{0.8}Mn_{0.1}Co_{0.1}O_2$ (NMC811), $LiNi_{0.92}Mn_{0.04}Co_{0.04}O_2$, $LiNi_{0.8}Co_{0.15}Al_{0.05}O_2$ (NCA), $LiNiO_2$ (LNO), and combinations thereof.

In other embodiments, the cathode active material is not $LiCoO_2$, $LiNiO_2$, $LiMnO_2$, $LiMn_2O_4$, or $Li_2MnO_3$. In further embodiments, the cathode active material is not $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.7}Mn_{0.1}Co_{0.2}O_2$, $LiNi_{0.8}Mn_{0.1}Co_{0.1}O_2$, $LiNi_{0.92}Mn_{0.04}Co_{0.04}O_2$, or $LiNi_{0.8}Co_{0.15}Al_{0.05}O_2$.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, $LiCo_aNi_bO_2$, $LiMn_aNi_bO_2$, and combinations thereof; wherein $-0.2 \leq x \leq 0.2$, $0 \leq a < 1$, $0 \leq b < 1$, $0 \leq c < 1$, and $a+b+c \leq 1$. In certain embodiments, each x in the above general formula is independently selected from −0.2, −0.175, −0.15, −0.125, −0.1, −0.075, −0.05, −0.025, 0, 0.025, 0.05, 0.075, 0.1, 0.125, 0.15, 0.175 and 0.2; each a in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each b in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each c in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975. In some embodiments, each x, a, b and c in the above general formula independently has a 0.01 interval. In other embodiments, the core and the shell each independently comprise two or more lithium transition metal oxides. In some embodiments, one of the core or shell comprises only one lithium transition metal oxide, while the other comprises two or more lithium transition metal oxides. The lithium transition metal oxide or oxides in the core and the shell may be the same, or they may be different or partially different.

In some embodiments, the electrode active material is an anode active material, wherein the anode active material is selected the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the anode active material is doped with a metallic element or a nonmetal element. In some embodiments, the metallic element is selected from the group consisting of Fe, Ni, Mn, Al, Mg, Zn, Ti, La, Ce, Sn, Zr, Ru and combinations thereof. In some embodiments, the nonmetal element is B, Si, Ge, N, P, F, S, Cl, I, Se and combinations thereof.

In some embodiments, the anode active material comprises or is a core-shell composite having a core and shell structure, wherein the core and the shell each is independently selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the core-shell composite comprises a core comprising a carbonaceous material and a shell coated on the carbonaceous material core. In some embodiments, the carbonaceous material is selected from the group consisting of soft carbon, hard carbon, natural graphite particulate, synthetic graphite particulate, mesocarbon microbeads, Kish graphite, pyrolytic carbon, mesophase pitches, mesophase pitch-based carbon fiber, and combinations thereof. In certain embodiments, the shell is selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In some embodiments, the electrode layer material may additionally comprise other additives for enhancing electrode properties. In some embodiments, the additives may include conductive agents, surfactants, dispersants and flexibility enhancement additives.

In other embodiments, the electrode layer material further comprises a conductive agent. The conductive agent is for enhancing the electrically-conducting property of an electrode. Any suitable material can act as the conductive agent. In some embodiments, the conductive agent is a carbonaceous material. Some non-limiting examples include carbon, carbon black, graphite, expanded graphite, graphene, graphene nanoplatelets, carbon fibers, carbon nano-fibers, graphitized carbon flake, carbon tubes, activated carbon, Super P, 0-dimensional KS6, 1-dimensional vapor grown carbon fibers (VGCF), mesoporous carbon and combinations thereof.

The polymeric binder applied in the present invention exhibits exceptionally strong binding capability. One way in assessing the strength of the adhesion property of a polymeric binder is via the adhesive strength between a polymeric binder and a current collector. It is important for the polymeric binder to have good adhesive strength to the current collector as it promotes the binding force of the electrode layer material to the current collector in the making of battery electrode, prevents separation and enhances the mechanical stability of the electrode. In some embodiments, the adhesive strength between the polymeric binder and the current collector is from about 2 N/cm to about 6 N/cm, from about 2 N/cm to about 5.5 N/cm, from about 2 N/cm to about 5 N/cm, from about 2 N/cm to about 4.5 N/cm, from about 2 N/cm to about 4 N/cm, from about 2 N/cm to about 3.5 N/cm, from about 2 N/cm to about 3 N/cm, from about 2.5 N/cm to about 6 N/cm, from about 3 N/cm to about 6 N/cm, from about 3.5 N/cm to about 6 N/cm, from about 4 N/cm to about 6 N/cm, from about 2.5 N/cm to about 5.5 N/cm, from about 2.5 N/cm to about 5 N/cm, from about 2.5 N/cm to about 4.5 N/cm, from about 2.5 N/cm to about 4 N/cm, from about 2.5 N/cm to about 3.5 N/cm or from about 3 N/cm to about 5 N/cm.

In some embodiments, the adhesive strength between the polymeric binder and the current collector is less than 6

N/cm, less than 5.5 N/cm, less than 5 N/cm, less than 4.5 N/cm, less than 4 N/cm, less than 3.5 N/cm, less than 3 N/cm, or less than 2.5 N/cm. In some embodiments, the adhesive strength between the polymeric binder and the current collector is more than 2 N/cm, more than 2.5 N/cm, more than 3 N/cm, more than 3.5 N/cm, more than 4 N/cm, more than 4.5 N/cm, more than 5 N/cm or more than 5.5 N/cm.

In addition, the polymeric binder applied in the present invention allows the exhibition of strong adhesion of the electrode layer material to the current collector in an electrode. It is important for the electrode layer material to have good peeling strength to the current collector as this would greatly influence the mechanical stability of the electrodes and the cyclability of the battery. Therefore, the electrodes should have sufficient peeling strength to withstand the rigors of battery manufacture. In some embodiments, the peeling strength between the current collector and the electrode layer material is in the range from about 1.0 N/cm to about 8.0 N/cm, from about 1.0 N/cm to about 7.0 N/cm, from about 1.0 N/cm to about 6.0 N/cm, from about 1.0 N/cm to about 5.0 N/cm, from about 1.0 N/cm to about 4.0 N/cm, from about 2.0 N/cm to about 8.0 N/cm, from about 2.0 N/cm to about 7.0 N/cm, from about 2.0 N/cm to about 6.0 N/cm, from about 2.0 N/cm to about 5.0 N/cm, from about 3.0 N/cm to about 8.0 N/cm, from about 3.0 N/cm to about 6.0 N/cm, or from about 4.0 N/cm to about 6.0 N/cm.

In some embodiments, the peeling strength between the current collector and the electrode layer material is 1.0 N/cm or more, 1.5 N/cm or more, 2.0 N/cm or more, 2.5 N/cm or more, 3.0 N/cm or more, 3.5 N/cm or more, 4.5 N/cm or more, 5.0 N/cm or more, 5.5 N/cm or more, 6.0 N/cm or more, 6.5 N/cm or more, 7.0 N/cm or more or 7.5 N/cm or more. In some embodiments, the peeling strength between the current collector and the electrode layer material is less than 8.0 N/cm, less than 7.5 N/cm, less than 7.0 N/cm, less than 6.5 N/cm, less than 6.0 N/cm, less than 5.5 N/cm, less than 5.0 N/cm, less than 4.5 N/cm, less than 4.0 N/cm, less than 3.5 N/cm, less than 3.0 N/cm, less than 2.5 N/cm, less than 2.0 N/cm, or less than 1.5 N/cm.

The amount of delamination solution used for the immersion of the electrode is critical in achieving complete delamination of the electrode layer material from the current collector. When there is an insufficient amount of delamination solution used for immersion of a given amount of electrode, full delamination of the electrode cannot take place. An example of the consequence of which is a large proportion of the electrode layer material might still be found deposited or adhered on the surface of the current collector. On the other hand, in the case where an excessive amount of delamination solution is used for immersion of a given amount of electrode, the additional delamination agent and aqueous solvent used are deemed futile and produces unnecessary contaminated or polluted aqueous solvent waste that requires further treatment steps for solvent reuse. In some embodiments, as the electrode is immersed into the delamination solution to achieve delamination of the electrode, the weight ratio of the electrode to the delamination solution is from about 0.01% to about 15%, from about 0.01% to about 10%, from about 0.05% to about 15%, from about 0.05% to about 10%, from about 0.1% to about 15%, from about 0.1% to about 10%, from about 0.2% to about 15%, from about 0.2% to about 10%, from about 0.3% to about 15%, from about 0.3% to about 10%, from about 0.01% to about 5%, from about 0.01% to about 4.5%, from about 0.01% to about 4%, from about 0.01% to about 3.5%, from about 0.01% to about 3%, from about 0.01% to about 2.5%, from about 0.01% to about 2%, from about 0.01% to about 1.5%, from about 0.01% to about 1%, from about 0.1% to about 5%, from about 0.1% to about 4.5%, from about 0.1% to about 4%, from about 0.1% to about 3.5%, from about 0.1% to about 3%, from about 0.1% to about 2.5%, from about 0.1% to about 2%, from about 0.1% to about 1.5%, from about 0.1% to about 1%, from about 0.2% to about 5%, from about 0.2% to about 4.5%, from about 0.2% to about 4%, from about 0.2% to about 3.5%, from about 0.2% to about 3%, from about 0.2% to about 2.5%, from about 0.2% to about 2%, from about 0.2% to about 1.5%, from about 0.2% to about 1%, from about 0.3% to about 5%, from about 0.3% to about 4.5%, from about 0.3% to about 4%, from about 0.3% to about 3.5%, from about 0.3% to about 3%, from about 0.3% to about 2.5% or from about 0.3% to about 2%.

In some embodiments, as the electrode is immersed into the delamination solution to achieve delamination of the electrode, the weight ratio of the electrode to the delamination solution is less than 15%, less than 13%, less than 10%, less than 8%, less than 5%, less than 4.5%, less than 4%, less than 3.5%, less than 3%, less than 2.5%, less than 2%, less than 1.5%, less than 1% or less than 0.5%. In some embodiments, as the electrode is immersed into the delamination solution to achieve delamination of the electrode, the weight ratio of the electrode to the delamination solution is more than 0.01%, more than 0.05%, more than 0.1%, more than 0.5%, more than 1%, more than 1.5%, more than 2%, more than 2.5%, more than 3%, more than 3.5%, more than 4%, more than 5%, more than 7% or more than 10%.

The time taken for the immersion of the electrode into the delamination solution is crucial in attaining full delamination of the electrode layer material from the current collector. When the electrode is immersed into the delamination solution for an inadequate amount of time, the delamination agent and the aqueous solvent contained in the delamination solution might not possess sufficient time to destabilize, disrupt and break the bonds that are initially formed between the electrode layer material and the current collector surface to an extent that complete delamination of the electrode is made possible. However, as the electrode is immersed into the delamination solution for a prolonged period of time, corrosion of the current collector might occur due to extended contact time of the electrode with the delamination agent (e.g. weak acid) contained within the delamination solution. The utilization of the polymeric binder disclosed herein significantly reduces the amount of time required in achieving complete delamination of the electrode layer material from the current collector. In some embodiments, the electrode is immersed into the delamination solution in forming a heterogeneous mixture for a time period of from about 1 min to 120 mins, from about 1 min to about 100 mins, from about 1 min to about 80 mins, from about 1 min to about 60 mins, from about 5 mins to about 120 mins, from about 5 mins to about 100 mins, from about 5 mins to about 80 mins, from about 5 mins to about 60 mins, from about 10 mins to about 120 mins, from about 10 mins to about 100 mins, from about 10 mins to about 80 mins, from about 10 mins to about 60 mins, from about 15 mins to about 120 mins, from about 15 mins to about 100 mins, from about 20 mins to about 120 mins or from about 20 mins to about 100 mins.

In some embodiments, the electrode is immersed into the delamination solution in forming a heterogeneous mixture for a time period of less than 120 mins, less than 100 mins, less than 80 mins, less than 60 mins, less than 40 mins, less than 20 mins, less than 15 mins, less than 10 mins or less than 5 mins. In some embodiments, the electrode is immersed into the delamination solution in forming a heterogeneous mixture for a time period of more than 1 min, more than 3 mins, more than 5 mins, more than 10 mins, more than 15 mins, more than 20 mins, more than 40 mins, more than 60 mins, more than 80 mins or more than 100 mins.

In some embodiments, the electrode is immersed into the delamination solution at a temperature of from about 20° C. to about 100° C., from about 20° C. to about 90° C., from about 20° C. to about 80° C., from about 20° C. to about 70° C., from about 20° C. to about 60° C., from about 25° C. to about 100° C., from about 25° C. to about 95° C., from about 25° C. to about 90° C., from about 25° C. to about 85° C., from about 25° C. to about 80° C., from about 25° C. to about 75° C., from about 25° C. to about 70° C., from about 25° C. to about 65° C., from about 25° C. to about 60° C., from about 30° C. to about 100° C., from about 30° C. to about 95° C., from about 30° C. to about 85° C., from about 30° C. to about 75° C., from about 30° C. to about 65° C., from about 35° C. to about 95° C., from about 40° C. to about 95° C., from about 45° C. to about 95° C. or from about 50° C. to about 90° C.

In some embodiments, the electrode is immersed into the delamination solution at a temperature of less than 100° C., less than 95° C., less than 90° C., less than 85° C., less than 80° C., less than 75° C., less than 70° C., less than 65° C., less than 60° C., less than 55° C., less than 50° C., less than 45° C., less than 40° C., less than 35° C. or less than 30° C. In some embodiments, the electrode is immersed into the delamination solution at a temperature of more than 25° C., more than 30° C., more than 35° C., more than 40° C., more than 45° C., more than 50° C., more than 55° C., more than 60° C., more than 65° C., more than 70° C., more than 75° C., more than 80° C., more than 85° C., more than 90° C. or more than 95° C.

In some embodiments, the heterogeneous mixture is stirred when the electrode is immersed into the delamination solution in forming a heterogeneous mixture to achieve delamination of the electrode. In some embodiments, as the heterogeneous mixture is stirred, the electrode is delaminated into electrode layer material and a current collector. In some embodiments, the electrode layer material is in the form of fragmented layers or pulverized layers as the heterogeneous mixture is stirred. In some embodiments, a planetary mixer, a stirring mixer, a blender, an ultrasonicator or a combination thereof is being used to stir the heterogeneous mixture.

In some embodiments, the heterogeneous mixture is stirred at a speed of from about 0 rpm to about 3000 rpm, from about 10 rpm to about 3000 rpm, from about 100 rpm to about 3000 rpm, from about 200 rpm to about 3000 rpm, from about 300 rpm to about 3000 rpm, from about 500 rpm to about 3000 rpm, from about 1000 rpm to about 3000 rpm, from about 100 rpm to about 2500 rpm, from about 100 rpm to about 2000 rpm or from about 500 rpm to about 2500 rpm.

In some embodiments, the heterogeneous mixture can be stirred for an appropriate amount of time. In some embodiments, the heterogeneous mixture is stirred for a time period of from about 1 minute to 120 minutes.

In some embodiments, the planetary mixer comprises at least one planetary blade and at least one high-speed dispersion blade. In certain embodiments, the rotational speed of the planetary blade is from about 0 rpm to about 200 rpm. In certain embodiments, the rotational speed of the dispersion blade is from about 1,000 rpm to about 4,000 rpm.

In certain embodiments, the ultrasonicator is an ultrasonic bath, a probe-type ultrasonicator or an ultrasonic flow cell. In some embodiments, the ultrasonicator is operated at a power density from about 10 W/L to about 100 W/L. In some embodiments, the ultrasonicator operates at a power from about 100 W to about 1000 W.

In some embodiments, the pH of the heterogeneous mixture is from about 2 to about 7, from about 2 to about 6.5, from about 2 to about 6, from about 2 to about 5.5, from about 2 to about 5, from about 2 to about 4.5, from about 2 to about 4, from about 2 to about 3.5, from about 2.5 to about 7, from about 2.5 to about 6, from about 2.5 to about 5, from about 2.5 to about 4 or from about 3 to about 7. In some embodiments, the pH of the heterogeneous mixture is less than 7, less than 6, less than 5, less than 4.5, less than 4, less than 3.5, less than 3 or less than 2.5. In some embodiments, the pH of the heterogeneous mixture is more than 2, more than 2.5, more than 3, more than 3.5, more than 4, more than 4.5, more than 5 or more than 6.

In some embodiments, after the immersion of the electrode into the delamination solution in forming a heterogeneous mixture, the electrode is delaminated into electrode constituents layers. In some embodiments, after the immersion of the electrode into the delamination solution, the electrode is delaminated into an electrode layer material and a current collector layer.

In some embodiments, in the case where each of the cathode and anode comprises the polymeric binder as disclosed herein, both of the cathode and anode could be delaminated at the same time as the electrodes are immersed into a delamination solution. In other embodiments, in the case where any one of the cathode and anode comprises the polymeric binder as disclosed herein and the other comprises another aqueous polymeric binder (such as carboxymethyl cellulose (CMC) or styrene butadiene rubber (SBR)), the other aqueous polymeric binder could first be withdrawn by applying water to the electrode. The electrode comprising the polymeric binder disclosed herein could subsequently be subjected to delamination by immersing the electrode into a delamination solution.

Figure 5:
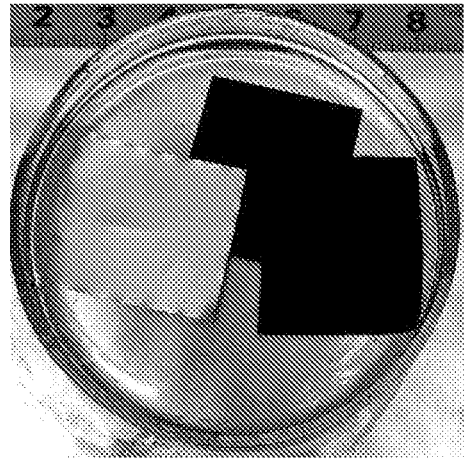
FIG. 5 depicts the recovered cathode layer materials and current collector of Example 2 after the immersion of the double side-coated cathode into the delamination solution comprising a citric acid of 0.50 wt % concentration and DI water.

In some embodiments, the electrode constituents layers are separated from the delamination solution by screening the heterogeneous mixture. In some embodiments, the current collector and the electrode layer material are separated from the delamination solution by screening the heterogeneous mixture in step 102. The electrode layer material in this case is in the form of a layer, as illustrated in FIG. 5. In some embodiments, filtration, sieving, decantation or a combination thereof may be used for screening of the heterogeneous mixture.

In some embodiments, the electrode layer material might appear as a fragmented layer, a pulverized layer or a layer that is partially or completely shattered, fragmentized or crushed into forms of small particles or powder. In some embodiments, the current collector is separated from the electrode layer material and the delamination solution by screening the heterogeneous mixture.

In some embodiments, the mesh width of the sieve is from about 0.1 mm to about 8 mm, from about 0.1 mm to about 6 mm, from about 0.1 mm to about 4 mm, from about 0.1 mm to about 2 mm, from about 0.5 mm to about 8 mm, from about 1 mm to about 8 mm, from about 1 mm to about 4 mm, or from about 1 mm to about 3 mm.

In some embodiments, the mesh width of the sieve is less than 8 mm, less than 7 mm, less than 6 mm, less than 5 mm, less than 4 mm, less than 3 mm, less than 2 mm, less than 1 mm or less than 0.5 mm. In some embodiments, the mesh width of the sieve is more than 0.1 mm, more than 0.5 mm, more than 1 mm, more than 2 mm, more than 3 mm, more than 4 mm, more than 5 mm, more than 6 mm, or more than 7 mm.

The method of the present invention is particularly applicable to recycle a battery electrode manufactured via a water-based slurry. The aqueous slurry utilizes an aqueous polymeric binder for adhering the active material particles and the conductive agent together with the current collector to form a continuous electrical conduction path. With the polymeric binder disclosed herein exhibiting an enhanced adhesive capability, which strengthen the conductive network between various components within the electrode layer material, it is capable of facilitating electron and ion transportation to reduce the impedance between the current collector and the electrode materials and have sufficient elasticity to prevent the electrode from swelling due to volume expansion and contraction during charging and discharging.

The delamination steps of the method disclosed herein allows an electrode comprising a current collector and an electrode layer material coated on one side or both sides of the current collector by means of a polymeric binder to be effectively delaminated by the simple use of a delamination solution.

FIG. 5 depicts the recovered cathode layer materials and current collector of Example 2 after the immersion of the double side-coated cathode into the delamination solution comprising a citric acid of 0.50 wt % concentration and DI water. The cathode layer materials are shown to completely delaminated from the aluminium current collector. There is no observable corrosion on the aluminium.

Figure 6:
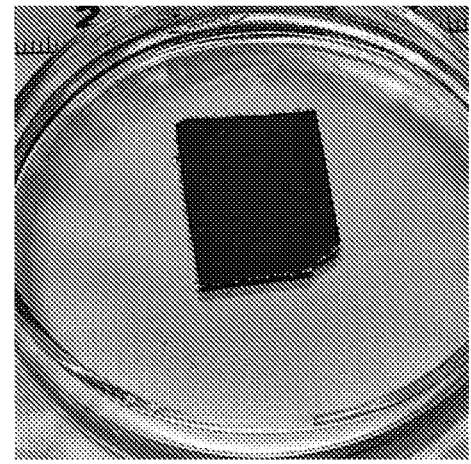
FIG. 6 depicts the recovered cathode of Comparative Example 1 wherein the double side-coated cathode that is being immersed in the delamination solution comprises polyvinylidene fluoride (PVDF) as the polymeric binder.

FIG. 6 depicts the recovered cathode of Comparative Example 1 wherein the double side-coated cathode that is being immersed in the delamination solution comprises polyvinylidene fluoride (PVDF) as the polymeric binder. The delamination solution used herein comprises a citric acid of 0.50 wt % concentration and DI water. The delamination of the cathode layer materials from the aluminium current collector is shown to be unsuccessful where the cathode layer materials still strongly adhere onto the aluminium current collector despite being immersed into the delamination solution. This indicates that the use of the delamination agent disclosed in the present invention to achieve electrode delamination is not applicable to electrode comprising non-aqueous polymeric binder such as PVDF.

Theoretically speaking, PVDF is insoluble in water. Immersing the cathode into the delamination solution could promote the dissolution of the cathode active material and thus separate out the insoluble PVDF. However, in practical situations (as illustrated in FIG. 6), cathode active material in a PVDF-containing cathode was found to experience difficulty in dissolving in the acid within the delamination solution. This stems from the resistance of PVDF to acid and its exceptionally strong adhesive interactions with cathode active material which in turn hinders the full exposure of the cathode active material to the acid. In general, much harsher conditions (e.g. use of highly concentrated acids) are required to achieve the dissolution of cathode active material in a PVDF-containing cathode, but on the down side, this would promote a greater corrosion tendency to the current collector.

The use of delamination agent of low concentrations for immersion of the electrode as disclosed herein not only is sufficient to attain complete delamination of the electrode via disrupting the interactions between the polymeric binder within the electrode layer material and the current collector surface but also reduces the likelihood of corrosion of the current collector, dissolution of electrode active material and other electrode metal constituents.

The delamination steps (steps 101 and 102) of the present invention provides a simple method that can be used to delaminate the electrode layer material from the current collector, taking into account the compositions of polymeric binders used herein. As separation of electrode layer materials and current collectors constitutes a vital step in the recycling of batteries, the delamination steps of the method disclosed herein offer a technical solution in fulfilling the demand in battery recycling. This circumvents complex separation process and contamination of current collector, and enables an excellent materials recovery (i.e. high recovery rate). The time required to delaminate the electrode layer material from the current collector in a battery is considerably reduced without damaging the underlying current collector. With a shorter contact time between the electrode and the weak acid-containing delamination solution, corrosion of current collector and dissolution of electrode active material and other electrode constituents made up of metals could be circumvented. For example, the shorter contact time allows the natural oxide layer formed on the surface of the aluminium current collector to provide sufficient protection against corrosion when an electrode comprising an aluminium current collector is immersed into a weak acid-containing delamination solution.

Owing to the unique formulation of the polymeric binder disclosed herein, the use of weak acid as the delamination agent, rather than strong acid, in the delamination steps of the present invention can also severely reduce the corrosion and dissolution tendencies of electrode metal constituents.

Figure 7:
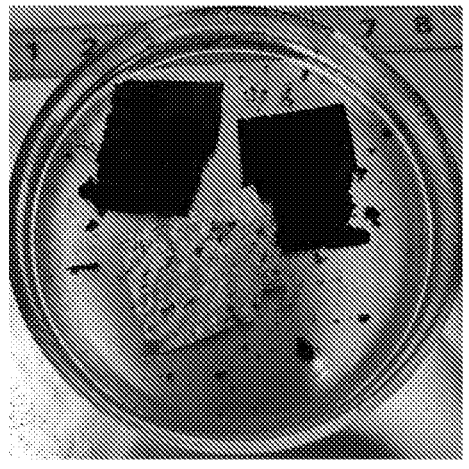
FIG. 7 depicts the recovered cathode layer materials and current collector of Comparative Example 3 after the immersion of the double side-coated cathode into the delamination solution comprising a sulfuric acid of 0.50 wt % concentration and DI water.

FIG. 7 depicts the recovered cathode layer materials and current collector of Comparative Example 3 after the immersion of the double side-coated cathode into the delamination solution comprising a sulfuric acid of 0.50 wt % concentration and DI water. The cathode layer materials delaminate from the aluminium current collector. However, the flaky cathode layer materials and the corroded aluminium foil surface indicate that the sulfuric acid (strong acid) induces dissolution of cathode active materials and corrosion of current collector.

Figure 8:
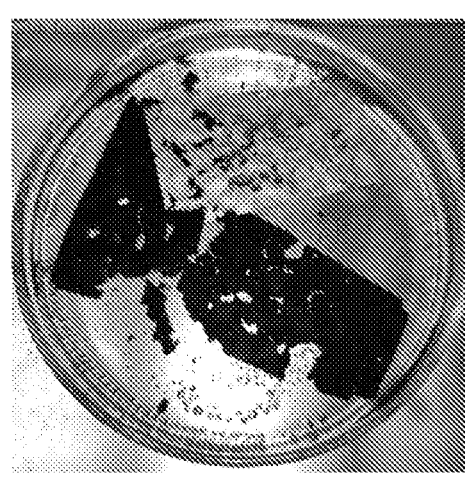
FIG. 8 depicts the recovered cathode layer materials and current collector of Comparative Example 4 after the immersion of the double side-coated cathode into the delamination solution comprising citric acid and sulfuric acid with an acid concentration of 0.50 wt % and DI water.

FIG. 8 depicts the recovered cathode layer materials and current collector of Comparative Example 4 after the immersion of the double side-coated cathode into the delamination solution comprising citric acid and sulfuric acid with an acid concentration of 0.50 wt % and DI water. Most of the cathode layer materials delaminates from the aluminium current collector with a slight proportion of the cathode layer materials remain adhering on the current collector. In addition, the flaky cathode layer materials and the corroded aluminium foil surface indicate that the combined use of a citric acid (weak acid) and a sulfuric acid (strong acid) induces dissolution of cathode active materials and corrosion of current collector.

In the delamination steps of the method of the present invention, the utilization of weak acid as delamination agent which brings about low dissolution tendencies of electrode active materials and any other metal constituents within the electrode layer material helps ensure that only the separation of current collector and electrode layer material takes place. The steps of separating or retrieving constituents of the electrode layer material occur subsequently. This allows the recycling of a battery electrode to be carried out in a systematic manner in order to minimize the contamination and retrieval loss of current collector, electrode layer material and thus constituents of electrode layer material at a later stage.

The delamination steps of the method disclosed herein results in a delamination success rate of 100% and an exceptionally high delamination recovery rate (>95%).

In some embodiments, delamination of the electrode occurs along the electrode layer material-current collector interface. The delamination success rate refers to the extent of delamination of electrode layer material from the current collector and was observed via visual inspection. In the case of the present invention where an electrode layer material is completely delaminated from the current collector with no visible deposits of the electrode layer material remaining on the current collector, the delamination success rate is 100%. In other cases where an electrode layer material is not delaminated from the current collector or an electrode layer material is partially delaminated from the current collector with visible deposits of the electrode layer material remaining on the current collector, the delamination is deemed to be incomplete or unsuccessful, and thus the delamination success rate cannot be determined.

The delamination recovery rate refers to the proportion of the sum of the weight of the recovered electrode layer material and current collector, based on the initial weight of electrode before immersion into the delamination solution. Delamination recovery rate can only be calculated in the case where there is a complete delamination of the electrode with no visible deposits of the electrode layer material remaining on the current collector (i.e. with a 100% delamination success rate). It serves as a reflection of the extent of corrosion of invaluable metal materials in the electrode and/or dissolution of the invaluable metal materials into the delamination solution. With the delamination steps of the method disclosed herein yielding a high delamination recovery rate indicates that extent of corrosion of electrode metal constituents or dissolution of the electrode metal constituents into the delamination solution is negligible.

Steps 101 and 102 of the method of the present invention are simple and ensure complete delamination of electrode at the electrode layer material-current collector interface with no contamination of current collector which promotes outstanding materials recovery and allows the delamination of electrode to be achieved with high efficiency.

In some embodiments, following the retrieval of electrode layer material from the heterogeneous mixture, the electrode layer material could be stirred with or without an aqueous solvent to obtain electrode layer material that appears in the form of fragments. A fragmented electrode layer or an electrode layer that is fragmentized into small particles (i.e. electrode layer particles) is thus obtained. In some embodiments, a planetary mixer, a stirring mixer, a blender, an ultrasonicator or a combination thereof is being used to stir the electrode layer material.

In some embodiments, the electrode layer material is stirred at a speed of from about 500 rpm to about 2000 rpm, from about 500 rpm to about 1000 rpm, from about 750 rpm to about 2000 rpm, from about 750 rpm to about 1000 rpm, from about 1000 rpm to about 2000 rpm, from about 1000 rpm to about 1500 rpm or from about 1250 rpm to about 2000 rpm.

In some embodiments, the fragmented electrode layer or the electrode layer particles is screened to ensure that the electrode layer material is fragmented into a consistent size range. A screened fragmented electrode layer or screened electrode layer particles is/are thus obtained. In some embodiments, filtration, sieving, decantation or a combination thereof may be used for screening of the fragmented electrode layer or the electrode layer particles.

In some embodiments, the fragmented electrode layer or the electrode layer particles is/are screened by passing through a sieve with mesh width of from about 0.1 mm to about 2 mm.

In some embodiments, the screened fragmented electrode layer or the screened electrode layer particles could further be stirred with or without an aqueous solvent to pulverize the electrode layer material. A pulverized electrode layer or an electrode layer that is pulverized into fine powder (i.e. electrode layer powder) is thus obtained. In some embodiments, a planetary mixer, a stirring mixer, a blender, an ultrasonicator or a combination thereof is being used to stir the screened fragmented electrode layer or the screened electrode layer particles.

In some embodiments, the screened fragmented electrode layer or the screened electrode layer particles is/are stirred at a speed of from about 4000 rpm to about 8000 rpm, from about 4000 rpm to about 6000 rpm, from about 6000 rpm to about 8000 rpm or from about 5000 rpm to about 7000 rpm.

In some embodiments, the screened fragmented electrode layer or the screened electrode layer particles is/are stirred at a speed of less than 8000 rpm, less than 7500 rpm, less than 7000 rpm, less than 6500 rpm, less than 6000 rpm, less than 5500 rpm, less than 5000 rpm or less than 4500 rpm. In some embodiments, the screened fragmented electrode layer or the screened electrode layer particles is/are stirred at a speed of more than 4000 rpm, more than 4500 rpm, more than 5000 rpm, more than 5500 rpm, more than 6000 rpm, more than 6500 rpm, more than 7000 rpm or more than 7500 rpm.

In some embodiments, each of the electrode layer material and the screened fragmented electrode layer or the screened electrode layer particles is/are independently stirred for a time period of from about 1 min to about 15 mins, from about 1 min to about 10 mins, from about 1 min to about 5 mins, from about 3 mins to about 15 mins, from about 3 mins to about 10 mins, from about 5 mins to about 15 mins or from about 5 mins to about 10 mins.

In some embodiments, each of the electrode layer material and the screened fragmented electrode layer or the screened electrode layer particles is/are independently stirred for a time period of less than 15 mins, less than 12 mins, less than 10 mins, less than 8 mins or less than 5 mins. In some embodiments, each of the electrode layer material and the screened fragmented electrode layer or the screened electrode layer particles is/are independently stirred for a time period of more than 1 min, more than 3 mins, more than 5 mins, more than 7 mins, more than 10 mins or more than 12 mins.

In some embodiments, the pulverized electrode layer or the electrode layer powder is screened to ensure that the screened fragmented electrode layer or the screened electrode layer particles is/are pulverized into consistently smaller sizes. A screened pulverized electrode layer or a screened electrode layer powder is thus obtained. In some embodiments, filtration, sieving, decantation or a combination thereof may be used for screening of the pulverized electrode layer or the electrode layer powder.

In some embodiments, the pulverized electrode layer or the electrode layer powder is screened by passing through a sieve with mesh width of from about 0.02 mm to about 1.5 mm, from about 0.02 mm to about 1 mm, from about 0.05 mm to about 1.5 mm, from about 0.05 mm to about 1 mm, from about 0.1 mm to about 1.5 mm or from about 0.1 mm to about 1 mm.

In some embodiments, the pulverized electrode layer or the electrode layer powder is screened by passing through a sieve with mesh width of less than 1.5 mm, less than 1 mm, less than 0.5 mm or less than 0.2 mm. In some embodiments, the pulverized electrode layer or the electrode layer powder is screened by passing through a sieve with mesh width of more than 0.02 mm, more than 0.1 mm, more than 0.5 mm or more than 1 mm.

In some embodiments, in the case where the recovered current collectors of the anode and cathode comprise/are made of different materials, the current collectors could be screened using a vibrating sieve machine to segregate the different materials used based upon their density differences. In some embodiments, the recovered current collectors of the anode and cathode are copper foils and aluminium foils respectively.

In some embodiments, a first suspension is prepared by immersing the electrode layer material into an aqueous solvent in step 103. In some embodiments, a first suspension is prepared by immersing the fragmented or pulverized electrode layer, electrode layer particles or powder into an aqueous solvent.

In some embodiments, the electrode layer material is immersed into an aqueous solvent for a time period of from about 0.25 min to about 20 mins, from about 0.25 min to about 10 mins, from about 0.5 min to about 20 mins, from about 0.5 min to about 10 mins, from about 1 min to about 20 mins, from about 1 min to about 10 mins, from about 5 mins to about 20 mins, from about 5 mins to about 15 mins or from about 5 mins to about 10 mins in forming a first suspension.

In some embodiments, the electrode layer material is immersed into an aqueous solvent for a time period of less than 20 mins, less than 15 mins, less than 10 mins or less than 5 mins in forming a first suspension. In some embodiments, the electrode layer material is immersed into an aqueous solvent for a time period of more than 0.25 min, more than 0.5 min, more than 1 min, more than 5 mins, more than 10 mins or more than 15 mins in forming a first suspension.

In some embodiments, the first suspension is stirred when the electrode layer material is immersed into an aqueous solvent in forming a first suspension. In some embodiments, the electrode layer material is fragmented or pulverized as the first suspension is stirred. In some embodiments, a planetary mixer, a stirring mixer, a blender, an ultrasonicator or a combination thereof is being used to stir the first suspension.

In some embodiments, the first suspension can be stirred for an appropriate amount of time. In some embodiments, the first suspension is stirred for a time period of from about 0.25 minute to about 20 minutes.

In some embodiments, the electrode layer material can be fragmented and/or pulverized at any steps prior to the addition of a precipitation agent. In some embodiments, a planetary mixer, a stirring mixer, a blender, an ultrasonicator or a combination thereof can be used to fragmentize or pulverize the electrode layer material. The fragmentation and pulverization of the electrode layer material helps facilitate the precipitation of the polymeric binder at a later stage by increasing the surface area of the electrode layer material for the precipitation agent to act upon.

The steps of precipitation (steps 103 to 105) of the method disclosed herein have been developed that is uniquely tailored for the specific need of inducing phase change of the polymeric binder, and thus helps in the isolation, extraction and recovery of the electrode active materials at a later stage.

This offers a technical solution in fulfilling the demand in the recycling of battery constituents.

The polymeric binder of the present invention is water-soluble and is capable of achieving excellent dispersion and stability in water, which brings about an enhancement in binding capability of the polymeric binder. In some embodiments, the polymeric binder is soluble in water and some other aqueous solvents.

In some embodiments, as the electrode layer material is immersed into an aqueous solvent in forming a first suspension, the polymeric binder contained therein dissolves in the aqueous solvent. In some embodiments, as the electrode layer material is immersed into an aqueous solvent in forming a first suspension, the majority of the polymeric binder contained therein dissolves in the aqueous solvent. The dissolution of a polymeric binder in an aqueous solvent occurs in the manner described below.

The dissolution of a polymeric binder in an aqueous solvent as the electrode layer material is immersed into an aqueous solvent in forming a first suspension is driven by the (1) intermolecular interactions (e.g. hydrogen bonding and ion-dipole interactions) between the polymeric binder and the aqueous solvent, or more specifically between the ionized and/or uncharged species in the monomer(s) that contribute(s) to the make-up of the polymeric binder and the polar molecules within the aqueous solvent; and (2) uncoupling of a proportion of interactions between the water molecules in the aqueous solvent, occurred especially in regions that are in close proximity to the polymeric binder. These interactions become dominant over the intermolecular interactions between the copolymer chains in the polymeric binder and the intramolecular interactions within the copolymer chain, giving rise to the dissolution of a polymeric binder in an aqueous solvent in forming a first suspension. In the process of dissolution or solvation, the polymeric binder and the aqueous solvent are restructured into a solvation complex where the polymeric binder is surrounded by a concentric shell of polar molecules within the aqueous solvent, leading to the stabilization of the polymeric binder in the first suspension.

In addition, as the electrode layer material is immersed into an aqueous solvent in forming a first suspension, any acid groups contained within the polymeric binder in the electrode layer material are likely to undergo dissociation in forming acid salt groups. The anion of the acid salt group is capable of forming ion-dipole interactions with a partially positively charged species (for example a partial positive charge near the hydrogen atom of a water molecule, which stems from the uneven distribution of electron density in the water molecule).

Hydrogen bonding among the polymeric binder and the aqueous solvent depends on the ability of each to form hydrogen bond (i.e. accept and/or donate proton).

The hydroxyl groups of water consist of a H atom covalently bonded to a more electronegative O atom and an electronegative O atom bearing a lone pair of electrons in the outmost electron shell, either of which is capable of forming hydrogen bond with another species (e.g. a monomer that assists in the construction of the polymeric binder) that can interact via hydrogen bonding (i.e. molecule containing a H atom which is covalently bonded to a hydrogen bond donor and/or a hydrogen bond acceptor). The ability of water in both accepting and donating protons makes it an excellent candidate in solvating a polymeric binder.

In the case where the aqueous solvent comprises a minor component in addition to water that possesses hydrogen bond-forming capability, hydrogen bond interactions could also be established between the minor component and another hydrogen bond-forming molecule (e.g. a hydrogen bond-forming group of a monomer that contributes the make-up of the polymeric binder).

In regions where the hydrogen bond-forming component (s) within the aqueous solvent are in the vicinity of the polymeric binder (e.g. at the inner solvation shells around the polymeric binder), hydrogen bonds formed between the hydrogen bond-forming molecules within the aqueous solvent break apart due to the emergence of comparatively stronger interactions between the polymeric binder and the aqueous solvent. Conversely, hydrogen bonding interactions between molecules within the aqueous solvent remain in regions where these molecules are further apart from the polymeric binder (e.g. at the outer solvation shells around the polymeric binder).

The polarity of the aqueous solvent constituents is yet another most important factor in governing how well the aqueous solvent solvates the polymeric binder. A polar molecule contains at least one polar bond formed due to the difference in electronegativities between the bonded atoms. As the electron pair(s) shared between the bonded atoms tend to be drawn closer to the atom with a higher electronegativity, an uneven distribution of the bonding electron pair(s) occurs. A water molecule, for example, is a polar molecule since the bond dipole moments present in the molecule do not cancel out, resulting in a net dipole.

The polar molecules (e.g. water molecules) within the aqueous solvent solvate a charged species in the polymeric binder (e.g. an anion of the acid salt group of a monomer that assists in the construction of the polymeric binder). This creates solvation shells (hydration shells in the case of water) around each charged species via the ion-dipole interactions between the polymeric binder and the aqueous solvent and allows for the dissolution of the polymeric binder in the aqueous solvent in forming a first suspension.

Hydrogen bonding and/or ion-dipole attractions are the two types of interactions primarily formed between the polymeric binder and the aqueous solvent that bring about the formation of solvation complexes. Both of which independently contribute to a different extent to the dissolution of polymeric binder depending on the molecular structure, composition and properties of the polymeric binder and the aqueous solvent. Solvation of the polymeric binder in the aqueous solvent could proceed through other means of intermolecular interactions, for instance via ionic interactions, London dispersion forces, dipole-dipole interactions, dipole-induced dipole interactions and ion-induced dipole interactions. However, in consideration of the molecular structure of the polymeric binder, the principal electrostatic interactions that give rise to solvation of the polymeric binder by the aqueous solvent occur via hydrogen bonding and/or ion-dipole interactions. The other interactions mentioned above that could possibly arise to a less extent between the polymeric binder and the aqueous solvent may also be disrupted based on the proposed mechanism via the introduction of the precipitation agent to allow for the precipitation of the polymeric binder. These interactions are not displayed for ease of interpretation.

Figure 9:
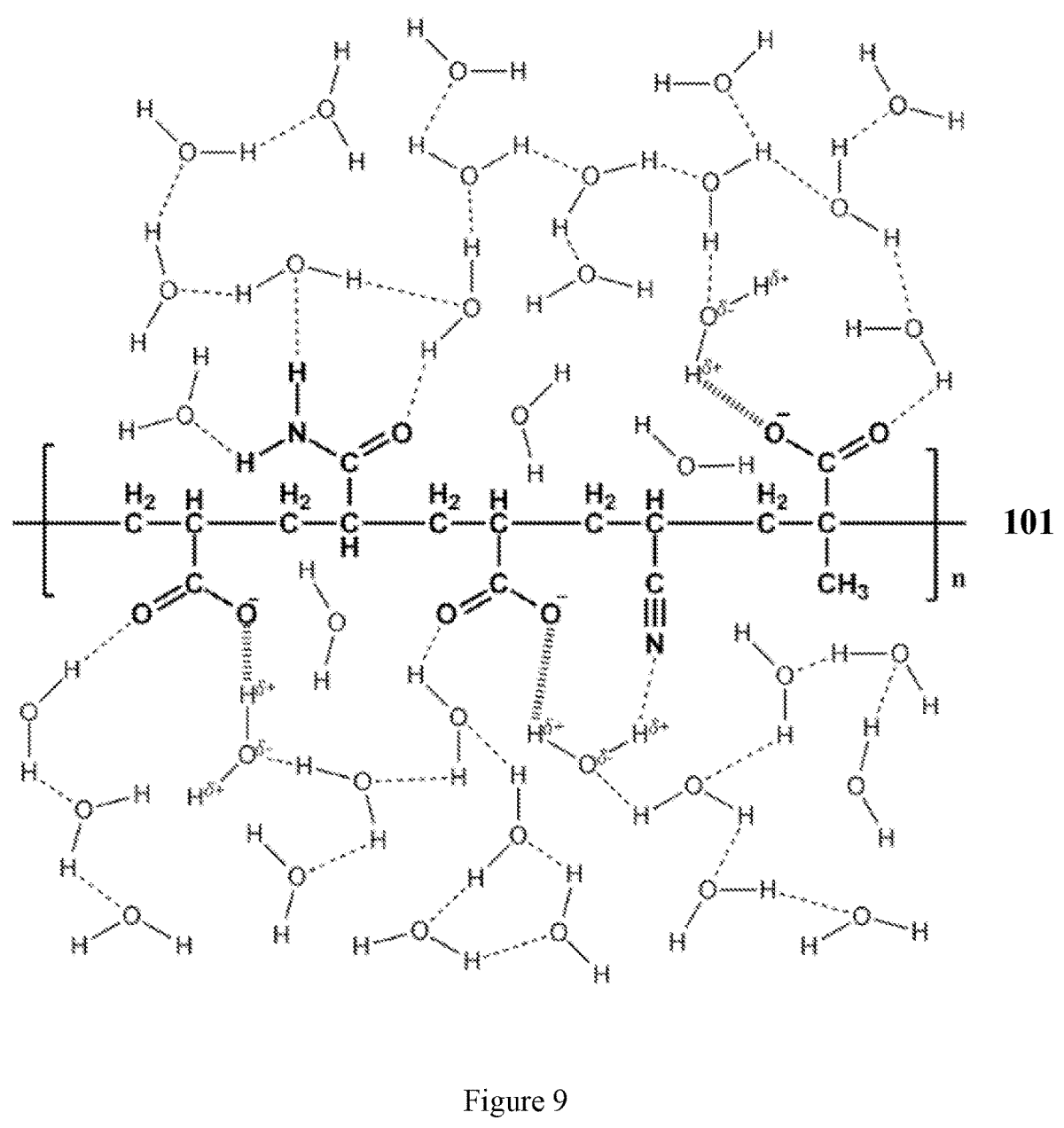

FIG. 9 illustrates a schematic of an embodiment of the proposed interactions between a polymeric binder and an aqueous solvent in a first suspension. The polymer compound in bold represents an embodiment of the polymeric binder comprises a copolymer comprising structural units derived from a carboxylic acid group-containing monomer, a nitrile group-containing monomer and an amide group-containing monomer. The structural unit(s) derived from a carboxylic acid group-containing monomer in this case comprises a carboxylic salt group, wherein a carboxylic salt group is a salt of a carboxylic acid group. The aqueous solvent in this case comprises water.

Oxygen (O), nitrogen (N) and hydrogen (H) atoms present in the copolymer of polymeric binder are likely to interact with the O and/or H atoms of the water molecules in the aqueous solvent via hydrogen bond formations. In addition, an ion-dipole interaction is exerted between the anion of the carboxylic salt group, $COO^-$ in this case, contained within polymeric binder and the partial positive charge near the hydrogen atom of a water molecule in the aqueous solvent. Hydrogen bonding and/or ion-dipole attractions are the two types of interactions primarily formed between the polymeric binder and the aqueous solvent in the first suspension and thus independently contribute considerably to the solvation and dissolution of the polymeric binder by the aqueous solvent in forming a first suspension. In addition, hydrogen bonds initially formed between the water molecules within the aqueous solvent that are in close proximity to the polymeric binder (i.e. at the inner solvation shells around the polymeric binder) would disintegrate with the development of relatively stronger interactions between the polymeric binder and the aqueous solvent. Meanwhile, hydrogen bonding between water molecules that are further away from the polymeric binder (i.e. at the outer solvation shells around the polymeric binder) persists with considerably less disruption exerted from interactions between the polymeric binder and the aqueous solvent on these molecules.

In the case where an electrode layer material comprises a combination of a polymeric binder, an electrode active material and a conductive agent, the electrode layer material may appear as partially dissolved complex in the first suspension with parts of undissolved polymeric binder within the clusters of the electrode active material and the conductive agent. The rationale behind the portions of undissolved polymeric binder in the first suspension is attributed to the restricted access of the polymeric binder within clusters of the electrode active material and the conductive agent to aqueous solvent, impeding the dissolution of parts of the polymeric binder. There is no effect exerted on both the electrode active material and the conductive agent when the electrode layer material comes into contact with the aqueous solvent i.e. the electrode active material and the conductive agent do not dissolve in an aqueous solvent. In some embodiments, the electrode layer material does not comprise a conductive agent.

The polymeric binder disclosed herein is devised to possess such capabilities in its dissolution and exceptional dispersion in an aqueous solvent through the hydrogen bonding and/or ion-dipole interactions between the polymeric binder and the aqueous solvent. The formulation of the polymeric binder disclosed herein exhibits an exceptionally strong binding capability.

However, the dissolved and well-dispersed polymeric binder within the first suspension poses an additional challenge in the separation or precipitation of the water-soluble polymeric binder in the subsequent recycling stage.

In some embodiments, a second suspension is prepared by adding a precipitation agent into the first suspension in step 104.

In some embodiments, the precipitation agent can be mixed with an aqueous solvent to form a first suspension. Thereafter, a second suspension can be formed by adding an electrode layer material into the first suspension. In other embodiments, the electrode layer material and the precipitation agent can be simultaneously added into an aqueous solvent to form a first suspension.

Copolymers in polymeric binders of different compositions that display varying specific properties would require different approaches in inducing chemical and physical changes. Accordingly, the precipitation steps of the method disclosed herein are specifically developed to precipitate a polymeric binder. More specifically, it is developed to precipitate a copolymer comprising a structural unit derived from an acid group-containing monomer and a structural unit derived from a hydrogen bond-forming group-containing monomer (ii) by first disrupting the initially-formed solvation complexes to allow for the detachment of the copolymer from the aqueous solvent.

The precipitation of a polymeric binder disclosed herein is driven by two main events: (1) the various types of interactions that bring about the separation of the polymeric binder from the aqueous solvent and (2) the subsequent structural transformation of the polymeric binder.

Upon addition of a precipitation agent, the polymeric binder is separated from the aqueous solvent in a second suspension via (i) bond disruption and/or breakage between the copolymer of polymeric binder and the aqueous solvent; (ii) weakening of intermolecular attractions between molecules in the aqueous solvent in forming solvation complex; (iii) protonation of conjugate base of the acid group-containing monomer(s) that contribute the make-up of the polymeric binder; (iv) formation of intramolecular interactions between various functional groups within a copolymer chain and (v) development of intermolecular interactions between the copolymer chains. Following the initiation of bond disruption between the copolymer of polymeric binder and the aqueous solvent, the other types of interactions mentioned above that give rise to the separation of the polymeric binder from the aqueous solvent occur in no particular order. The polymeric binder disclosed herein then undergoes a coil-to-globule structural transformation.

In some embodiments, the precipitation agent is an acid. In some embodiments, the precipitation agent is a strong acid, a weak acid or a combination thereof.

Acid strength refers to the tendency of an acid to dissociate in a solvent (most commonly water) into a proton and a conjugate base of the acid. The extent of ionization of an acid is usually quantified by its acid dissociation constant ($K_a$). Stronger acids have a larger $K_a$ and thus correspond to a smaller negative logarithm of the acid dissociation constant ($pK_a$, which is equal to $-\log K_a$) than weaker acids. The stronger the acid is, the more easily it loses a proton (i.e. hydrogen ion $H^+$), and vice versa.

In some embodiments, the first suspension disclosed herein comprises an aqueous solvent comprising water. With the addition of a strong acid into the first suspension disclosed herein in forming a second suspension, the dissociation of a strong acid in water is effectively complete with which the acid loses a proton and the water molecule takes up the proton in producing a hydroxonium ion ($H_3O^+$). The said strong acid dissociation reaction is generally denoted as:

$$HA_2 + H_2O \rightarrow H_3O^+ + A_2^-  \qquad \text{(Equation 3)}$$

wherein $HA_2$ is a strong acid utilized as a precipitation agent; $H_2O$ is a water molecule; $H_3O^+$ is a hydroxonium ion and $A_2^-$ is a conjugate base of the acid $HA_2$.

In some embodiments, the precipitation agent is a strong acid. Strong acid is one that fully or almost fully dissociates in water in producing hydrogen ions as described in Equation 3. In some embodiments, the strong acid is an inorganic acid. In some embodiments, the inorganic acid is selected from the group consisting of nitric acid, sulphuric acid, hydrochloric acid, perchloric acid, hydrobromic acid, hydroiodic acid, chloric acid, bromic acid, iodic acid, dithionic acid, dithionous acid, sulfamic acid, trithionic acid, tetrathionic acid and combinations thereof.

In some embodiments, the strong acid is selected from the group consisting of methane sulfonic acid, p-toluenesulfonic acid, benzene sulfonic acid, trichloroacetic acid, trifluoroacetic acid, oxalic acid, propiolic acid, mesoxalic acid, mellitic acid and combinations thereof.

With the incorporation of a weak acid into the first suspension in forming a second suspension, the weak acid only partially dissociates with both the undissociated weak acid and its dissociation products present in the second suspension. The dissociation of the said weak acid is represented by the aforementioned Equation 1. The dissociation of a weak acid in the second suspension involves reaction of water molecules with protons from the acid in generating hydroxonium ions.

In some embodiments, the precipitation agent is a weak acid. In some embodiments, the weak acid is selected from the group consisting of formic acid, acetic acid, glycolic acid, glyoxylic acid, oxalic acid, propionic acid, acrylic acid, propiolic acid, lactic acid, 3-hydroxypropionic acid, glyceric acid, pyruvic acid, 3-oxopropionic acid, 2,3-dioxopropionic acid, malonic acid, tartronic acid, dihydroxymalonic acid, mesoxalic acid, glycidic acid, butyric acid, isobutyric acid, crotonic acid, isocrotonic acid, methacrylic acid, vinylacetic acid, tetrolic acid, 2-hydroxybutyric acid, 3-hydroxybutyric acid, 4-hydroxybutyric acid, 2-oxobutanoic acid, acetoacetic acid, 4-oxobutanoic acid, butanedioic acid, methylmalonic acid, fumaric acid, maleic acid, 2-hydroxybutanedioic acid, tartaric acid, oxaloacetic acid, dioxosuccinic acid, valeric acid, isovaleric acid, 2-methylbutyric acid, pivalic acid, 3-hydroxyvaleric acid, 4-hydroxypentanoic acid, 3-hydroxyisovaleric acid, glutaric acid, 2-oxoglutaric acid, 3-oxoglutaric acid, 2-furoic acid, tetrahydrofuroic acid, hexanoic acid, hexanedioic acid, citric acid, aconitic acid, isocitric acid, sorbic acid, pimelic acid, benzoic acid, salicylic acid, 4-carboxybenzoic acid, trimesic acid, mellitic acid, malic acid, dithionous acid, phosphoric acid, nitrous acid, orthosilicic acid and combinations thereof. In some embodiments, the weak acid of each of the precipitation agent and the delamination agent can be independently the same or different from one another.

To facilitate the maximum likelihood of the occurrence of precipitation of the polymeric binder, the use of strong acid or a combination of a strong acid and a weak acid as the precipitation agent is highly recommended due to their comparatively higher acid strength in dissociation. The use of a weak acid alone as the precipitation agent could, however, be feasible provided that the concentration of such weak acid is adequately high, giving rise to a second suspension with a high proton concentration (i.e. of sufficiently low pH).

The generation of the hydroxonium ions in the second suspension, regardless of being formed from the dissociation of a strong acid or a weak acid, removes the hydrogen bond-forming and ion-dipole interacting sites that are originally present in the water molecules which disrupts and breaks up the electrostatic attractions (i.e. hydrogen bonding and/or ion-dipole interactions) that were initially created between the polymeric binder and the water molecules in the aqueous solvent. This results in the disintegration of the solvation shells that were formerly developed around the polymeric binder, reducing the dissolution ability of the polymeric binder in the aqueous solvent.

Furthermore, upon the formation of the hydroxonium ions accompanied with a noticeable reduction in water molecules in surrounding regions of the polymeric binder in the second suspension, the hydrogen bonding between the water molecules at the solvation shells around the polymeric binder are acutely diminished, further dismantling the solvation shells developed around the polymeric binder.

On the other hand, the hydroxonium ions formed could protonate ionized species in the monomer(s) (e.g. the anion of an acid salt group-containing monomer) that contribute(s) to the make-up of the polymeric binder. This might potentially promote the conversion of negatively charged species to their protonated uncharged form, as shown in the following equation:

$$A_3^- + H_3O^+ \rightleftharpoons HA_3 + H_2O \qquad \text{(Equation 4)}$$

wherein $HA_3$ is a monomer that assists in the construction of the polymeric binder and $A_3^-$ is a conjugate base of the monomer $HA_3$.

In the case where the hydroxonium ions protonate anion(s) of an acid salt group-containing monomer that constitute the building block of the polymeric binder, the acid salt group is transformed into an acid group.

To facilitate the preferential dissociation of the acid utilized as the precipitation agent and the uptake of the protons in the second suspension by the ionized species in the monomer(s) that contribute to the construction of the polymeric binder, (1) the $pK_a$ value of the acid to be utilized as the precipitation agent should be lower than that of the acid group-containing monomer(s) that make up the polymeric binder and (2) upon addition of the precipitation agent into the first suspension in forming a second suspension, the pH value of the second suspension should be sufficiently lower than the $pK_a$ value(s) of the acid group-containing monomer(s) that make up the polymeric binder.

The $pK_a$ value quantifies the degree of dissociation of an acid in a solvent such as water. With a $pK_a$ value of the acid to be utilized as the precipitation agent lower than that of the acid group-containing monomer(s) that contribute the make-up of the polymeric binder, the acid utilized as the precipitation agent has a stronger inclination to dissociate, shifting the equilibrium position of the reaction of Equation 1 to the right, with a higher likelihood of hydroxonium ions formed from the ionization of said acid upon contact of the acid with the first suspension. On the other hand, since the acid group-containing monomer(s) have a comparatively higher $pK_a$ value than that of acid utilized as precipitation agent, the conjugate base of the acid group-containing monomer(s) is more prone to protonation, with the equilibrium position of reaction of Equation 4 lying towards the right, taking up part of the hydroxonium ions formed from the dissociation of the acid utilized as precipitation agent.

Upon addition of acid that is utilized as precipitation agent into the first suspension, the acid undergoes dissociation in generating hydroxonium ions and leads to the formation of a second suspension. It would be highly desirable in attaining higher concentrations of hydroxonium ions in the second suspension in the present invention, which is driven by the utilization of stronger acids and/or the amount of acid as precipitation agent added to the first suspension. Presence of higher concentrations of hydroxonium ions in the second suspension not only aids the separation of polymeric binder from the aqueous solvent by assisting the bond disruption process, but also further shifts the equilibrium position of reaction of Equation 4 to the right and protonates the conjugate base of the acid group-containing monomer(s) that contribute to the construction of the polymeric binder.

The pH value indicates the concentration of hydroxonium ions (equivalent to hydrogen ions) in a solution and can be calculated using the expression of $pH=\log[H_3O^+]$. It is used to specify the acidity or alkalinity of a solution. Solutions with higher concentrations of hydroxonium ions would have lower pH values, and vice versa. Thus, in order to achieve high concentrations of hydroxonium ions, the pH of the second suspension should be sufficiently low to enable the protonation of the majority of the conjugate base of the acid group-containing monomer(s). This could potentially eradicate the presence of charge-bearing conjugate base of the acid group-containing monomer(s) (e.g. acid salt group-containing monomer) and eliminate any further ion-dipole interactions between polymeric binder and the aqueous solvent that are originally present in the first suspension.

With the disruption of the electrostatic attractions between the polymeric binder and the aqueous solvent arising from the addition of the precipitation agent, the functional groups contained within the polymeric binder have a higher affinity of interacting with each other. For example, the H atom of a carboxyl group in a polymeric binder is likely to interact with the N atom of a nitrile group contained within the same polymeric binder via hydrogen bonding interactions. Dipole-dipole interactions might also be found between the O atom of a carboxyl group in the polymeric binder and the C atom of a nitrile group in the same polymeric binder.

Furthermore, following the weakening of the intermolecular interactions between the polymeric binder and the aqueous solvent, there is an inclination for the copolymer chains within the polymeric binder to interact with one another. For instance, alignment of interacting pairs between the nitrile (C≡N) group of a copolymer chain and the carboxyl (COOH) group of another copolymer chain could proceed via formation of hydrogen bonds. Dipole-dipole interactions might also be found between the nitrile (C≡N) groups of different copolymer chains. Hydrogen bonding could also be formed between the hydroxyl (O—H) groups in the carboxyl (COOH) groups of different copolymer chains.

The separation of the polymeric binder disclosed herein from the aqueous solvent is accomplished through the involvement of the various kinds of interactions mentioned above upon addition of a precipitation agent. The effect of which combined with the specific formulation of the polymeric binder of the present invention allow for the coil-to-globule structural conformation of the polymeric binder. The polymeric binder can then be subsequently precipitated.

By governing a sufficiently low pH of the second suspension, the protonation of conjugate base of the acid group-containing monomer(s) that contribute the make-up of the polymeric binder is highly favorable. This protonation reaction promotes a coil-to-globule structural transition of the polymeric binder disclosed herein.

Prior to the addition of the precipitation agent, with the negatively charged species in the monomer(s) (e.g. anion(s) of an acid salt group-containing monomer) that contribute to the construction of the polymeric binder carrying like charges, the negatively charged species effectively repel each other. The electrostatic repulsion of the ionized group(s) leads to the expansion of the charged polymeric binder into a fully solvated open coil conformation.

With the addition of the precipitation agent that produces a second suspension of sufficiently low pH, the protonation of the majority of the conjugate base of the acid group-containing monomer(s) that contribute the make-up of the polymeric binder converts the formerly charged polymeric binder to its uncharged form where electrostatic repulsion is no longer exerted. This leads to severe weakening of the intermolecular interactions (particularly ion-dipole interactions) between the structural unit derived from an acid group-containing monomer and the aqueous solvent and initiates the aggregation of the polymeric binder.

Moreover, the apparent intramolecular interactions between functional groups within a copolymer chain and the intermolecular interactions between the copolymer chains further promote the winding of the polymeric binders and assist the transition of the polymeric binders into a compact globular conformation.

In some embodiments, the copolymer comprises a structural unit derived from a hydrogen bond-forming group-containing monomer (i) and a structural unit derived from a hydrogen bond-forming group-containing monomer (ii). In some embodiments, the polymeric binder disclosed herein comprises a copolymer comprising a structural unit derived from an acid group-containing monomer and a structural unit derived from a hydrogen bond-forming group-containing monomer (ii). Hydrogen bond-forming groups are polar in nature. Hydrogen bond-forming capability of functional groups present in the polymeric binder helps foster hydrogen bonding interactions with water molecules in an aqueous solvent.

Hydrophilic functional group(s) are extremely soluble in water. The presence of a hydrophilic functional group in a structural unit in the polymeric binder provides extents of hydrophilic features towards the overall properties of the entire copolymer chain of the polymeric binder, potentially improving the solubility of the polymeric binder in water. Hence, the proportion of structural unit derived from a hydrogen bond-forming group-containing monomer (i) in the copolymer is critical in regulating the dissolution of the polymeric binder in the aqueous solvent. When there is an inadequate proportion of hydrogen bond-forming group-containing monomer (i) that contributes the make-up of the polymeric binder, solvation of the polymeric binder cannot take place and the polymeric binder will remain undissolved in the aqueous solvent. This polymeric binder type is designated as a non-aqueous polymeric binder. The application of the precipitation steps of the present invention to precipitate a non-aqueous polymeric binder is thus not necessary. However, in the case where there is an excessively high proportion of structural unit derived from a hydrogen bond-forming group-containing monomer (i) in the copolymer, the polymeric binder would remain dissolved in the aqueous solvent with the addition of a precipitation agent into the first suspension due to the unfeasible separation of the excessive amount of hydrogen bond-forming group-containing monomer (i) and the aqueous solvent.

Meanwhile, hydrophobic functional group(s) in the polymeric binder exert extents of hydrophobic effect to the polymeric binder which allows the aggregation of segment(s) of the polymeric binder to avoid contact with water molecules or an aqueous solvent. This aids the process of inducing change of phase in the polymeric binder, and thus leading to the precipitation of the polymeric binder. A structural unit derived from a hydrogen bond-forming group-containing monomer (ii) provokes the winding of the polymeric binder into a globular structural conformation. With a deficiency in structural unit derived from a hydrogen bond-forming group-containing monomer (ii) in the copolymer, the polymeric binder would not be capable of undergoing a coil-to-globule structural transformation due to the lack of a hydrophobic functional group that is required to trigger the change in polymeric binder conformation and initiate phase transition of the polymeric binder. On the other hand, with an excessively high proportion of structural unit derived from a hydrogen bond-forming group-containing monomer (ii) in the copolymer, the polymeric binder would be extremely insoluble in water and deemed as a non-aqueous polymeric binder. Such polymeric binder would not be covered by the scope of the present invention.

An example of a hydrogen bond-forming group-containing monomer (i) is an acid group-containing monomer. An acid group (e.g. a carboxylic acid group) is one of the crucial functional groups present in the polymeric binder that is polar in nature because of the differences in electronegativities of carbon (C) atom and oxygen (O) atom in the carbonyl group and of oxygen (O) atom and hydrogen (H) atom in the hydroxyl group. The atoms possess unequal charge distributions and therefore have net dipole moment, making the acid group polar in nature. This allows the acid group to participate in hydrogen bond formation and/or dipole-dipole interactions. An acid group is highly hydrophilic, rendering the acid group to be extremely soluble in an aqueous solvent (e.g. water).

An example of a hydrogen bond-forming group-containing monomer (ii) is a nitrile group-containing monomer. The nitrile group is polar in nature due to the strong electronegativity of the nitrogen (N) atom contained within as compared to the carbon (C) atom. The electrons shared between the covalently bonded C and N are more strongly attracted towards the N atom than the C atom. The N atom therefore carries a partial negative charge and the C atom carries a partial positive charge, as shown in the form of $^{\delta+}C{\equiv}N^{\delta-}$.

Many literatures classify polar groups and compounds as hydrophilic, while non-polar groups and compounds as hydrophobic. This clear-cut classification is effective for most polar compounds, such as alcohols and amides, but is not for some other polar compounds, with an exception being nitriles.

The nitrogen (N) atom of a nitrile group ($-C{\equiv}N$) has the potential to act as a proton (i.e. hydrogen ion) acceptor for hydrogen bond formation with water molecules in the aqueous solvent because of the presence of a lone-pair electron orbital. However, with the presence of only a hydrogen acceptor per nitrile group, the interactions created between the nitrile groups and the water molecules are remarkably weaker than that of between the other polar groups comprising at least one of each of hydrogen bond donor and hydrogen bond acceptor per group (e.g. acid group and amide group) and the water molecules. This provides an explanation to the exceptionally low water solubilities of nitriles such as polyacrylonitrile (PAN), where the behavior of the hydrophobic alkyl backbone dominates. This renders the nitrile group hydrophobic.

The presence of a hydrophobic hydrogen bond-forming functional group in a structural unit (e.g. a structural unit derived from a nitrile group-containing monomer) in the polymeric binder disclosed herein exerts hydrophobic tendency towards the entire copolymer of the polymeric binder. This allows the polymeric binder to further collapse into a dense globular structure, driven by contact surface area minimization between the polymeric binder and water molecules in the aqueous solvent.

As a result, the combined effects of the (1) various types of interactions that bring about the separation of the polymeric binder from the aqueous solvent, (2) presence of a hydrophobic hydrogen bond-forming structural unit in the polymeric binder and (3) subsequent structural transformation of the polymeric binder evoke the phase transition of the polymeric binder into a compact solid globule and bring about the precipitation of the polymeric binder. This pH-induced conformational transition of the polymeric binder minimizes contacts between the polymeric binder and water molecules in the aqueous solvent, which causes the polymeric binder to be less permeable to the flow of the water molecules.

The ratio in the proportion of the structural unit derived from a hydrogen bond-forming group-containing monomer (i) to the proportion of the structural unit derived from a hydrogen bond-forming group-containing monomer (ii) in the copolymer is delicate and is integral to the likelihood of the polymeric binder in undergoing conformational change with the addition of a precipitation agent into the first suspension and governs the usefulness of the method of recycling of an electrode as disclosed herein. In some embodiments, the molar ratio of the structural unit derived from a hydrogen bond-forming group-containing monomer (i) to the structural unit derived from a hydrogen bond-forming group-containing monomer (ii) in the copolymer is from about 0.1 to about 6.5.

Figure 10:
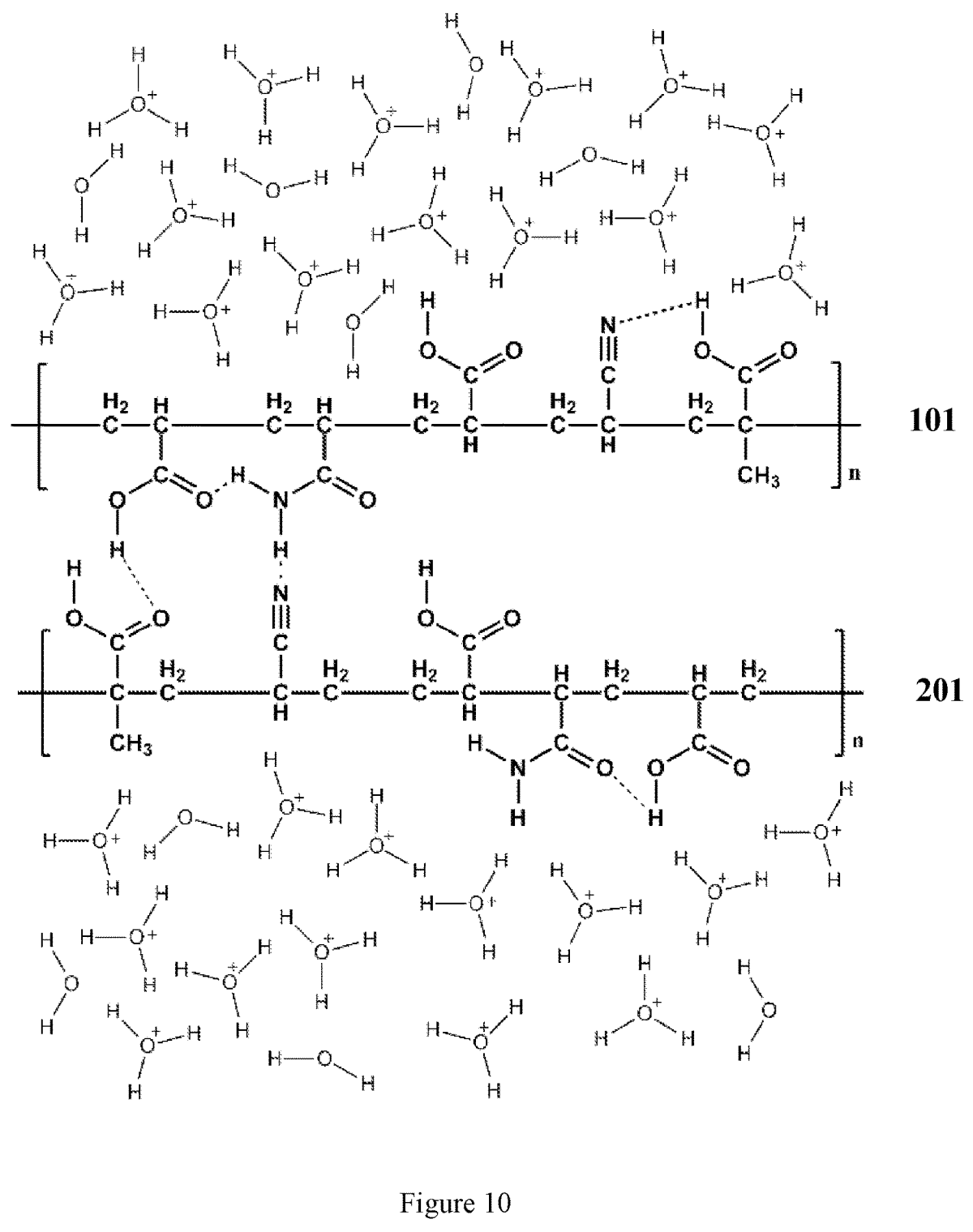

FIG. 10 illustrates a schematic of an embodiment of the proposed alterations in interactions between the polymeric binder and the aqueous solvent outlined in FIG. 9 as sufficient concentration of precipitation agent is added into the first suspension. The polymer compound in bold represents an embodiment of the polymeric binder comprises a copolymer comprising structural units derived from a carboxylic acid group-containing monomer, a nitrile group-containing monomer and an amide group-containing monomer. The precipitation agent in this case comprises hydrochloric acid, which is a type of strong acid; while the aqueous solvent in this scenario comprises water.

As hydrochloric acid is added into the first suspension, the complete dissociation of the hydrochloric acid in water occurs. The acid loses a proton and the water molecule takes up the proton and forms a hydroxonium ion, as shown below:

$$HCl+H_2O \rightarrow H_3O^+ + Cl^- \qquad \text{(Equation 5)}$$

The hydroxonium ions, generated from the ionization of the hydrochloric acid, eliminates most of the hydrogen bond-forming and ion-dipole interacting sites embedded in water molecules. This severely disrupts the intermolecular interactions that were originally established between the polymeric binder and the water molecules as illustrated in FIG. 9. This diminishes the extent of solvation of the polymeric binder by the water molecules in the second suspension.

With substantial reduction of water molecules in surrounding regions of the polymeric binder in the second suspension arising from the formation of hydroxonium ions, the strength of hydrogen bonding between the water molecules at the solvation shells around the polymeric binder is significantly weakened. The resulting demolition of the solvation shells developed around the polymeric binder enables greater accessibility or exposure of the polymeric binder to another polymeric binder chain in developing electrostatic attractions.

The hydroxonium ions formed from the dissociation of the hydrochloric acid tend to protonate anions of the carboxylic salt group-containing monomers (salts of acrylic acid and methacrylic acid in this case as illustrated in FIG. 10) that contribute to the make-up of the polymeric binder as described in FIG. 9. The protonation reaction of the carboxylic salt group-containing monomer is shown in Equation 6 below:

$$R_1COO^- + H_3O^+ \rightleftharpoons R_1COOH + H_2O \qquad \text{(Equation 6)}$$

wherein $R_1COOH$ is a carboxylic acid group-containing monomer that assists in the construction of the polymeric binder and $R_1COO^-$ is a conjugate base of the monomer $R_1COOH$ (i.e. a carboxylic salt group-containing monomer).

Prior to the incorporation of the hydrochloric acid into the first suspension, the anions of the carboxylic salt group-containing monomer that contribute to the construction of the polymeric binder exert an electrostatic repulsion against each other which gives a charged polymeric binder with a fully solvated coil structure.

Figure 11:
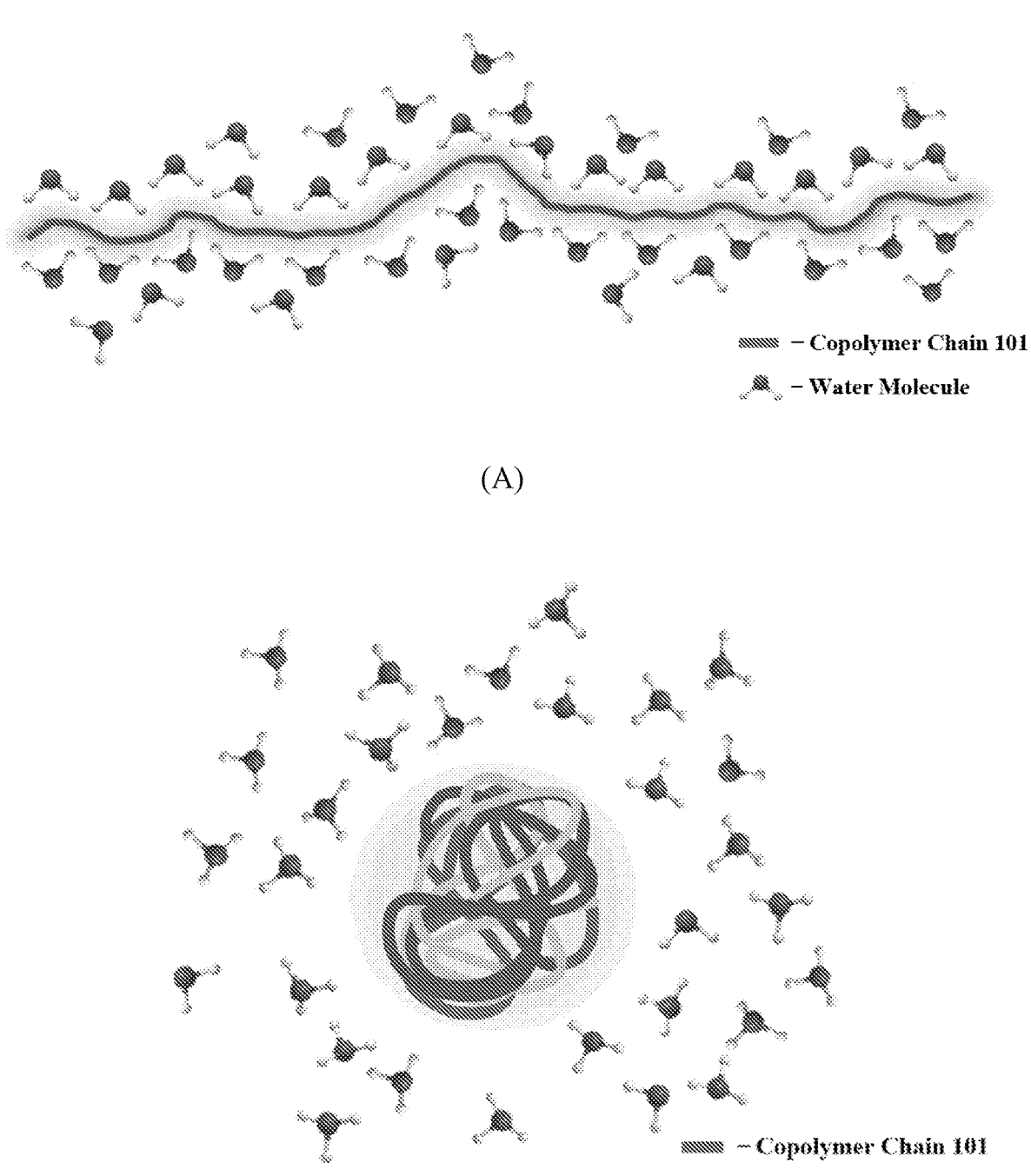
FIGS. 11A and 11B depict an embodiment of the structural conformations of a polymeric binder before and after the addition of a precipitation agent into a first suspension respectively.

This coil-like structure of the charged polymeric binder could be visualized in FIG. 11A. However, with the carboxylic salt group-containing monomer being subjected to protonation, the negatively charged acid salt group is transformed into an uncharged acid group in the monomer which constitutes the building block of the polymeric binder. The absence of repulsion forces within the polymeric binder initiates the winding motion of the polymeric binder.

The acid group-containing monomer that assists in the make-up of the polymeric binder as illustrated in FIG. 10 comprises an acrylic acid and a methacrylic acid. Acrylic acid has a $pK_a$ value of 4.3, while the $pK_a$ value of methacrylic acid is 4.7. The $pK_a$ of hydrochloric acid is −6.3. With the $pK_a$ value of hydrochloric acid (HCl) being substantially smaller than that of both acrylic acid and methacrylic acid (i.e. −6.3 ($pK_a$ of HCl)<<4.3 ($pK_a$ of acrylic acid) and 4.7 ($pK_a$ of methacrylic acid)), hydrochloric acid has a much stronger inclination to dissociate in forming hydroxonium ions. The strength of hydrochloric acid is extremely high that complete dissociation is observed, as demonstrated in Equation 5. Conversely, the salts of acrylic acid and methacrylic acid are more susceptible to protonation, shifting the reaction equilibrium of Equation 6 towards the right. The protonation of the salts of acrylic acid and methacrylic acid takes up a portion of the protons generated from the dissociation of hydrochloric acid in forming acrylic acid and methacrylic acid.

In FIG. 10, upon addition of hydrochloric acid into the first suspension, the acid undergoes ionization and generates hydroxonium ions and leads to the formation of a second suspension. The pH of the second suspension in this case is 2, which implies the presence of a high concentration of hydroxonium ions in the second suspension. This further shifts the equilibrium position of reaction of Equation 6 to the right, converts the majority of the salts of acrylic acid and methacrylic acid into their uncharged acid forms and eradicates any further ion-dipole interactions between the carboxylic salt group-containing monomers and the water molecules that were originally present in the first suspension.

Following the disruption of the electrostatic interactions between the polymeric binder and the water molecules in the aqueous solvent arising from the addition of the hydrochloric acid, the N atom of the nitrile group in copolymer chain 101 is found to interact with the H atom of the carboxyl group in the same copolymer chain via hydrogen bonding interactions. Furthermore, hydrogen bond is formed between the H atom of the amide group and the O atom of the carbonyl group of the carboxyl group within copolymer chain 101. Meanwhile, hydrogen bonding is also developed between the H atom of the carboxyl group and the O atom of the amide group within copolymer chain 201.

Interactions do not only occur between the various functional groups within the same copolymer chain but also between different copolymer chains. Hydrogen bond is formed between the hydroxyl (O—H) group in the carboxyl group of copolymer chain 101 and the carbonyl (C=O) group in the carboxyl group of copolymer chain 201. In addition, the N—H group of the amide group of copolymer chain 101 interacts with the nitrile (C≡N) group of copolymer chain 201 via hydrogen bonding interactions.

The independent intramolecular interactions between functional groups within copolymer chain 101 and copolymer chain 201 and the intermolecular interactions between the copolymer chains further promotes the coiling of the polymeric binder into a dense globular conformation and induces the precipitation of the polymeric binder. This globular structure of the uncharged polymeric binder could be visualized in FIG. 11B, which displays an embodiment of the structural conformation of the polymeric binder after the addition of a precipitation agent into a first suspension.

Figure 12:
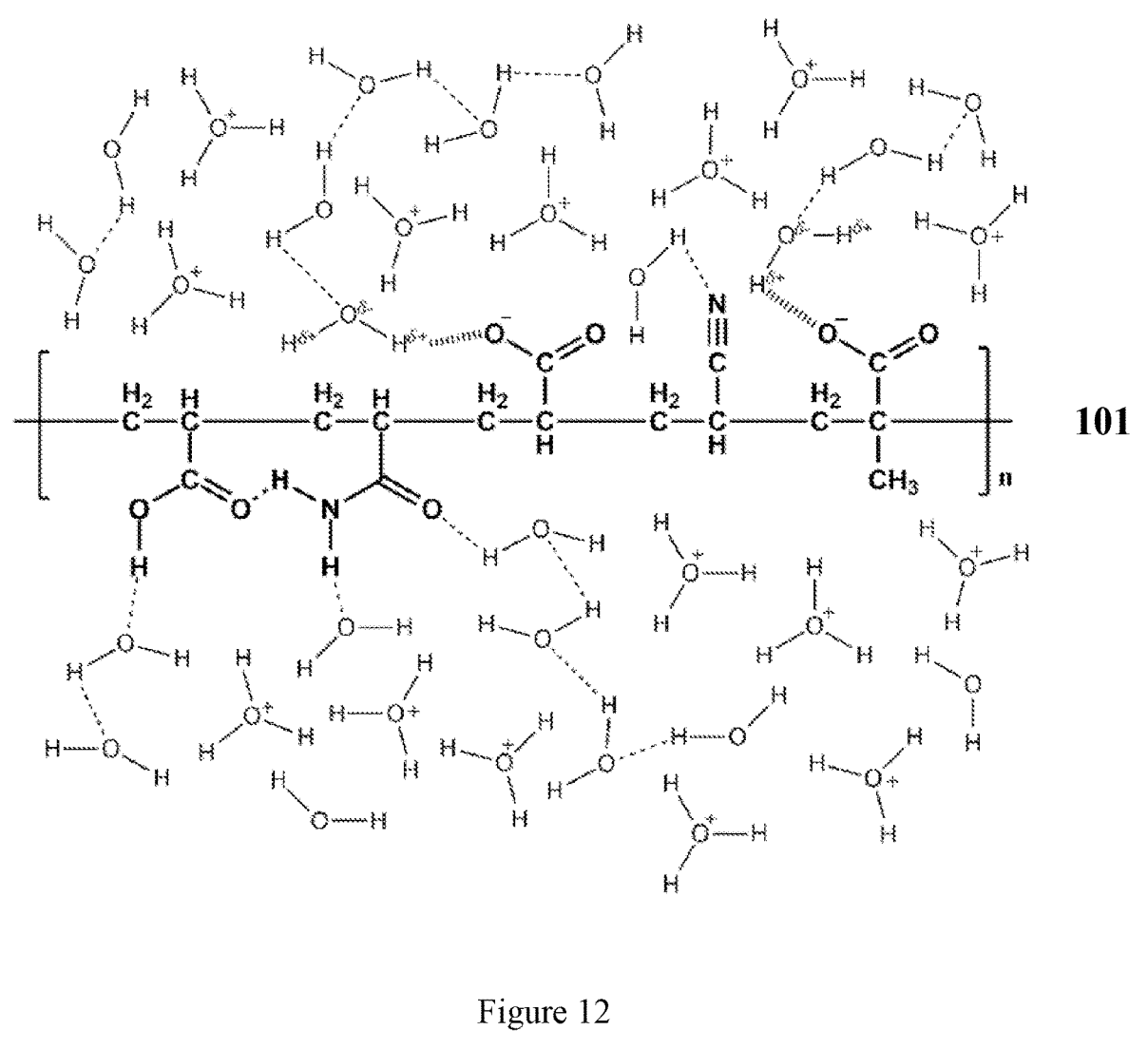

FIG. 12 illustrates a schematic of an embodiment of the proposed alterations in interactions between the polymeric binder and the aqueous solvent outlined in FIG. 9 with the addition of an insufficient amount or concentration of precipitation agent into the first suspension, forming a second suspension of a higher pH. The polymer compound in bold represents an embodiment of the polymeric binder comprises a copolymer comprising structural units derived from a carboxylic acid group-containing monomer, a nitrile group-containing monomer and an amide group-containing monomer. The precipitation agent in this case comprises hydrochloric acid, which is a type of strong acid; while the aqueous solvent in this scenario comprises water.

The hydrochloric acid dissociates and generates hydroxonium ions upon addition of the acid into the first suspension in forming a second suspension. Despite the utilization of a strong acid as the precipitation agent, the acid used is rather diluted, and thus the pH of the second suspension in this case is 5, which implies the presence of a significantly lower concentration of hydroxonium ions in the second suspension than that of in FIG. 10.

The low concentration of hydroxonium ions in the second suspension is insufficient in breaking up the intermolecular attractions that were formerly developed between the polymeric binder and the water molecules as shown in FIG. 9. There are segments of the polymeric binder that are still solvated by the water molecules. Moreover, part of the hydrogen bonds formed between the water molecules at the solvation shells around the copolymer chain remain, which impedes the access of the copolymer chain to other copolymer chains in developing interactions. The acid group-containing monomer that assists in the make-up of the polymeric binder as illustrated in FIG. 12 comprises an acrylic acid and a methacrylic acid. The small amount of hydroxonium ions in the second suspension is only capable of transforming a portion of the salts of acrylic acid and methacrylic acid into their uncharged acid forms.

This allows some of the ion-dipole interactions between the acid salt group-containing monomers and the water molecules to persist in the second suspension. Furthermore, intramolecular attractions between functional groups within the same copolymer chain occur in a lesser extent which arises from the inadequate bond disruption between the polymeric binder and the water molecules. All of these circumstances make the coil-to-globule structural conformation of the polymeric binder particularly challenging, and thus the precipitation of the polymeric binder could not be achieved.

It is highly recommended for the strength of the acid that is utilized as a precipitation agent to be higher than that of the acid group-containing monomer(s) that assists the construction of the polymeric binder to promote the preferential dissociation of the precipitation agent and the protonation of the conjugate base of the acid group-containing monomer(s). Accordingly, the $pK_a$ value of the acid as a precipitation agent should be lower than that of the acid group-containing monomer.

In some embodiments, the $pK_a$ of the strong acid is from about −10 to about 2, from about −9 to about 2, from about −8 to about 2, from about −7 to about 2, from about −6 to about 2, from about −5 to about 2, from about −4 to about 2, from about −3 to about 2, from about −2 to about 2, from about −1 to about 2, from about 0 to about 2, from about −10 to about 1.5, from about −9 to about 1.5, from about −8 to about 1.5, from about −7 to about 1.5, from about −6 to about 1.5, from about −5 to about 1.5, from about −4 to about 1.5, from about −3 to about 1.5, from about −2 to about 1.5, from about −1 to about 1.5, from about −10 to about 1, from about −9 to about 1, from about −8 to about 1, from about −7 to about 1, from about −6 to about 1, from about −5 to about 1, from about −4 to about 1 or from about −3 to about 1.

In some embodiments, the $pK_a$ of the strong acid is less than 2, less than 1, less than 0, less than −1, less than −2, less than −3, less than −4, less than −5, less than −6, less than −7, less than −8 or less than −9. In some embodiments, the $pK_a$ of the strong acid is more than −10, more than −9, more than −8, more than −7, more than −6, more than −5, more than −4, more than −3, more than −2, more than −1, more than 0 or more than 1.

In some embodiments, the $pK_a$ of the strong acid is between −10 and 2, between −9 and 2, between −8 and 2, between −7 and 2, between −6 and 2, between −5 and 2, between −4 and 2, between −3 and 2 or between −2 and 2.

In some embodiments, a polyprotic acid is utilized as a precipitation agent. A polyprotic acid refers to an acid that has two or more ionizable hydrogen ions (i.e. protons) per molecule. Some non-limiting examples of polyprotic acid include sulphuric acid, dithionic acid, dithionous acid, trithionic acid, tetrathionic acid, oxalic acid, malonic acid, tartronic acid, dihydroxymalonic acid, mesoxalic acid, butanedioic acid, methylmalonic acid, fumaric acid, maleic acid, 2-hydroxybutanedioic acid, tartaric acid, oxaloacetic acid, dioxosuccinic acid, glutaric acid, 2-oxoglutaric acid, 3-oxoglutaric acid, hexanedioic acid, citric acid, aconitic acid, isocitric acid, pimelic acid, trimesic acid, mellitic acid and malic acid. Some non-limiting examples of polyprotic strong acid include sulphuric acid, oxalic acid, mellitic acid, mesoxalic acid, dithionic acid, dithionous acid, trithionic acid and tetrathionic acid.

In a sulphuric acid, there are two protons that could be dissociated per molecule. With sulphuric acid having a $pK_a$ of −2.80 in attaining first proton dissociation, sulphuric acid is regarded as a strong acid. With the second proton in sulphuric acid dissociates at a $pK_a$ of 1.99, sulphuric acid after the dissociation of the first proton is still a strong acid, and thus it is necessary to consider the dissociation of the second protons. Therefore, the proton concentration premised on the dissociation from sulphuric acid is calculated based on the dissociation of both protons from one molecule of sulphuric acid. In the present invention, the strong acid specifically refers to an acid with a $pK_a$ of −10 to 2. In some embodiments, a polyprotic strong acid is an acid with a $pK_a$ of from about −10 to about 2 for the dissociation of the first proton, second proton, third proton or combinations thereof.

The pH value of the second suspension specifies the concentration of hydroxonium ions contained within. The pH value of the second suspension governs the states (i.e. protonated or deprotonated form) in which different acids predominantly exist when placed in the second suspension. For example, in the case where the pH of the second suspension is lower than the $pK_a$ of an acid A but higher than the $pK_a$ of an acid B, acid A would mainly exist in the second suspension in its protonated form, while acid B would primarily exist in its deprotonated form.

It would be highly favorable for the $pK_a$ of the acid to be utilized as the precipitation agent and the pH of the second suspension to be lower than the $pK_a$ value(s) of the acid group-containing monomer(s) that contribute the make-up of the polymeric binder. This enables the dissociation of the precipitation agent and the preferential protonation of the conjugate base of the acid group-containing monomer (existing in the second suspension in its protonated form), and thus consequently assists the separation of the polymeric binder from the aqueous solvent and the structural transformation of the polymeric binder.

The strength of the response of an individual monomeric unit, alone, to changes in pH of the second suspension, might be weak. However, these weak responses, compounded hundreds or thousands of times in the assembly of a polymeric binder, create a considerable force for driving the structural transformation of the entire polymeric binder. For this reason, a significant change in conformation of the polymeric binder could be induced by slight changes in the pH of the second suspension. In some embodiments, when a strong acid, being utilized as the precipitation agent, is added into a first suspension to form a second suspension, the pH of the second suspension is from about 0.2 to about 4.5, from about 0.2 to about 4, from about 0.2 to about 3.5, from about 0.2 to about 3, from about 0.2 to about 2.5, from about 0.4 to about 4.5, from about 0.4 to about 4, from about 0.4 to about 3.5, from about 0.4 to about 3, from about 0.4 to about 2.5, from about 0.6 to about 4.5, from about 0.6 to about 4, from about 0.6 to about 3.5, from about 0.6 to about 3, from about 0.6 to about 2.5, from about 0.8 to about 4.5, from about 0.8 to about 4, from about 0.8 to about 3.5, from about 0.8 to about 3, from about 0.8 to about 2.5, from about 1 to about 4.5, from about 1 to about 4, from about 1 to about 3.5, from about 1 to about 3, from about 1.2 to about 4.5, from about 1.2 to about 4, from about 1.2 to about 3.5, from about 1.2 to about 3, from about 1.4 to about 4.5, from about 1.4 to about 4, from about 1.4 to about 3.5, from about 1.4 to about 3, from about 1.6 to about 4.5, from about 1.6 to about 4, from about 1.6 to about 3.5, from about 1.8 to about 4.5, from about 1.8 to about 4, from about 1.8 to about 3.5, from about 2 to about 4.5, from about 2 to about 4 or from about 2 to about 3.5.

In some embodiments, when a strong acid, being utilized as the precipitation agent, is added into a first suspension to form a second suspension, the pH of the second suspension is less than 4.5, less than 4.3, less than 4.1, less than 3.8, less than 3.6, less than 3.4, less than 3.2, less than 3, less than 2.8, less than 2.6, less than 2.4, less than 2.2, less than 2, less than 1.5, less than 1 or less than 0.5. In some embodiments, when a strong acid, being utilized as the precipitation agent, is added into a first suspension to form a second suspension, the pH of the second suspension is more than 0.2, more than 0.4, more than 0.6, more than 0.8, more than 1, more than 1.2, more than 1.4, more than 1.6, more than 1.8, more than 2, more than 2.2, more than 2.4, more than 2.6, more than 2.8, more than 3, more than 3.5 or more than 4.

In some embodiments, the weak acid of each of the delamination agent and the precipitation agent may be the same or different from each other. In some embodiments, the $pK_a$ of the weak acid is from about 2 to about 7, from about 3 to about 7, from about 4 to about 7, from about 2 to about 6.5, from about 3 to about 6.5, from about 4 to about 6.5, from about 2 to about 6, from about 3 to about 6, from about 4 to about 6, from about 2 to about 5.5, from about 3 to about 5.5, from about 4 to about 5.5, from about 2 to about 5.4, from about 2.5 to about 5.4, from about 3 to about 5.4, from about 3.5 to about 5.4, from about 4 to about 5.4, from about 2 to about 5.2, from about 2.5 to about 5.2, from about 3 to about 5.2, from about 3.5 to about 5.2, from about 4 to about 5.2, from about 2 to about 5, from about 2.5 to about 5, from about 3 to about 5, from about 3.5 to about 5, from about 2 to about 4.5, from about 2 to about 4.6, from about 2 to about 4.4, from about 2 to about 4.2, from about 2 to about 4, from about 2 to about 3.5, from about 2.2 to about 4.8, from about 2.5 to about 4.8 or from about 2.5 to about 3.6.

In some embodiments, the $pK_a$ of the weak acid is less than 7, less than 6.5, less than 6, less than 5.5, less than 5, less than 4.5, less than 4, less than 3.5, less than 3 or less than 2.5. In some embodiments, the $pK_a$ of the weak acid is more than 2, more than 2.2, more than 2.4, more than 2.6, more than 2.8, more than 3, more than 3.5, more than 4, more than 4.5, more than 5, more than 5.5, more than 6 or more than 6.5.

In some embodiments, the $pK_a$ of the weak acid is between 2 and 7, between 2 and 6.5, between 2 and 6, between 2 and 5.5, between 2 and 5, between 2 and 4.8, between 2 and 4.6, between 2 and 4.4, between 2 and 4.2 or between 2 and 4.

Some non-limiting examples of polyprotic weak acid include oxalic acid, malonic acid, tartronic acid, dihydroxy-malonic acid, mesoxalic acid, butanedioic acid, methylma-lonic acid, fumaric acid, maleic acid, 2-hydroxybutanedioic acid, tartaric acid, oxaloacetic acid, dioxosuccinic acid, glutaric acid, 2-oxoglutaric acid, 3-oxoglutaric acid, hexane-dioic acid, citric acid, aconitic acid, isocitric acid, pimelic acid, trimesic acid, mellitic acid, malic acid, dithionous acid and orthosilicic acid.

In a phosphoric acid, there are three protons that could be dissociated per molecule. With phosphoric acid having a $pK_a$ of 2.12 in attaining first proton dissociation, phosphoric acid is regarded as a weak acid. Meanwhile, with the second proton in phosphoric acid dissociates at a $pK_a$ of 7.21 and the third at a $pK_a$ of 12.32, phosphoric acid after the dissociation of the first proton is no longer a weak acid, and thus it is not necessary to consider the dissociation of the second and subsequent protons. Therefore, the proton concentration premised on the dissociation from phosphoric acid is calculated assuming that only one proton dissociates from one molecule of phosphoric acid.

In the present invention, the weak acid specifically refers to an acid with a $pK_a$ of 2 to 7. In some embodiments, a polyprotic weak acid is an acid with a $pK_a$ of from about 2 to about 7 for the dissociation of the first proton, second proton, third proton or combinations thereof. In some embodiments, a polyprotic weak acid is an acid with a $pK_a$ of between 2 and 7 for the dissociation of the first proton, second proton, third proton or combinations thereof.

In the case of oxalic acid, there are two protons that could be dissociated per molecule. With oxalic acid having a $pK_a$ of 1.25 in attaining first proton dissociation, oxalic acid is regarded as a strong acid. With the second proton in oxalic acid dissociates at a $pK_a$ of 3.81, oxalic acid after the dissociation of the first proton is a weak acid. Therefore, the proton concentration premised on the dissociation from oxalic acid is calculated based on the dissociation of the first proton and partial dissociation of the second proton from one molecule of oxalic acid. An oxalic acid, therefore, could be regarded as both a polyprotic strong acid (associated with the dissociation of the first proton) and a polyprotic weak acid (related to the dissociation of the second proton).

In some embodiments, when a weak acid, being utilized as the precipitation agent, is added into a first suspension to form a second suspension, the pH of the second suspension is from about 0.5 to about 3, from about 0.5 to about 2.8, from about 0.5 to about 2.6, from about 0.5 to about 2.4, from about 0.5 to about 2.2, from about 0.5 to about 2, from about 0.5 to about 1.8, from about 0.5 to about 1.6, from about 0.75 to about 3, from about 0.75 to about 2.8, from about 0.75 to about 2.6, from about 0.75 to about 2.4, from about 0.75 to about 2.2, from about 0.75 to about 2, from about 0.75 to about 1.8, from about 1 to about 3, from about 1 to about 2.8, from about 1 to about 2.6, from about 1 to about 2.4, from about 1 to about 2.2, from about 1 to about 2, from about 1.2 to about 3, from about 1.2 to about 2.8, from about 1.2 to about 2.6, from about 1.2 to about 2.4, from about 1.5 to about 3 or from about 1.5 to about 2.8.

In some embodiments, when a weak acid, being utilized as the precipitation agent, is added into a first suspension to form a second suspension, the pH of the second suspension is less than 3, less than 2.8, less than 2.6, less than 2.4, less than 2.2, less than 2, less than 1.8, less than 1.6, less than 1.4, less than 1.2, less than 1 or less than 0.8. In some embodiments, when a weak acid, being utilized as the precipitation agent, is added into a first suspension to form a second suspension, the pH of the second suspension is more than 0.5, more than 0.8, more than 1, more than 1.2, more than 1.4, more than 1.6, more than 1.8, more than 2, more than 2.2, more than 2.4, more than 2.6 or more than 2.8.

In some embodiments, the pH of the second suspension is from about 0.2 to about 4.5, from about 0.2 to about 4, from about 0.2 to about 3.5, from about 0.2 to about 3, from about 0.2 to about 2.5, from about 0.2 to about 2, from about 0.4 to about 4.5, from about 0.4 to about 4, from about 0.4 to about 3.5, from about 0.4 to about 3, from about 0.4 to about 2.5, from about 0.4 to about 2, from about 0.6 to about 4.5, from about 0.6 to about 4, from about 0.6 to about 3.5, from about 0.6 to about 3, from about 0.6 to about 2.5, from about 0.6 to about 2, from about 0.8 to about 4.5, from about 0.8 to about 4, from about 0.8 to about 3.5, from about 0.8 to about 3, from about 0.8 to about 2.5, from about 0.8 to about 2, from about 1 to about 4.5, from about 1 to about 4, from about 1 to about 3.5, from about 1 to about 3, from about 1.2 to about 4.5, from about 1.2 to about 4, from about 1.2 to about 3.5, from about 1.2 to about 3, from about 1.2 to about 2.5, from about 1.4 to about 4.5, from about 1.4 to about 4, from about 1.4 to about 3.5, from about 1.4 to about 3, from about 1.6 to about 4.5, from about 1.6 to about 4, from about 1.6 to about 3.5, from about 1.8 to about 4.5, from about 1.8 to about 4, from about 1.8 to about 3.5, from about 1.8 to about 3, from about 2 to about 4.5, from about 2 to about 4 or from about 2 to about 3.5.

In some embodiments, the pH of the second suspension is less than 4.5, less than 4.3, less than 4.1, less than 3.8, less than 3.6, less than 3.4, less than 3.2, less than 3, less than 2.8, less than 2.6, less than 2.4, less than 2.2, less than 2, less than 1.5, less than 1 or less than 0.5. In some embodiments, the pH of the second suspension is more than 0.2, more than 0.4, more than 0.6, more than 0.8, more than 1, more than 1.2, more than 1.4, more than 1.6, more than 1.8, more than 2, more than 2.2, more than 2.4, more than 2.6, more than 2.8, more than 3, more than 3.5 or more than 4.

In some embodiments, when the electrode layer material and the precipitation agent are simultaneously added into an aqueous solvent in forming a first suspension, the pH of the first suspension is from about 0.2 to about 4.5, from about 0.2 to about 4, from about 0.2 to about 3.5, from about 0.2 to about 3, from about 0.2 to about 2.5 or from about 0.2 to about 2. In some embodiments, when the electrode layer material and the precipitation agent are simultaneously added into an aqueous solvent in forming a first suspension, the pH of the first suspension is less than 4.5, less than 4, less than 3.5, less than 3, less than 2.5 or less than 2.

In some embodiments, the pH of the second suspension is from about 0.2 pH unit to about 6.8 pH units, from about 0.2 pH unit to about 6 pH units, from about 0.2 pH unit to about 5.5 pH units, from about 0.2 pH unit to about 5 pH units, from about 0.2 pH unit to about 4.5 pH units, from about 0.2 pH unit to about 4 pH units, from about 0.2 pH unit to about 3.5 pH units, from about 0.2 pH unit to about 3 pH units, from about 0.5 pH unit to about 6.8 pH units, from about 0.5 pH unit to about 6 pH units, from about 0.5 pH unit to about 5.5 pH units, from about 0.5 pH unit to about 5 pH units, from about 0.5 pH unit to about 4.5 pH units, from about 0.5 pH unit to about 4 pH units, from about 0.5 pH unit to about 3.5 pH units, from about 0.5 pH unit to about 3 pH units, from about 1 pH unit to about 6.8 pH units, from about 1 pH unit to about 6 pH units, from about 1 pH unit to about 5.5 pH units, from about 1 pH unit to about 5 pH units, from about 1 pH unit to about 4.5 pH units, from about 1 pH unit to about 4 pH units, from about 1 pH unit to about 3.5 pH units or from about 1 pH unit to about 3 pH units, below the $pK_a$ of the acid group-containing monomer.

In some embodiments, the pH of the second suspension is at least 0.2 pH unit, at least 0.5 pH unit, at least 1 pH unit, at least 1.5 pH units, at least 2 pH units, at least 2.5 pH units, at least 3 pH units, at least 3.5 pH units, at least 4 pH units, at least 4.5 pH units, at least 5 pH units, at least 5.5 pH units or at least 6 pH units, below the $pK_a$ of the acid group-containing monomer. In some embodiments, the pH of the second suspension is at most 6.8 pH units, at most 6 pH units, at most 5.5 pH units, at most 5 pH units, at most 4.5 pH units, at most 4 pH units, at most 3.5 pH units, at most 3 pH units, at most 2.5 pH units, at most 2 pH units, at most 1.5 pH units or at most 1 pH unit, below the $pK_a$ of the acid group-containing monomer.

In some embodiments, when the electrode layer material and the precipitation agent are simultaneously added into an aqueous solvent in forming a first suspension, the pH of the first suspension is from about 0.2 pH unit to about 6.8 pH units below the $pK_a$ of the acid group-containing monomer. In some embodiments, when the electrode layer material and the precipitation agent are simultaneously added into an aqueous solvent in forming a first suspension, the pH of the first suspension is at least 0.2 pH unit below the $pK_a$ of the acid group-containing monomer.

The $pK_a$ specifies the strength of an acid. A lower $pK_a$ value indicates a stronger acid, that is, an acid which dissociates more fully in an aqueous solvent such as water. It is desirable for the strength of the acid group-containing monomer(s) that contribute to the make-up of the polymeric binder to be lower than that of the acid that is utilized as a precipitation agent to facilitate the deprotonation of the precipitation agent and the protonation of the conjugate base of the acid group-containing monomer(s). For this reason, the $pK_a$ value of the acid group-containing monomer should be higher than that of the acid to be utilized as a precipitation agent. In some embodiments, the $pK_a$ of the acid group-containing monomer is from about 2.5 to about 7, from about 2.5 to about 6.5, from about 2.5 to about 6, from about 2.5 to about 5.5, from about 2.5 to about 5, from about 2.5 to about 4.5, from about 2.5 to about 4, from about 2.8 to about 7, from about 2.8 to about 6.5, from about 2.8 to about 6, from about 2.8 to about 5.5, from about 2.8 to about 5, from about 2.8 to about 4.5, from about 2.8 to about 4, from about 3 to about 7, from about 3 to about 6.5, from about 3 to about 6, from about 3 to about 5.5, from about 3 to about 5, from about 3 to about 4.5, from about 3.5 to about 7, from about 3.5 to about 6.5, from about 3.5 to about 6, from about 3.5 to about 5.5, from about 3.5 to about 5, from about 4 to about 7, from about 4 to about 6.5 or from about 4 to about 6.

In some embodiments, the $pK_a$ of the acid group-containing monomer is less than 7, less than 6.5, less than 6, less than 5.5, less than 5, less than 4.5, less than 4, less than 3.5 or less than 3. In some embodiments, the $pK_a$ of the acid group-containing monomer is more than 2.5, more than 3, more than 3.5, more than 4, more than 4.5, more than 5, more than 5.5, more than 6 or more than 6.5.

In some embodiments, the $pK_a$ of the acid group-containing monomer is from about 0.1 pH unit to about 17 pH units, from about 0.1 pH unit to about 15 pH units, from about 0.1 pH unit to about 10 pH units, from about 0.1 pH unit to about 8 pH units, from about 0.1 pH unit to about 6 pH units, from about 0.1 pH unit to about 4 pH units, from about 0.2 pH unit to about 17 pH units, from about 0.2 pH unit to about 15 pH units, from about 0.2 pH unit to about 10 pH units, from about 0.2 pH unit to about 8 pH units, from about 0.2 pH unit to about 6 pH units, from about 0.2 pH unit to about 4 pH units, from about 0.5 pH unit to about 17 pH units, from about 0.5 pH unit to about 15 pH units, from about 0.5 pH unit to about 10 pH units, from about 0.5 pH unit to about 8 pH units or from about 0.5 pH unit to about 5 pH units above the $pK_a$ of the precipitation agent.

In some embodiments, the $pK_a$ of the acid group-containing monomer is at least 0.1 pH unit, at least 0.2 pH unit, at least 0.3 pH unit, at least 0.4 pH unit, at least 0.5 pH unit, at least 0.6 pH unit, at least 0.7 pH unit, at least 0.8 pH unit, at least 0.9 pH unit, at least 1 pH unit, at least 1.5 pH units, at least 2 pH units, at least 2.5 pH units or at least 3 pH units above the $pK_a$ of the precipitation agent.

In some embodiments, the concentration of the precipitation agent is from about 1 M to about 8 M, from about 1 M to about 7 M, from about 1 M to about 6 M, from about 1 M to about 5 M, from about 1 M to about 4 M, from about 2 M to about 8 M, from about 2 M to about 7 M, from about 2 M to about 6 M, from about 2 M to about 5 M, from about 3 M to about 8 M, from about 3 M to about 7 M, from about 3 M to about 6 M or from about 4 M to about 8 M.

In some embodiments, the concentration of the precipitation agent is less than 8 M, less than 7 M, less than 6 M, less than 5 M, less than 4 M, less than 3 M or less than 2 M. In some embodiments, the concentration of the precipitation agent is more than 1 M, more than 2 M, more than 3 M, more than 4 M, more than 5 M, more than 6 M or more than 7 M.

Figure 13:
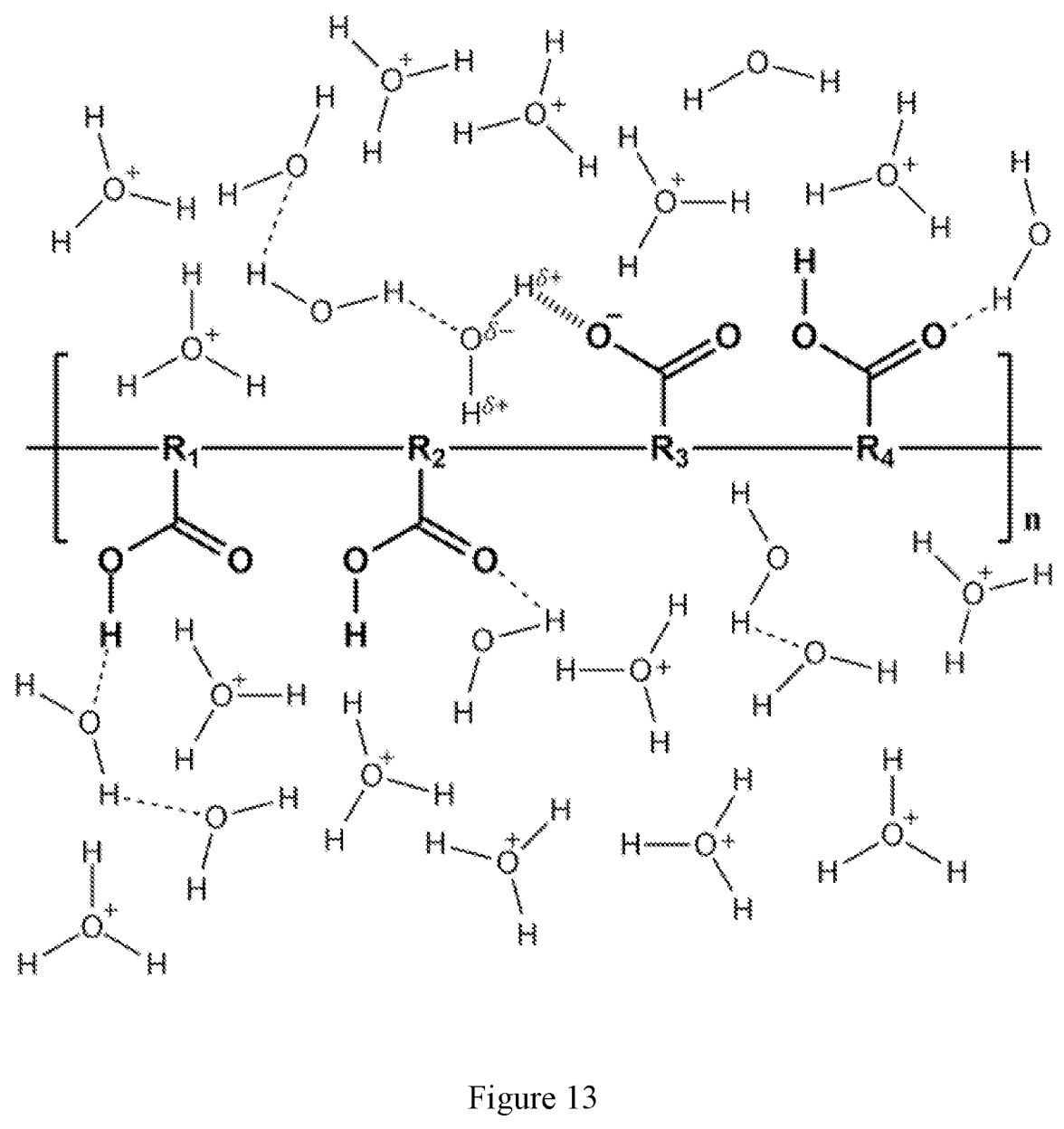

FIG. 13 illustrates a schematic of an embodiment of the proposed alterations in interactions between a polymeric binder which comprises a copolymer comprising structural unit(s) derived from one or more carboxylic acid group-containing monomer(s) and the aqueous solvent as sufficient concentration of precipitation agent is added into the first suspension. The polymer compound in bold represents the polymeric binder. The precipitation agent in this case comprises hydrochloric acid, which is a type of strong acid; while the aqueous solvent in this scenario comprises water. The denotation $R_1$, $R_2$, $R_3$ and $R_4$ in FIG. 13 independently has the general formula $C_nH_{2n}$, where n is an integer that is greater than 0. The H atoms in the above general formula can be unsubstituted or substituted with one or more suitable substituents and does not affect the functionality of the entire polymeric binder. Each of $R_1$, $R_2$, $R_3$ and $R_4$ can be independently the same or different from one another.

Upon the addition of hydrochloric acid into the first suspension, the acid dissociates and produces hydroxonium ions, leading to the formation of a second suspension. However, with the entire copolymer chain comprising structural unit(s) derived from only acid group-containing monomer(s), a large amount of the protons is taken up to protonate the acid salt groups of the polymeric binder into acid groups. Therefore, a considerable amount of hydroxonium ions is reverted into water molecules in regions near the polymeric binder which allows the formation of hydrogen bonds between the acid group-containing monomer(s) that assists in the construction of the polymeric binder and the water molecules. In addition, there might also be segments of acid salt groups of the polymeric binder not being subjected to protonation due to the nature of equilibrium, orientations of the involved parties and also the comparatively higher demands in protonation since the entire copolymer chain comprising a structural unit derived from only acid group-containing monomer(s). This enables the acid salt group-containing monomer(s) to still be capable of interacting with the water molecules via ion-dipole interactions. The failure in completely disrupting the electrostatic attractions between the polymeric binder and the water molecules makes the precipitation of the polymeric binder unattainable. This provides a justification for the incapability of polyacrylic acid (PAA) to precipitate in the second suspension.

The precipitation steps (steps 103, 104 and 105) of the method disclosed herein is specifically developed to precipitate a polymeric binder, wherein the polymeric binder comprises a copolymer comprising a structural unit derived from an acid group-containing monomer and a structural unit derived from a hydrogen bond-forming group-containing monomer (ii). Based on our studies, the absence of either one of a structural unit derived from an acid group-containing monomer or a hydrogen bond-forming group-containing monomer (ii) in the polymeric binder, the precipitation of the polymeric binder would not occur. In the case where a structural unit derived from an acid group-containing monomer is absent in the polymeric binder, the polymeric binder comprising only a structural unit derived from a hydrogen bond-forming group-containing monomer (ii) such as a nitrile group-containing monomer would be inherently hydrophobic throughout the entire polymer chain, and thus would not be miscible with water to begin with. This polymer type is known as non-aqueous polymeric binder. The precipitation steps of the method disclosed herein is not applicable to the precipitation of a non-aqueous polymeric binder.

In another case where a structural unit derived from a hydrogen bond-forming group-containing monomer (ii) such as a nitrile group-containing monomer is withdrawn from the polymeric binder, with the addition of a precipitation agent into the first suspension, the polymeric binder comprising only a structural unit derived from an acid group-containing monomer could not be separated from the aqueous solvent and undergo a coil-to-globule structural transformation, and hence there is no observable precipitation of the polymeric binder. As mentioned above, separation between the acid group-containing monomer(s) and the aqueous solvent could not be achieved since the intermolecular attractions between the polymeric binder and the water molecules persist despite the addition of a precipitation agent into the first suspension. Failure to undergo structural conformation is attributed to the absence of a hydrophobic hydrogen bond-forming functional group in a structural unit in the polymeric binder which is required to trigger the polymeric binder structural transformation, initiating the phase transitional process and thus leading to precipitation of the polymeric binder. For that reason, in order to produce a successful precipitation of a polymeric binder, the presence of both of a structural unit derived from an acid group-containing monomer and a structural unit derived from a hydrogen bond-forming group-containing monomer (ii) in the copolymer of the polymeric binder is recommended.

The precipitation steps (steps 103, 104 and 105) of the method disclosed herein allows the constituents of an electrode layer material, e.g. a polymeric binder and an electrode active material, to be effectively separated by the simple use of a precipitation agent. This specifically allows the isolation or retrieval of invaluable electrode active material which can be reused in the batteries manufacturing process.

In some embodiments, with the addition of a precipitation agent into the first suspension, metal constituents of the electrode layer material (e.g. electrode active material) have a tendency to dissolve in the acid-containing second suspension, which brings about the solid-to-liquid phase change to the metal constituents. Upon the addition of a precipitation agent into the first suspension in forming a second suspension, the electrode active material begins to dissolve whereas the polymeric binder is precipitated. Furthermore, with the dissolution of the electrode active material in the second suspension, any previously undissolved polymeric binder within the clusters of electrode active material could be exposed and thus be precipitated in the second suspension. This allows separation of the electrode active material from the precipitated polymeric binder.

In some embodiments, the additional additives for enhancing electrode properties in the electrode layer material do not dissolve in the first suspension and/or the second suspension disclosed herein. In some embodiments, the conductive agent does not dissolve in the first suspension and/or the second suspension disclosed herein. In the case where a first suspension comprises a combination of a polymeric binder, an electrode active material, a conductive agent and an aqueous solvent, upon the addition of a precipitation agent into the first suspension in forming a second suspension, the electrode active material begins to dissolve in the second suspension, the conductive agent remains as solids and the polymeric binder is precipitated. This allows separation of the electrode active material from the polymeric binder and the conductive agent. The dissolved electrode active material could thus be extracted from the second suspension to be further reused in the subsequent battery manufacturing process.

In some embodiments, the additional additives for enhancing electrode properties and the anode active materials in the electrode layer material do not dissolve in the first suspension and/or the second suspension disclosed herein. In some embodiments, the conductive agent and the anode active materials do not dissolve in the first suspension and/or the second suspension disclosed herein. In the case where a first suspension comprises a combination of a polymeric binder, a cathode active material, an anode active material, a conductive agent and an aqueous solvent, upon the addition of a precipitation agent into the first suspension in forming a second suspension, the cathode active material begins to dissolve in the second suspension, the conductive agent and the anode active material remain as solids and the polymeric binder is precipitated. This allows separation of the cathode active material from the polymeric binder, the conductive agent and the anode active material. The dissolved cathode active material could thus be extracted from the second suspension to be further reused in the subsequent battery manufacturing process. In some embodiments, the additional additives for enhancing electrode properties and the anode active materials in the electrode layer material may dissolve in the first suspension and/or the second suspension.

Figure 14:
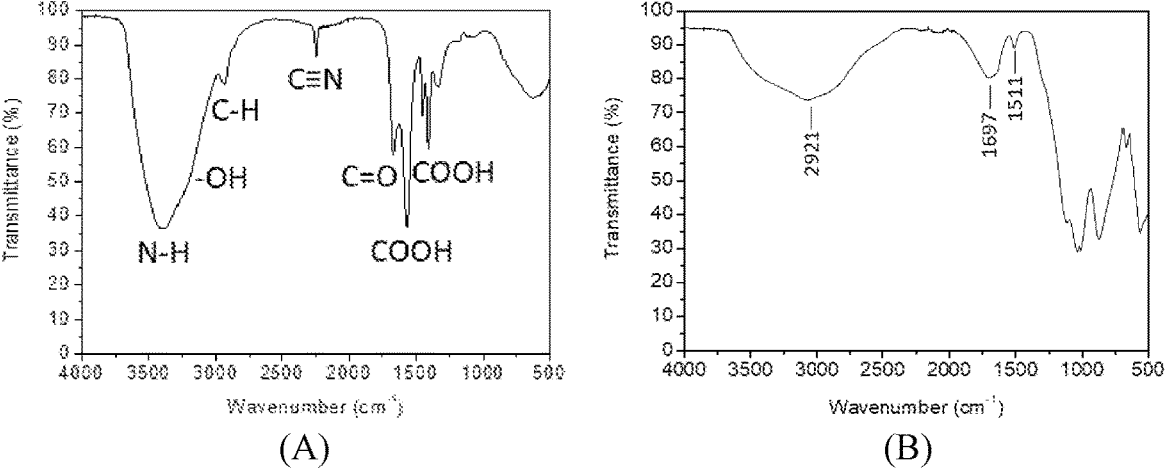
FIGS. 14A and 14B illustrate the infrared spectroscopy of the precipitated polymeric binder and the remaining second suspension of Example 33 respectively.

FIGS. 14A and 14B illustrate the infrared spectroscopy of the precipitated polymeric binder and the remaining second suspension of Example 33 respectively. The polymeric binder comprises structural units derived from a carboxylic acid group-containing monomer, a nitrile group-containing monomer and an amide group-containing monomer.

FIG. 14A is used for the identification of the precipitated chemical substances by detecting the various functional groups present within. The figure presents the 2242 $cm^{-1}$ (C≡N), 3400 $cm^{-1}$ (N—H), 1600 $cm^{-1}$ (C=O), 1500 $cm^{-1}$ (COOH) and 1403 $cm^{-1}$ (COOH) peaks observed in transmittance, which are consistent with the nitrile group, amide group and carboxylic group comprised within the polymeric binder that was originally present in the first suspension. This validates that the precipitated chemical substances are, in fact, the polymeric binder disclosed in the present invention.

Figure 15:
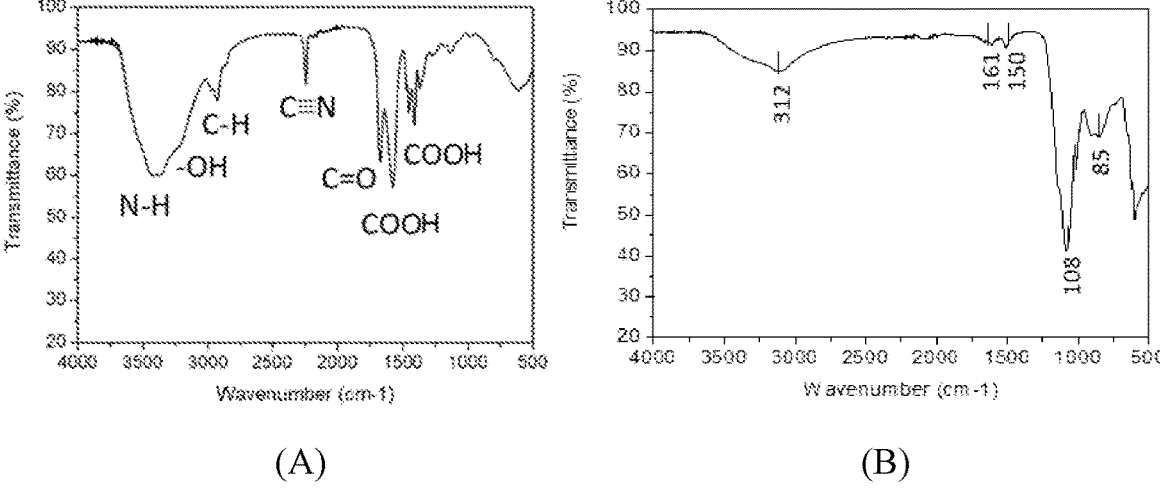
FIGS. 15A and 15B illustrate the infrared spectroscopy of the precipitated polymeric binder and the remaining second suspension of Example 34 respectively.

Meanwhile, FIG. 14B is used to uncover the effectiveness and quality of precipitation of the polymeric binder from the second suspension, i.e. to find out if the polymeric binder is still present in the remaining second suspension. None of the characteristic peaks associated with a nitrile group, an amide group and a carboxylic group that correspond to the polymeric binder is found in the infra-red spectrum in FIG. 14B. It is evident that no observable polymeric binder is present in the remainder of the second suspension. This provides evidence that the precipitation steps of the present invention are highly effective in precipitating the polymeric binder, avoids contamination of the polymeric binder and enables excellent materials recovery. At the same time, with FIGS. 15A and 15B illustrating the infrared spectroscopy of the precipitated polymeric binder and the remaining second suspension of Example 34 respectively that display similar results as FIGS. 14A and 14B, this further affirms the applicability and efficacy of the method disclosed herein in precipitating a polymeric binder.

After the addition of the precipitation agent into the first suspension in forming a second suspension, the time allowed for the precipitation agent to induce precipitation of the polymeric binder is crucial in attaining precipitation of the polymeric binder in the second suspension. When there is an inadequate amount of contact time between the precipitation agent and the constituents of the first suspension, the precipitation agent might not possess sufficient time to destabilize, disrupt and break the bonds that are initially formed between the polymeric binder and the aqueous solvent to an extent that precipitation of the polymeric binder is made possible. In some embodiments, after the addition of the precipitation agent into the first suspension in forming a second suspension, the precipitation agent may be placed in the second suspension with or without stirring for a time period of from about 1 min to about 180 mins, from about 1 min to about 150 mins, from about 1 min to about 120 mins, from about 1 min to about 90 mins, from about 1 min to about 60 mins, from about 5 min to about 180 mins, from about 5 min to about 150 mins, from about 5 mins to about 120 mins, from about 5 mins to about 90 mins, from about 5 mins to about 60 mins, from about 10 mins to about 120 mins, from about 10 mins to about 90 mins, from about 10 mins to about 60 mins, from about 20 mins to about 120 mins, from about 20 mins to about 90 mins, from about 20 mins to about 60 mins, from about 30 mins to about 120 mins or from about 30 mins to about 90 mins.

In some embodiments, after the addition of the precipitation agent into the first suspension in forming a second suspension, the precipitation agent may be placed in the second suspension with or without stirring for a time period of less than 180 mins, less than 150 mins, less than 120 mins, less than 90 mins, less than 60 mins, less than 40 mins, less than 20 mins or less than 10 mins. In some embodiments, after the addition of the precipitation agent into the first suspension in forming a second suspension, the precipitation agent may be placed in the second suspension with or without stirring for a time period of more than 1 min, more than 10 mins, more than 20 mins, more than 40 mins, more than 60 mins, more than 80 mins, more than 100 mins, more than 120 mins or more than 150 mins.

One of the most important factors in governing the precipitation of a polymeric binder is the temperature of the second suspension. Hydrogen bonding is primarily formed at relatively low temperatures and weakens upon an increase in temperature. In addition, hydrophobic interactions are strengthened at high temperatures. Hence, a second suspension with a slight temperature elevation can help facilitate the precipitation of a polymeric binder via the weakening of hydrogen bonding interactions between the polymeric binder and the aqueous solvent and the strengthening of hydrophobic interactions of the hydrogen bond-forming group-containing monomer (ii) that contribute the make-up of the polymeric binder.

In some embodiments, the precipitation agent is added into the first suspension at a temperature of from about 20° C. to about 100° C., from about 20° C. to about 95° C., from about 20° C. to about 85° C., from about 20° C. to about 75° C., from about 20° C. to about 65° C., from about 20° C. to about 55° C., from about 30° C. to about 100° C., from about 30° C. to about 95° C., from about 30° C. to about 85° C., from about 30° C. to about 75° C., from about 30° C. to about 65° C., from about 40° C. to about 95° C., from about 40° C. to about 85° C., from about 40° C. to about 75° C., from about 50° C. to about 90° C. or from about 50° C. to about 80° C.

In some embodiments, the precipitation agent is added into the first suspension at a temperature of less than 95° C., less than 85° C., less than 75° C., less than 65° C., less than 55° C., less than 45° C., less than 35° C. or less than 25° C. In some embodiments, the precipitation agent is added into the first suspension at a temperature of more than 20° C., more than 30° C., more than 40° C., more than 50° C., more than 60° C., more than 70° C., more than 80° C. or more than 90° C.

With a higher proportion of charged functional group(s) (e.g. acid salt group) in the copolymer that is/are capable of developing ion-dipole interactions with the water molecules in the aqueous solvent, a comparatively higher concentration or amount of precipitation agent might be required to be added into the first suspension to form a second suspension with a desirable pH range as specified in the current invention. This is attributed to the facts that (1) the strength of ion-dipole interactions is stronger than that of hydrogen bonding, and thus formation of a higher concentration of hydroxonium ions could potentially smoothen the separation process of the polymeric binder from the aqueous solvent by increasing the likelihood of breaking the stronger ion-dipole interactions and (2) a higher proportion of charged functional group(s) would require a greater concentration of hydroxonium ions (or hydrogen ions) for protonation, and hence the resulting change in charges (i.e. from negatively charged to uncharged) of the polymeric binder could be sufficient in inducing structural transformation.

In some embodiments, after the addition of the precipitation agent into the first suspension in forming a second suspension, the second suspension is being stirred to achieve precipitation of the polymeric binder. In some embodiments, a planetary stirring mixer, a stirring mixer, a blender, an ultrasonicator or a combination thereof is being used to stir the second suspension.

In some embodiments, before the addition of the precipitation agent into the first suspension in forming a second suspension, the first suspension is being stirred to maximize the dissolution of the polymeric binder in the aqueous solvent and allow for a more well-dispersed polymeric binder within the first suspension. In some embodiments, a planetary stirring mixer, a stirring mixer, a blender, an ultrasonicator or a combination thereof is being used to stir the first suspension.

In some embodiments, each of the first suspension and the second suspension is independently stirred at a speed of from about 150 rpm to about 600 rpm, from about 150 rpm to about 500 rpm, from about 150 rpm to about 400 rpm, from about 250 rpm to about 600 rpm, from about 250 rpm to about 500 rpm, from about 350 rpm to about 600 rpm or from about 350 rpm to about 550 rpm.

In some embodiments, each of the first suspension and the second suspension is independently stirred at a speed of less than 600 rpm, less than 500 rpm, less than 400 rpm, less than 300 rpm or less than 200 rpm. In some embodiments, each of the first suspension and the second suspension is independently stirred at a speed of more than 150 rpm, more than 200 rpm, more than 250 rpm, more than 350 rpm, more than 450 rpm or more than 550 rpm.

In some embodiments, the second suspension is stirred for a time period of from about 1 min to about 180 mins, from about 1 min to about 150 mins, from about 1 min to about 120 mins, from about 1 min to about 90 mins, from about 1 min to about 60 mins, from about 5 min to about 180 mins, from about 5 min to about 150 mins, from about 5 mins to about 120 mins, from about 5 mins to about 90 mins, from about 5 mins to about 60 mins, from about 10 mins to about 120 mins, from about 10 mins to about 90 mins, from about 10 mins to about 60 mins, from about 20 mins to about 120 mins, from about 20 mins to about 100 mins, from about 20 mins to about 80 mins, from about 20 mins to about 60 mins, from about 30 mins to about 120 mins, from about 30 mins to about 100 mins or from about 30 mins to about 80 mins.

In some embodiments, the second suspension is stirred for a time period of less than 180 mins, less than 150 mins, less than 120 mins, less than 100 mins, less than 80 mins, less than 60 mins, less than 40 mins, less than 20 mins, less than 10 mins or less than 5 mins. In some embodiments, the second suspension is stirred for a time period of more than 1 min, more than 5 mins, more than 10 mins, more than 20 mins, more than 40 mins, more than 60 mins, more than 80 mins, more than 100 mins, more than 120 mins or more than 150 mins.

The sequence of addition of the precipitation agent, the electrode layer material and the aqueous solvent as disclosed in the precipitation steps of the present invention has negligible effect on the variations in the polymeric binder recovery rate, i.e., the polymeric binder can still be precipitated effectively with a high polymeric binder recovery rate of over 98% regardless of the sequence of addition of the precipitation agent, the electrode layer material and the aqueous solvent in the method disclosed herein.

The precipitation of the polymeric binder disclosed herein results in an exceptionally high polymeric binder recovery rate (>98%). The polymeric binder recovery rate refers to the proportion of the weight of the recovered polymeric binder, based on the initial weight of polymeric binder present in the first suspension before the addition of a precipitation agent. It serves as a reflection of the proportion of polymeric binder retrieved and a gauge to the effectiveness of the method disclosed herein in precipitating the polymeric binder. With the method disclosed herein yielding a high polymeric binder recovery rate indicates that the majority of the polymeric binder could be precipitated with negligible amounts of polymeric binder remaining in the second suspension. The precipitation steps of the present invention circumvents both complex separation process and contamination of the polymeric binder, enabling an excellent materials recovery.

In some embodiments, the precipitated polymeric binder is separated from the remaining second suspension by screening of the second suspension in step 105. In some embodiments, the precipitated polymeric binder and the conductive agent are separated from the remaining second suspension by screening of the second suspension. In some embodiments, the precipitated polymeric binder, the conductive agent, the anode active materials are separated from the remaining second suspension by screening of the second suspension. In some embodiments, the remaining second suspension comprises the dissolved precipitation agent, the dissolved electrode active material and the aqueous solvent. In some embodiments, filtration, sieving, decantation or a combination thereof may be used for screening of the second suspension.

In some embodiments, the remaining second suspension comprising the aqueous solvent, the dissolved precipitation agent and the dissolved electrode active materials can be subjected to additional separation and/or extraction process to further extract the dissolved electrode active materials and the dissolved precipitation agent contained within. In some embodiments, base or hydroxide solutions could be added into the remaining second suspension to react with the dissolved electrode active materials in forming metal hydroxides that could be utilized as precursors in the manufacture of electrode active materials for lithium-ion batteries.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The pH values of the heterogeneous mixture and the second suspension were measured by an electrode-type pH meter (ION 2700, Eutech Instruments).

The delamination recovery rate refers to the proportion of the sum of the weight of the recovered electrode layer material and current collector, based on the initial weight of electrode before immersion into the delamination solution.

The delamination success rate refers to the extent of delamination of electrode layer material from the current collector and was observed via visual inspection.

The polymeric binder recovery rate refers to the proportion of the weight of the recovered polymeric binder, based on the initial weight of polymeric binder present in the first suspension before the addition of a precipitation agent.

The adhesive strengths of the dried polymeric binder layers were measured by a tensile testing machine (DZ-106A, obtained from Dongguan Zonhow Test Equipment Co. Ltd., China). This test measures the average force required to peel a polymeric binder layer from the current collector at 180° angle in Newtons. The mean roughness depth (Rz) of the current collector is 2 μm. The polymeric binder was coated on the current collector and dried to obtain a polymeric binder layer of thickness 10 μm to 12 μm. The coated current collector was then placed in an environment of constant temperature of 25° C. and humidity of 50% to 60% for 30 minutes. A strip of adhesion tape (3M; US; model no. 810) with a width of 18 mm and a length of 20 mm was attached onto the surface of the polymeric binder layer. The polymeric binder strip was clipped onto the testing machine and the tape was folded back on itself at 180 degrees, then placed in a moveable jaw and pulled at room temperature and a peel rate of 300 mm per minute. The maximum stripping force measured was taken as the adhesive strength. Measurements were repeated three times to find the average value.

The peeling strengths of the dried electrode layer materials were measured by a tensile testing machine (DZ-106A, obtained from Dongguan Zonhow Test Equipment Co. Ltd., China). This test measures the average force required to peel an electrode layer material from the current collector at 180° angle in Newtons. The mean roughness depth (Rz) of the current collector is 2 μm. A strip of adhesion tape (3M; US; model no. 810) with a width of 18 mm and a length of 20 mm was attached onto the surface of the cathode electrode layer material. The cathode strip was clipped onto the testing machine and the tape was folded back on itself at 180 degrees, then placed in a moveable jaw and pulled at room temperature and a peel rate of 200 mm per minute. The maximum stripping force measured was taken as the peeling strength. Measurements were repeated three times to find the average value.

Example 1

Assembling of Pouch-Type Full Lithium-Ion Batteries
A) Preparation of Polymeric Binder
16 g of sodium hydroxide (NaOH) was added into a round-bottom flask containing 380 g of distilled water. The sodium hydroxide solution was stirred at 80 rpm for 30 mins to obtain a first mixture.

36.04 g of acrylic acid (AA) was added into the first mixture. The combination of ingredients was further stirred at 80 rpm for 30 mins to obtain a second mixture.

19.04 g of acrylamide (AM) was dissolved in 10 g of DI water to form an AM solution. Thereafter, 29.04 g of AM solution was added into the second mixture. The combination of ingredients was further heated to 55° C. and stirred at 80 rpm for 45 mins to obtain a third mixture.

12.92 g of acrylonitrile (AN) was added into the third mixture. The combination of ingredients was further stirred at 80 rpm for 10 mins to obtain a fourth mixture.

Further, 0.015 g of water-soluble free radical initiator (ammonium persulfate, APS; obtained from Aladdin Industries Corporation, China) was dissolved in 3 g of DI water and 0.0075 g of reducing agent (sodium bisulfite; obtained from Tianjin Damao Chemical Reagent Factory, China) was dissolved in 1.5 g of DI water. 3.015 g of APS solution and 1.5075 g of sodium bisulfite solution were added into the fourth mixture. The combination of ingredients was stirred at 200 rpm for 24 h at 55° C. to obtain a fifth mixture.

After the complete reaction, the temperature of the fifth mixture was lowered to 25° C. 3.72 g of NaOH was dissolved in 400 g of DI water. Thereafter, 403.72 g of sodium hydroxide solution was added dropwise into the fifth mixture for 1 h to adjust pH to 7.31 to form the sixth mixture. The polymeric binder was furnished by filtration using 200 μm nylon mesh. The solid content of the polymeric binder was 9.00 wt. %. The adhesive strength between the polymeric binder and the current collector was 3.27 N/cm. The components of the polymeric binder of Example 1 and their respective proportions are shown in Table 1 below.

B) Preparation of Positive Electrode

A first admixture was prepared by dispersing 12 g of conductive agent (SuperP; obtained from Timcal Ltd, Bodio, Switzerland) and 100 g of polymeric binder (9.00 wt. % solid content) in 74 g of deionized water while stirring with an overhead stirrer (R20, IKA). After the addition, the first admixture was further stirred for about 30 minutes at 25° C. at a speed of 1,200 rpm.

Thereafter, a second admixture was prepared by adding 276 g of NMC532 (obtained from Shandong Tianjiao New Energy Co., Ltd, China) in the first admixture at 25° C. while stirring with an overhead stirrer. Then, the second admixture was degassed under a pressure of about 10 kPa for 1 hour. Then, the second admixture was further stirred for about 60 minutes at 25° C. at a speed of 1,200 rpm to form a homogenized cathode slurry.

The homogenized cathode slurry was coated onto both sides of an aluminum foil having a thickness of 16 μm as a current collector using a doctor blade coater with a gap width of 120 μm. The coated slurry of 80 μm on each side of the aluminum foil was dried to form a cathode electrode layer material by an electrically heated oven at 70° C. The drying time was about 10 minutes. The electrode was then pressed to decrease the thickness of a cathode electrode layer material to 23 μm. The surface density of the cathode electrode layer material on the current collector was 15.00 mg/cm².

C) Preparation of Negative Electrode

A negative electrode slurry was prepared by mixing 93 wt. % of graphite (BTR New Energy Materials Inc., Shenzhen, Guangdong, China) with 4 wt. % of polymeric binder (9.00 wt. % solid content), and 3 wt. % carbon black as a conductive agent in deionized water. The solid content of the anode slurry was 51.5 wt. %. The slurry was coated onto both sides of a copper foil having a thickness of 8 μm using a doctor blade with a gap width of about 120 μm. The coated slurry on the copper foil was dried at about 50° C. for 2.4 minutes by a hot air dryer to obtain a negative electrode. The electrode was then pressed to decrease the thickness of an anode electrode layer material to 60 μm and the surface density of the anode electrode layer material was 10 mg/cm².

D) Assembling of Pouched-Type Batteries

After drying, the resulting cathode coating and anode coating were used to prepare the cathode sheet and anode sheet respectively by cutting into pieces of rectangular shape in the size of 5.2 cm×8.5 cm and 5.4 cm×8.7 cm correspondingly. Pouch-type batteries were prepared by stacking the cathode and anode sheets in an alternating manner and separated by porous polyethylene separators (Celgard, LLC, US) having a thickness of 25 μm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content <1 ppm. After electrolyte filling, the pouch cells were vacuum sealed and then mechanically pressed using a punch tooling with standard shape.

The assembled pouch-type batteries were then subjected to repeated charge and discharge cycles at a constant current rate of 1 C between 3.0 V and 4.2 V to mimic the real-life usage patterns. The actual cell capacity was about 5 Ah. The nominal capacity fell below 80% of its initial rated capacity after 800 cycles.

Delamination of Electrodes

A) Discharging and Disassembling of Pouched-Type Batteries

Used lithium-ion batteries (0.5 kg) were fully discharged by soaking in 6% NaCl solution for 12 hours. After discharging, the lithium-ion batteries were mechanically crushed using a crushing machine (JBL-247, Dongguan Kangbo Machinery Co., Ltd.). The electrode pieces having an average length of from about 2 cm to about 4 cm were recovered.

B) Preparation of Delamination Solution 9.8 g of anhydrous citric acid (Sigma-Aldrich, USA) was added to 990.2 g of DI water to form a delamination solution with a citric acid concentration of 0.98 wt %.

C) Immersion of Electrode Pieces in Delamination Solution 5.07 g of electrode pieces were placed in a vessel containing 1000 g of the delamination solution for 40 mins at 50° C. to form a heterogeneous mixture. The electrode layer materials were detached from the aluminum foils and the copper foils. The heterogeneous mixture has a pH value of 2.05. After immersing, the delamination solution comprising critic acid and DI water was removed by passing through a sieve having a mesh width of 4 mm to recover the electrode layer materials, aluminum foils and copper foils. The delamination solution could be further reused for delaminating electrodes. The recovered aluminum foils and copper foils were immersed into water to retrieve any residual electrode layer materials constituents and remove any remaining delamination solution on the surface of the foils. The recovered electrode layer materials, aluminum foils and copper foils were dried in an oven for 5 hours at 80° C. under atmospheric pressure and obtained a delamination recovery rate of 96.8%. The delamination success rate and delamination recovery rate of the electrode constituents after delamination were measured and are shown in Table 1 below.

Assembling of Pouch-Type Full Lithium-Ion Batteries of Examples 2-4

Pouch-type lithium-ion batteries were prepared by the method described in Example 1. The assembled pouch-type batteries were then subjected to repeated cycling in the same manner as in Example 1.

Delamination of Electrodes of Example 2

Delamination of electrodes was performed in the same manner as in Example 1, except that in the preparation of delamination solution, 5 g of anhydrous citric acid was added to 995 g of DI water to form a delamination solution with a citric acid concentration of 0.50 wt % and in the immersion of electrode pieces in delamination solution, the electrode pieces were placed in 1000 g of the delamination solution for 50 mins at 50° C. to form a heterogeneous mixture.

Delamination of Electrodes of Example 3

Delamination of electrodes was performed in the same manner as in Example 1, except that in the preparation of delamination solution, 0.1 g of anhydrous citric acid was added to 999.9 g of DI water to form a delamination solution with a citric acid concentration of 0.01 wt % and in the immersion of electrode pieces in delamination solution, the electrode pieces were placed in 1000 g of the delamination solution for 70 mins at 50° C. to form a heterogeneous mixture.

Delamination of Electrodes of Example 4

Delamination of electrodes was performed in the same manner as in Example 1, except that in the preparation of delamination solution, 50 g of anhydrous citric acid was added to 950 g of DI water to form a delamination solution with a citric acid concentration of 1.8 wt % and in the immersion of electrode pieces in delamination solution, the electrode pieces were placed in 1000 g of the delamination solution for 50 mins at 50° C. to form a heterogeneous mixture.

Assembling of Pouch-Type Full Lithium-Ion Batteries of Examples 5-9

Pouch-type lithium-ion batteries were prepared by the method described in Example 2. The assembled pouch-type batteries were then subjected to repeated cycling in the same manner as in Example 2.

Delamination of Electrodes of Example 5

Delamination of electrodes was performed in the same manner as in Example 2, except that the electrode pieces were immersed in the delamination solution for 50 mins at 90° C.

Delamination of Electrodes of Example 6

Delamination of electrodes was performed in the same manner as in Example 2, except that 5 g of anhydrous citric acid was replaced with butanedioic acid of the same weight in the preparation of delamination solution.

Delamination of Electrodes of Example 7

Delamination of electrodes was performed in the same manner as in Example 2, except that 5 g of anhydrous citric acid was replaced with fumaric acid of the same weight in the preparation of delamination solution.

Delamination of Electrodes of Example 8

Delamination of electrodes was performed in the same manner as in Example 2, except that 5 g of anhydrous citric acid was replaced with sorbic acid of the same weight in the preparation of delamination solution.

Delamination of Electrodes of Example 9

Delamination of electrodes was performed in the same manner as in Example 2, except that 5 g of anhydrous citric acid was replaced with benzoic acid of the same weight in the preparation of delamination solution.

Assembling of Pouch-Type Full Lithium-Ion Batteries of Example 10

Pouch-type lithium-ion batteries were prepared by the method described in Example 1, except that in the preparation of the polymeric binder, 5.6 g of NaOH was added into 380 g of distilled water in the preparation of the first mixture, 16.57 g of AA was added in the preparation of the second mixture, 7.11 g of AM was added in the preparation of the third mixture and 36.08 g of AN was added in the preparation of the fourth mixture. The assembled pouch-type batteries were then subjected to repeated cycling in the same manner as in Example 1.

Delamination of Electrodes of Example 10

Delamination of electrodes was performed in the same manner as in Example 1, except that the electrode pieces were immersed in the delamination solution for 50 mins at 50° C.

Assembling of Pouch-Type Full Lithium-Ion Batteries of Examples 11-12

Pouch-type lithium-ion batteries were prepared by the method described in Example 10. The assembled pouch-type batteries were then subjected to repeated cycling in the same manner as in Example 10.

Delamination of Electrodes of Example 11

Delamination of electrodes was performed in the same manner as in Example 10, except that 5 g of anhydrous citric acid was added to 995 g of DI water in the preparation of delamination solution with a citric acid concentration of 0.50 wt %.

Delamination of Electrodes of Example 12

Delamination of electrodes was performed in the same manner as in Example 10, except that 0.1 g of anhydrous citric acid was added to 999.9 g of DI water in the preparation of delamination solution with a citric acid concentration of 0.01 wt %.

Assembling of Pouch-Type Full Lithium-Ion Batteries of Examples 13-14

Pouch-type lithium-ion batteries were prepared by the method described in Example 11. The assembled pouch-type batteries were then subjected to repeated cycling in the same manner as in Example 11.

Delamination of Electrodes of Example 13

Delamination of electrodes was performed in the same manner as in Example 11, except that the electrode pieces were immersed in the delamination solution for 50 mins at 40° C.

Delamination of Electrodes of Example 14

Delamination of electrodes was performed in the same manner as in Example 11, except that 5 g of anhydrous citric acid was replaced with butanedioic acid of the same weight in the preparation of delamination solution.

Assembling of Pouch-Type Full Lithium-Ion Batteries of Example 15

Pouch-type lithium-ion batteries were prepared by the method described in Example 2, except that in the preparation of the polymeric binder, 36.04 g of AA was replaced with 2-ethylacrylic acid of the same weight in the preparation of the second mixture. The assembled pouch-type batteries were then subjected to repeated cycling in the same manner as in Example 2.

Delamination of Electrodes of Example 15

Delamination of electrodes was performed in the same manner as in Example 2.

Assembling of Pouch-Type Full Lithium-Ion Batteries of Example 16

Pouch-type lithium-ion batteries were prepared by the method described in Example 11, except that in the preparation of the polymeric binder, 16.57 g of AA was replaced with 2-ethylacrylic acid of the same weight in the preparation of the second mixture. The assembled pouch-type batteries were then subjected to repeated cycling in the same manner as in Example 11.

Delamination of Electrodes of Example 16

Delamination of electrodes was performed in the same manner as in Example 11.

Assembling of Pouch-Type Full Lithium-Ion Batteries of Example 17

Pouch-type lithium-ion batteries were prepared by the method described in Example 1, except that in the preparation of the polymeric binder, 10 g of NaOH was added into 380 g of distilled water in the preparation of the first mixture, 24.50 g of AA was added in the preparation of the second mixture, 7.11 g of AM was added in the preparation of the third mixture and 30.24 g of AN was added in the preparation of the fourth mixture. The assembled pouch-type batteries were then subjected to repeated cycling in the same manner as in Example 1.

Delamination of Electrodes of Example 17

Delamination of electrodes was performed in the same manner as in Example 2.

Assembling of Pouch-Type Full Lithium-Ion Batteries of Comparative Example 1

A) Preparation of Polymeric Binder

A polymeric binder was prepared by dispersing 10 g of polyvinylidene fluoride, PVDF (Solef® 5130, obtained from Solvay S.A., Belgium) in 100 g of N-methyl-2-pyrrolidone, NMP (≥99%, Sigma-Aldrich, USA) while stirring at 500 rpm for about 3 hours.

B) Preparation of Positive Electrode

A first mixture was prepared by dispersing 110 g of polymeric binder above in 150 g of NMP in a 500 mL round bottom flask while stirring with an overhead stirrer. After the addition, the first mixture was further stirred for about 10 minutes at a speed of 500 rpm.

Thereafter, 15 g of SuperP was added into the first mixture and stirred at 1,200 rpm for 30 minutes to obtain the second mixture.

A third mixture was prepared by dispersing 225 g of NMC532 into the second mixture at 25° C. while stirring with an overhead stirrer. Then, the third mixture was degassed under a pressure of about 10 kPa for 1 hour. The third mixture was further stirred for about 90 minutes at 25° C. at a speed of 1,200 rpm to form a homogenized cathode slurry.

The homogenized cathode slurry was coated onto both sides of an aluminum foil having a thickness of 16 μm as a current collector using a doctor blade coater with a gap width of 120 μm. The coated slurry of 80 μm on each side of the aluminum foil was dried to form a cathode electrode layer material by an electrically heated oven at 70° C. The drying time was about 10 minutes. The electrode was then pressed to decrease the thickness of the cathode electrode layer material to 23 μm.

C) Preparation of Negative Electrode

The negative electrode was prepared in the same manner as in Example 2.

D) Assembling of Pouched-Type Batteries

The pouch-type batteries were assembled in the same manner as in Example 2. The assembled pouch-type batteries were then subjected to repeated cycling in the same manner as in Example 2.

Delamination of Electrodes of Comparative Example 1

Delamination of electrodes was performed in the same manner as in Example 2.

Assembling of Pouch-Type Full Lithium-Ion Batteries of Comparative Example 2

Pouch-type lithium-ion batteries were prepared by the method described in Example 2, except that polyacrylonitrile (PAN) was used as the polymeric binder in the preparation of the positive electrode. The assembled pouch-type batteries were then subjected to repeated cycling in the same manner as in Example 2.

Delamination of Electrodes of Comparative Example 2

Delamination of electrodes was performed in the same manner as in Example 2.

Assembling of Pouch-Type Full Lithium-Ion Batteries of Comparative Examples 3-6

Pouch-type lithium-ion batteries were prepared by the method described in Example 2. The assembled pouch-type batteries were then subjected to repeated cycling in the same manner as in Example 2.

Delamination of Electrodes of Comparative Example 3

Delamination of electrodes was performed in the same manner as in Example 2, except that 5 g of sulfuric acid was added to 995 g of DI water in the preparation of delamination solution with a sulfuric acid concentration of 0.50 wt %.

Delamination of Electrodes of Comparative Example 4

Delamination of electrodes was performed in the same manner as in Example 2, except that 2.5 g of anhydrous citric acid and 2.5 g of sulfuric acid were added to 995 g of DI water in the preparation of delamination solution with an acid concentration of 0.50 wt %.

Delamination of Electrodes of Comparative Example 5

Delamination of electrodes was performed in the same manner as in Example 2, except that 1.67 g of acetic acid, 1.67 g of anhydrous citric acid and 1.67 g of sulfuric acid were added to 995 g of DI water in the preparation of delamination solution with an acid concentration of 0.50 wt %.

Delamination of Electrodes of Comparative Example 6

Delamination of electrodes was performed in the same manner as in Example 2, except that delamination agent was not added and only 1000 g of DI water was added in the preparation of the delamination solution.

Example 18

Preparation of First Suspension

A) Preparation of Polymeric Binder

Polymeric binder was prepared in the same manner as in Example 1. The components of the polymeric binder of Example 18 and their respective proportions are shown in Table 2 below.

B) Formation of First Suspension 5.56 g of polymeric binder was added into a round-bottom flask containing 44.55 g of aqueous solvent (distilled water). The mixture was stirred at 80 rpm for 10 mins to obtain a first suspension of 50.11 g. The solid content of the first suspension was 0.99 wt. %.

Precipitation of Polymeric Binder 98 g of sulphuric acid was dissolved in 1 L of distilled water to form a 1 M sulphuric acid solution in the preparation of the precipitation agent. The 1 M sulphuric acid solution was added into the first suspension to form a second suspension of pH 4.24. The second suspension was stirred at 200 rpm for 10 mins at 25° C. The polymeric binder was then precipitated. After precipitation of the polymeric binder, the processed second suspension was removed by passing through a filter paper to recover the precipitated polymeric binder. The recovered polymeric binder was dried in an oven for 5 hours at 80° C. under atmospheric pressure and obtained a polymeric binder recovery rate of 98.58%. The dried polymeric binder could then be further reused. The polymeric binder recovery rate and pH of the second suspension were measured and are shown in Table 2 below.

Preparation of First Suspension of Example 19

Preparation of first suspension was performed in the same manner as in Example 18, except that 5.56 g of polymeric binder was added into 45.04 g of distilled water and the mixture was stirred at 80 rpm for 10 mins to obtain a first suspension of 50.60 g.

Precipitation of Polymeric Binder of Example 19

Precipitation of polymeric binder was performed in the same manner as in Example 18, except that the 1 M sulphuric acid solution was added into the first suspension to form a second suspension of pH 2.96.

Preparation of First Suspension of Example 20

Preparation of first suspension was performed in the same manner as in Example 18, except that 5.56 g of polymeric binder was added into 44.68 g of distilled water and the mixture was stirred at 80 rpm for 10 mins to obtain a first suspension of 50.24 g.

Precipitation of Polymeric Binder of Example 20

Precipitation of polymeric binder was performed in the same manner as in Example 18, except that the 1 M sulphuric acid solution was added into the first suspension to form a second suspension of pH 1.01.

Preparation of First Suspension of Example 21

Preparation of first suspension was performed in the same manner as in Example 18, except that 5.56 g of polymeric binder was added into 44.59 g of distilled water and the mixture was stirred at 80 rpm for 10 mins to obtain a first suspension of 50.15 g.

Precipitation of Polymeric Binder of Example 21

Precipitation of polymeric binder was performed in the same manner as in Example 18, except that the 1 M sulphuric acid solution was added into the first suspension to form a second suspension of pH 1.95 and the second suspension was stirred at 200 rpm for 10 mins at 90° C.

Preparation of First Suspension of Example 22

Preparation of first suspension was performed in the same manner as in Example 18, except that polymeric binder was prepared in the same manner as in Example 10 and 5.56 g of the polymeric binder was added into 44.48 g of distilled water and the mixture was stirred at 80 rpm for 10 mins to obtain a first suspension of 50.04 g.

Precipitation of Polymeric Binder of Example 22

Precipitation of polymeric binder was performed in the same manner as in Example 18, except that the 1 M sulphuric acid solution was added into the first suspension to form a second suspension of pH 3.99.

Preparation of First Suspension of Example 23

Preparation of first suspension was performed in the same manner as in Example 22, except that 5.56 g of polymeric binder was added into 44.71 g of distilled water and the mixture was stirred at 80 rpm for 10 mins to obtain a first suspension of 50.27 g.

Precipitation of Polymeric Binder of Example 23

Precipitation of polymeric binder was performed in the same manner as in Example 22, except that the 1 M sulphuric acid solution was added into the first suspension to form a second suspension of pH 1.07.

Preparation of First Suspension of Example 24

Preparation of first suspension was performed in the same manner as in Example 18, except that 5.56 g of polymeric binder was added into 44.63 g of distilled water and the mixture was stirred at 80 rpm for 10 mins to obtain a first suspension of 50.19 g.

Precipitation of Polymeric Binder of Example 24

Precipitation of polymeric binder was performed in the same manner as in Example 18, except that 1 M hydrochloric acid solution (Sigma-Aldrich, Germany) was used as the precipitation agent and was added into the first suspension to form a second suspension of pH 1.22.

Preparation of First Suspension of Example 25

Preparation of first suspension was performed in the same manner as in Example 18, except that 5.56 g of polymeric binder was added into 44.76 g of distilled water and the mixture was stirred at 80 rpm for 10 mins to obtain a first suspension of 50.32 g.

Precipitation of Polymeric Binder of Example 25

Precipitation of polymeric binder was performed in the same manner as in Example 18, except that 139 g of formic acid was dissolved in 1 L of distilled water to form a 3 M formic acid solution in the preparation of the precipitation agent and the 3 M formic acid solution was added into the first suspension to form a second suspension of pH 1.07.

Preparation of First Suspension of Example 26

Preparation of first suspension was performed in the same manner as in Example 18, except that 5.56 g of polymeric binder was added into 44.69 g of distilled water and the mixture was stirred at 80 rpm for 10 mins to obtain a first suspension of 50.25 g.

Precipitation of Polymeric Binder of Example 26

Precipitation of polymeric binder was performed in the same manner as in Example 18, except that 139 g of formic acid was dissolved in 1 L of distilled water to form a 3 M formic acid solution in the preparation of the precipitation agent and the 3 M formic acid solution was added into the first suspension to form a second suspension of pH 2.92.

Preparation of First Suspension of Example 27

Preparation of first suspension was performed in the same manner as in Example 18, except that 5.56 g of polymeric binder was added into 44.73 g of distilled water and the mixture was stirred at 80 rpm for 10 mins to obtain a first suspension of 50.29 g.

Precipitation of Polymeric Binder of Example 27

Precipitation of polymeric binder was performed in the same manner as in Example 18, except that 577 g of citric acid was dissolved in 1 L of distilled water to form a 3 M citric acid solution in the preparation of the precipitation agent and the 3 M citric acid solution was added into the first suspension to form a second suspension of pH 0.90.

Preparation of First Suspension of Example 28

Preparation of first suspension was performed in the same manner as in Example 22, except that 5.56 g of polymeric binder was added into 44.62 g of distilled water and the mixture was stirred at 80 rpm for 10 mins to obtain a first suspension of 50.18 g.

Precipitation of Polymeric Binder of Example 28

Precipitation of polymeric binder was performed in the same manner as in Example 22, except that 577 g of citric acid was dissolved in 1 L of distilled water to form a 3 M citric acid solution in the preparation of the precipitation agent and the 3 M citric acid solution was added into the first suspension to form a second suspension of pH 1.09.

Preparation of First Suspension of Example 29

Preparation of first suspension was performed in the same manner as in Example 18, except that in the preparation of the polymeric binder, 36.04 g of AA was replaced with 2-ethylacrylic acid of the same weight in the preparation of the second mixture; and in the formation of the first suspension, 5.56 g of polymeric binder was added into 44.58 g of distilled water and the mixture was stirred at 80 rpm for 10 mins to obtain a first suspension of 50.14 g.

Precipitation of Polymeric Binder of Example 29

Precipitation of polymeric binder was performed in the same manner as in Example 18, except that the 1 M sulphuric acid solution was added into the first suspension to form a second suspension of pH 1.14.

Preparation of First Suspension of Example 30

Preparation of first suspension was performed in the same manner as in Example 18, except that in the preparation of the polymeric binder, 36.04 g of AA was replaced with crotonic acid of the same weight in the preparation of the second mixture; and in the formation of the first suspension, 5.56 g of polymeric binder was added into 44.67 g of distilled water and the mixture was stirred at 80 rpm for 10 mins to obtain a first suspension of 50.23 g.

Precipitation of Polymeric Binder of Example 30

Precipitation of polymeric binder was performed in the same manner as in Example 18, except that the 1 M sulphuric acid solution was added into the first suspension to form a second suspension of pH 1.21.

Preparation of First Suspension of Example 31

Preparation of first suspension was performed in the same manner as in Example 22, except that in the preparation of the polymeric binder, 16.57 g of AA was replaced with 2-ethylacrylic acid of the same weight in the preparation of the second mixture; and in the formation of the first suspension, 5.56 g of polymeric binder was added into 44.49 g of distilled water and the mixture was stirred at 80 rpm for 10 mins to obtain a first suspension of 50.05 g.

Precipitation of Polymeric Binder of Example 31

Precipitation of polymeric binder was performed in the same manner as in Example 22, except that the 1 M sulphuric acid solution was added into the first suspension to form a second suspension of pH 1.04.

Preparation of First Suspension of Example 32

Preparation of first suspension was performed in the same manner as in Example 18, except that polymeric binder was prepared in the same manner as in Example 17 and 5.56 g of the polymeric binder was added into 44.57 g of distilled water and the mixture was stirred at 80 rpm for 10 mins to obtain a first suspension of 50.13 g.

Precipitation of Polymeric Binder of Example 32

Precipitation of polymeric binder was performed in the same manner as in Example 18, except that the 1 M sulphuric acid solution was added into the first suspension to form a second suspension of pH 1.09.

Preparation of First Suspension of Comparative Example 7

Preparation of first suspension was performed in the same manner as in Example 18, except that 5.56 g of polymeric binder was added into 44.63 g of distilled water and the mixture was stirred at 80 rpm for 10 mins to obtain a first suspension of 50.19 g.

Precipitation of Polymeric Binder of Comparative Example 7

Precipitation of polymeric binder was performed in the same manner as in Example 18, except that the 1 M sulphuric acid solution was added into the first suspension to form a second suspension of pH 5.93.

Preparation of First Suspension of Comparative Example 8

Preparation of first suspension was performed in the same manner as in Example 22, except that 5.56 g of polymeric binder was added into 44.50 g of distilled water and the mixture was stirred at 80 rpm for 10 mins to obtain a first suspension of 50.06 g.

Precipitation of Polymeric Binder of Comparative Example 8

Precipitation of polymeric binder was performed in the same manner as in Example 22, except that the 1 M sulphuric acid solution was added into the first suspension to form a second suspension of pH 4.96.

Preparation of First Suspension of Comparative Example 9

Preparation of first suspension was performed in the same manner as in Example 18, except that 5.56 g of polymeric binder was added into 44.68 g of distilled water and the mixture was stirred at 80 rpm for 10 mins to obtain a first suspension of 50.24 g.

Precipitation of Polymeric Binder of Comparative Example 9

Precipitation of polymeric binder was performed in the same manner as in Example 18, except that 139 g of formic acid was dissolved in 1 L of distilled water to form a 3 M formic acid solution in the preparation of the precipitation agent and the 3 M formic acid solution was added into the first suspension to form a second suspension of pH 3.46.

Preparation of First Suspension of Comparative Example 10

Preparation of first suspension was performed in the same manner as in Example 18, except that in the preparation of the polymeric binder, polyacrylic acid (PAA) was used as the polymeric binder; and in the formation of the first suspension, 5.56 g of PAA was added into 44.97 g of distilled water and the mixture was stirred at 80 rpm for 10 mins to obtain a first suspension of 50.53 g. The solid content of the first suspension was 0.99 wt. %.

Precipitation of Polymeric Binder of Comparative Example 10

Precipitation of polymeric binder was performed in the same manner as in Example 18, except that the 1 M sulphuric acid solution was added into the first suspension to form a second suspension of pH 1.24.

Preparation of First Suspension of Comparative Example 11

Preparation of first suspension was performed in the same manner as in Example 18, except that in the preparation of the polymeric binder, polyacrylamide (PAM) was used as the polymeric binder; and in the formation of the first suspension, 5.56 g of PAM was added into 44.47 g of distilled water and the mixture was stirred at 80 rpm for 10 mins to obtain a first suspension of 50.03 g. The solid content of the first suspension was 0.99 wt. %.

Precipitation of Polymeric Binder of Comparative Example 11

Precipitation of polymeric binder was performed in the same manner as in Example 18, except that the 1 M sulphuric acid solution was added into the first suspension to form a second suspension of pH 1.15.

Preparation of First Suspension of Comparative Example 12

Preparation of first suspension was performed in the same manner as in Example 18, except that in the preparation of the polymeric binder, carboxymethyl cellulose (CMC; BSH-12, DKS Co. Ltd., Japan) was used as the polymeric binder; and in the formation of the first suspension, 0.50 g of CMC was added into 49.50 g of distilled water and the mixture was stirred at 80 rpm for 10 mins to obtain a first suspension of 50.00 g. The solid content of the first suspension was 0.99 wt. %.

Precipitation of Polymeric Binder of Comparative Example 12

Precipitation of polymeric binder was performed in the same manner as in Example 18, except that the 1 M sulphuric acid solution was added into the first suspension to form a second suspension of pH 1.02.

Preparation of First Suspension of Comparative Example 13

Preparation of first suspension was performed in the same manner as in Example 18, except that in the preparation of the polymeric binder, styrene butadiene rubber (SBR, 45 wt. % in water; AL-2001, NIPPON A&L INC., Japan) was used as the polymeric binder; and in the formation of the first suspension, 1.11 g of SBR was added into 48.89 g of distilled water and the mixture was stirred at 80 rpm for 10 mins to obtain a first suspension of 50.00 g. The solid content of the first suspension was 0.99 wt. %.

Precipitation of Polymeric Binder of Comparative Example 13

Precipitation of polymeric binder was performed in the same manner as in Example 18, except that the 1 M sulphuric acid solution was added into the first suspension to form a second suspension of pH 1.06.

Example 33

Assembling of Pouch-Type Full Lithium-Ion Batteries

Pouch-type lithium-ion batteries were prepared by the method described in Example 2. The assembled pouch-type batteries were then subjected to repeated cycling in the same manner as in Example 2.

Delamination of Electrodes

Delamination of electrodes was performed in the same manner as in Example 2. The delamination success rate and delamination recovery rate of the electrode constituents after delamination were measured and are shown in Table 3 below.

Preparation of First Suspension 4.48 g of electrode layer materials were added into a round-bottom flask containing 60 g of aqueous solvent (distilled water). The mixture was stirred at 80 rpm for 10 mins to obtain a first suspension of 64.48 g and the electrode layer materials were fragmented in the process.

Precipitation of Polymeric Binder 98 g of sulphuric acid was dissolved in 1 L of distilled water to form a 1 M sulphuric acid solution in the preparation of the precipitation agent. The 1 M sulphuric acid solution was added into the first suspension to form a second suspension of pH 1.41. The second suspension was stirred at 200 rpm for 2 hours at 90° C. The prolonged period of stirring time and the elevation in temperature were intended to achieve dissolution of the NMC532 in a more efficient manner. The polymeric binder was then precipitated and NMC532 dissolved in the second suspension. After precipitation of the polymeric binder and dissolution of NMC532, the second suspension was passed through a filter paper to separate the conductive agents, precipitated polymeric binder and undissolved graphite from the remaining second suspension. The remaining second suspension can be subjected to additional extraction process to further extract NMC532 and the precipitation agent contained within. The pH of the second suspension was measured and is shown in Table 3 below.

Example 34

Assembling of Pouch-Type Full Lithium-Ion Batteries

Pouch-type lithium-ion batteries were prepared by the method described in Example 11. The assembled pouch-type batteries were then subjected to repeated cycling in the same manner as in Example 11.

Delamination of Electrodes

Delamination of electrodes was performed in the same manner as in Example 11.

Preparation of First Suspension

First suspension was prepared in the same manner as in Example 33, except that 4.53 g of electrode layer materials were added to 60 g of distilled water in the preparation of the first suspension.

Precipitation of Polymeric Binder

Polymeric binder was precipitated in the same manner as in Example 33.

Table 1

TABLE 1

| | Proportion of structural unit in the copolymer (mol %) | | | | | | |
|---|---|---|---|---|---|---|---|
| | Derived from hydrogen bond-forming group-containing monomer (ii) | Derived from hydrogen bond-forming group-containing monomer (i) | Derived from acid group-containing monomer | Delamination agent Type | Conc (wt %) | Delamination success rate (%) | Delamination recovery rate (%) |
| Example 1 | 24.07 | 26.48 | 49.45 | Citric acid | 0.98 | 100 | 96.8 |
| Example 2 | 24.07 | 26.48 | 49.45 | Citric acid | 0.5 | 100 | 99.4 |
| Example 3 | 24.07 | 26.48 | 49.45 | Citric acid | 0.01 | 100 | 96.6 |
| Example 4 | 24.07 | 26.48 | 49.45 | Citric acid | 1.8 | 100 | 96.5 |
| Example 5 | 24.07 | 26.48 | 49.45 | Citric acid | 0.5 | 100 | 96.1 |
| Example 6 | 24.07 | 26.48 | 49.45 | Butanedioic acid | 0.5 | 100 | 98.8 |
| Example 7 | 24.07 | 26.48 | 49.45 | Fumaric Acid | 0.5 | 100 | 99.2 |
| Example 8 | 24.07 | 26.48 | 49.45 | Sorbic acid | 0.5 | 100 | 99.3 |
| Example 9 | 24.07 | 26.48 | 49.45 | Benzoic acid | 0.5 | 100 | 98.7 |
| Example 10 | 67.33 | 9.90 | 22.77 | Citric acid | 0.98 | 100 | 96.8 |
| Example 11 | 67.33 | 9.90 | 22.77 | Citric acid | 0.5 | 100 | 99.4 |
| Example 12 | 67.33 | 9.90 | 22.77 | Citric acid | 0.01 | 100 | 96.2 |
| Example 13 | 67.33 | 9.90 | 22.77 | Citric acid | 0.5 | 100 | 97.1 |
| Example 14 | 67.33 | 9.90 | 22.77 | Butanedioic acid | 0.5 | 100 | 99.1 |
| Example 15 | 27.95 | 30.74 | 41.31 | Citric acid | 0.5 | 100 | 98.1 |
| Example 16 | 71.92 | 10.58 | 17.50 | Citric acid | 0.5 | 100 | 97.8 |
| Example 17 | 56.44 | 9.90 | 33.66 | Citric acid | 0.5 | 100 | 99.2 |
| Comparative Example 1 | | PVDF | | Citric acid | 0.5 | —# | — |
| Comparative Example 2 | 100.00 | 0.00 | 0.00 | Citric acid | 0.5 | —# | — |
| Comparative Example 3 | 24.07 | 26.48 | 49.45 | Sulfuric acid | 0.5 | 100 | 34.7 |
| Comparative Example 4 | 24.07 | 26.48 | 49.45 | Citric acid and sulfuric acid | 0.5 | 100 | 26.1 |

TABLE 1-continued

| | Proportion of structural unit in the copolymer (mol %) | | | | | | |
|---|---|---|---|---|---|---|---|
| | Derived from hydrogen bond-forming group-containing monomer (ii) | Derived from hydrogen bond-forming group-containing monomer (i) | Derived from acid group-containing monomer | Delamination agent | | Delamination success rate (%) | Delamination recovery rate (%) |
| | | | | Type | Conc (wt %) | | |
| Comparative Example 5 | 24.07 | 26.48 | 49.45 | Acetic acid, citric acid and sulfuric acid | 0.5 | 100 | 32.2 |
| Comparative Example 6 | 24.07 | 26.48 | 49.45 | — | — | —[#] | — |

[#]is an indicator of incomplete or unsuccessful delamination of the electrode layer from the current collector, and hence unable to determine delamination success rate.

TABLE 2

| | First suspension Proportion of structural unit in the copolymer (mol %) | | | | | |
|---|---|---|---|---|---|---|
| | Derived from hydrogen bond-forming group-containing monomer (ii) | Derived from hydrogen bond-forming group-containing monomer (i) | Derived from an acid group-containing monomer | Precipitation agent | pH of second suspension | Polymeric binder recovery rate (wt %) |
| Example 18 | 24.07 | 26.48 | 49.45 | Sulphuric acid | 4.24 | 98.58 |
| Example 19 | 24.07 | 26.48 | 49.45 | Sulphuric acid | 2.96 | 99.19 |
| Example 20 | 24.07 | 26.48 | 49.45 | Sulphuric acid | 1.01 | 99.68 |
| Example 21 | 24.07 | 26.48 | 49.45 | Sulphuric acid | 1.95 | 99.71 |
| Example 22 | 67.33 | 9.90 | 22.77 | Sulphuric acid | 3.99 | 99.12 |
| Example 23 | 67.33 | 9.90 | 22.77 | Sulphuric acid | 1.07 | 99.88 |
| Example 24 | 24.07 | 26.48 | 49.45 | Hydrochloric acid | 1.22 | 99.24 |
| Example 25 | 24.07 | 26.48 | 49.45 | Formic acid | 1.07 | 99.14 |
| Example 26 | 24.07 | 26.48 | 49.45 | Formic acid | 2.92 | 98.68 |
| Example 27 | 24.07 | 26.48 | 49.45 | Citric acid | 0.90 | 99.20 |
| Example 28 | 67.33 | 9.90 | 22.77 | Citric acid | 1.09 | 99.50 |
| Example 29 | 27.95 | 30.74 | 41.31 | Sulphuric acid | 1.14 | 99.18 |
| Example 30 | 26.18 | 28.80 | 45.01 | Sulphuric acid | 1.21 | 99.22 |
| Example 31 | 71.92 | 10.58 | 17.50 | Sulphuric acid | 1.04 | 99.08 |
| Example 32 | 56.44 | 9.90 | 33.66 | Sulphuric acid | 1.09 | 99.70 |
| Comparative Example 7 | 24.07 | 26.48 | 49.45 | Sulphuric acid | 5.93 | 22.04 |
| Comparative Example 8 | 67.33 | 9.90 | 22.77 | Sulphuric acid | 4.96 | 44.19 |
| Comparative Example 9 | 24.07 | 26.48 | 49.45 | Formic acid | 3.46 | 16.01 |
| Comparative Example 10 | 0.00 | 0.00 | 100.00 | Sulphuric acid | 1.24 | 0.00 |
| Comparative Example 11 | 0.00 | 100.00 | 0.00 | Sulphuric acid | 1.15 | 0.00 |
| Comparative Example 12 | | CMC | | Sulphuric acid | 1.02 | 0.00 |
| Comparative Example 13 | | SBR | | Sulphuric acid | 1.06 | 0.00 |

TABLE 3

| | Proportion of structural unit in the copolymer (mol %) | | | | | | | | | |
|---|---|---|---|---|---|---|---|---|---|---|
| | Derived from hydrogen bond-forming group-containing monomer (ii) | Derived from hydrogen bond-forming group-containing monomer (i) | Derived from an acid group-containing monomer | Cathode active material | Delamination agent | | Delamination success rate (%) | Delamination recovery rate (%) | Precipitation agent | pH of second suspension |
| | | | | | Type | Conc (wt %) | | | | |
| Example 33 | 24.07 | 26.48 | 49.45 | NMC532 | Citric acid | 0.5 | 100 | 99.4 | Sulphuric acid | 1.41 |
| Example 34 | 67.33 | 9.90 | 22.77 | NMC532 | Citric acid | 0.5 | 100 | 99.4 | Sulphuric acid | 1.15 |

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist.

The appended claims intend to cover all those modifications and variations as falling within the scope of the invention.

What is claimed is:

1. A method for recycling a battery electrode, comprising the steps of:

a) immersing an electrode, comprising a current collector and an electrode layer material coated on one side or both sides of the current collector, into a delamination solution to form a heterogeneous mixture, wherein the electrode layer material comprises a polymeric binder and an electrode active material;

b) screening the heterogeneous mixture to separate the current collector and the electrode layer material from the delamination solution;

c) adding the electrode layer material and a precipitation agent into an aqueous solvent to form a first suspension, and then precipitating the polymeric binder;

wherein the delamination solution comprises a delamination agent and an aqueous solvent, wherein the delamination agent is a weak acid;

wherein the polymeric binder comprises a copolymer comprising a structural unit derived from an acid group-containing monomer and a structural unit derived from a hydrogen bond-forming group-containing monomer (ii); wherein the hydrogen bond-forming group-containing monomer (ii) is selected from the group consisting of a nitrile group-containing monomer, an ester group-containing monomer, an epoxy group-containing monomer, a fluorine group-containing monomer and combinations thereof; and wherein the precipitation agent is a strong acid, a weak acid or a combination thereof.

2. The method of claim 1, wherein the copolymer further comprises a structural unit derived from a hydrogen bond-forming group-containing monomer (i); wherein the hydrogen bond-forming group-containing monomer (i) is selected from the group consisting of an amide group-containing monomer, a hydroxyl group-containing monomer and combinations thereof.

3. The method of claim 2, wherein the amide group-containing monomer is selected from the group consisting of acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl) methacrylamide, N-(ethoxymethyl) methacrylamide, N-(propoxymethyl) methacrylamide, N-(butoxymethyl) methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide and combinations thereof; and wherein the proportion of structural unit derived from an amide group-containing monomer is from about 0% to about 85% by mole, based on the total number of moles of monomeric units in the copolymer in the polymeric binder.

4. The method of claim 1, wherein the molar ratio of the structural unit derived from an acid group-containing monomer to the structural unit derived from a hydrogen bond-forming group-containing monomer (ii) in the copolymer is from about 0.1 to about 5; and wherein the proportion of the structural unit derived from a hydrogen bond-forming group-containing monomer (ii) is from about 5% to about 85% by mole, based on the total number of moles of monomeric units in the copolymer in the polymeric binder.

5. The method of claim 1, wherein the current collector is in the form of a foil, sheet, film or a combination thereof; and wherein the current collector is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin and combinations thereof.

6. The method of claim 1, wherein the acid group-containing monomer is selected from the group consisting of a carboxylic acid group-containing monomer, a sulfonic acid group-containing monomer, a phosphonic acid group-containing monomer and combinations thereof; and wherein the $pK_a$ of the acid group-containing monomer is at least 0.1 pH unit above the $pK_a$ of the precipitation agent.

7. The method of claim 6, wherein the carboxylic acid group-containing monomer is selected from the group consisting of acrylic acid, methacrylic acid, crotonic acid, 2-butyl crotonic acid, cinnamic acid, maleic acid, maleic anhydride, fumaric acid, itaconic acid, itaconic anhydride, 4,4-dimethyl itaconic acid, 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid, methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate, maleic anhydride, methyl maleic anhydride, dimethyl maleic anhydride, acrylic anhydride, methacrylic anhydride, methacrolein, methacryloyl chloride, methacryloyl fluoride, methacryloyl bromide and combinations thereof.

8. The method of claim 6, wherein the sulfonic acid group-containing monomer is selected from the group consisting of vinylsulfonic acid, methylvinylsulfonic acid, allylvinylsulfonic acid, allylsulfonic acid, methallylsulfonic acid, styrenesulfonic acid, 2-sulfoethyl methacrylic acid, 2-methylprop-2-ene-1-sulfonic acid, 2-acrylamido-2-methyl-1-propane sulfonic acid, 3-allyloxy-2-hydroxy-1-propane sulfonic acid and combinations thereof.

9. The method of claim 6, wherein the phosphonic acid group-containing monomer is selected from the group consisting of vinyl phosphonic acid, allyl phosphonic acid, vinyl benzyl phosphonic acid, acrylamide alkyl phosphonic acid, methacrylamide alkyl phosphonic acid, acrylamide alkyl diphosphonic acid, acryloylphosphonic acid, 2-methacryloyloxyethyl phosphonic acid, bis(2-methacryloyloxyethyl) phosphonic acid, ethylene 2-methacryloyloxyethyl phosphonic acid, ethyl-methacryloyloxyethyl phosphonic acid and combinations thereof.

10. The method of claim 1, wherein the proportion of structural unit derived from an acid group-containing monomer is from about 5% to about 85% by mole, based on the total number moles of monomeric units in the copolymer in the polymeric binder.

11. The method of claim 1, wherein the nitrile group-containing monomer is selected from the group consisting of acrylonitrile, α-halogenoacrylonitrile, α-alkylacrylonitrile, α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl) acrylonitrile, α-(chlorophenyl) acrylonitrile, α-(cyanophenyl) acrylonitrile, vinylidene cyanide and combinations thereof; and wherein the proportion of structural unit derived from a nitrile group-containing monomer is from about 5% to about 85% by mole, based on the total number moles of monomeric units in the copolymer in the polymeric binder.

12. The method of claim 1, wherein the weak acid of each of the delamination agent and the precipitation agent is independently selected from the group consisting of formic acid, acetic acid, glycolic acid, glyoxylic acid, oxalic acid, propionic acid, acrylic acid, propiolic acid, lactic acid, 3-hydroxypropionic acid, glyceric acid, pyruvic acid, 3-oxopropionic acid, 2,3-dioxopropionic acid, malonic acid, tartronic acid, dihydroxymalonic acid, mesoxalic acid, glycidic acid, butyric acid, isobutyric acid, crotonic acid, isocrotonic acid, methacrylic acid, vinylacetic acid, tetrolic acid, 2-hydroxybutyric acid, 3-hydroxybutyric acid, 4-hydroxybutyric acid, 2-oxobutanoic acid, acetoacetic acid, 4-oxobutanoic acid, butanedioic acid, methylmalonic acid, fumaric acid, maleic acid, 2-hydroxybutanedioic acid, tartaric acid, oxaloacetic acid, dioxosuccinic acid, valeric acid, isovaleric acid, 2-methylbutyric acid, pivalic acid, 3-hydroxyvaleric acid, 4-hydroxypentanoic acid, 3-hydroxyisovaleric acid, glutaric acid, 2-oxoglutaric acid, 3-oxoglutaric acid, 2-furoic acid, tetrahydrofuroic acid, hexanoic acid, hexanedioic acid, citric acid, aconitic acid, isocitric acid, sorbic acid, pimelic acid, benzoic acid, salicylic acid, 4-carboxybenzoic acid, trimesic acid, mellitic acid, malic acid, dithionous acid, phosphoric acid, nitrous acid, orthosilicic acid and combinations thereof; and wherein the $pK_a$ of the weak acid of each of the delamination agent and the precipitation agent is independently from about 2 to about 7.

13. The method of claim 1, wherein the aqueous solvent used in each of step c) and the delamination solution is independently water or a solution consisting of water as a major component and a volatile solvent as a minor component, such that the proportion of water in the aqueous solvent is from about 51% to about 100% by weight.

14. The method of claim 13, wherein the minor component is selected from the group consisting of methanol, ethanol, isopropanol, n-propanol, tert-butanol, n-butanol, acetone, dimethyl ketone, methyl ethyl ketone, ethyl acetate, isopropyl acetate, propyl acetate, butyl acetate and combinations thereof.

15. The method of claim 1, wherein the weight ratio of the electrode to the delamination solution is from about 0.01% to about 15%; wherein the pH of the first suspension is from about 0.2 to about 4.5; and wherein the pH of the first suspension is at least 0.2 pH unit below the $pK_a$ of the acid group-containing monomer.

16. The method of claim 1, wherein the strong acid is selected from the group consisting of nitric acid, sulphuric acid, hydrochloric acid, perchloric acid, hydrobromic acid, hydroiodic acid, chloric acid, bromic acid, iodic acid, dithionic acid, dithionous acid, sulfamic acid, trithionic acid, tetrathionic acid, methane sulphonic acid, p-toluenesulfonic acid, benzene sulfonic acid, trichloroacetic acid, trifluoroacetic acid, oxalic acid, propiolic acid, mesoxalic acid, mellitic acid and combinations thereof; and wherein the $pK_a$ of the strong acid is from about-10 to about 2.

17. The method of claim 1, wherein the concentration of the delamination agent in the delamination solution is from about 0.01% to about 3.5% by weight, based on the total weight of the delamination solution.

18. The method of claim 1, wherein the electrode layer material and the precipitation agent are added simultaneously to form the first suspension.

* * * * *